(12) United States Patent
Lin et al.

(10) Patent No.: US 7,162,367 B2
(45) Date of Patent: *Jan. 9, 2007

(54) SELF-CONTAINED/INTERRUPTION-FREE POSITIONING METHOD AND SYSTEM THEREOF

(75) Inventors: Ching-Fang Lin, Simi Valley, CA (US); Hiram McCall, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 1385 days.

This patent is subject to a terminal disclaimer.

(21) Appl. No.: 09/740,539

(22) Filed: Dec. 18, 2000

(65) Prior Publication Data

US 2006/0100781 A1   May 11, 2006

Related U.S. Application Data

(63) Continuation-in-part of application No. 09/704,211, filed on Oct. 31, 2000, now Pat. No. 6,477,465.

(60) Provisional application No. 60/235,951, filed on Sep. 26, 2000, provisional application No. 60/172,387, filed on Dec. 17, 1999, provisional application No. 60/167,830, filed on Nov. 29, 1999.

(51) Int. Cl.
*G01C 21/28* (2006.01)
*G01C 21/00* (2006.01)

(52) U.S. Cl. ............ 701/220; 701/216; 701/213; 701/211; 342/357.14

(58) Field of Classification Search ............ None
See application file for complete search history.

(56) References Cited

U.S. PATENT DOCUMENTS

| | | | | |
|---|---|---|---|---|
| 5,307,277 A | * | 4/1994 | Hirano | 701/207 |
| 5,359,889 A | * | 11/1994 | Jircitano et al. | 73/178 R |
| 5,757,317 A | * | 5/1998 | Buchler et al. | 342/357.08 |
| 5,902,351 A | * | 5/1999 | Streit et al. | 701/220 |
| 6,282,496 B1 | * | 8/2001 | Chowdhary | 701/220 |
| 6,370,475 B1 | * | 4/2002 | Breed et al. | 701/301 |

* cited by examiner

*Primary Examiner*—Michael J. Zanelli
(74) *Attorney, Agent, or Firm*—Raymond Y. Chan; David and Raymond Patent Group

(57) ABSTRACT

A self-contained/interruption-free earth's surface positioning method and system, carried by a user on the earth's surface, includes an inertial measurement unit, a north finder, a velocity producer, an altitude measurement device, a GPS (Global Positioning System) receiver, a data link, a navigation processor, a wireless communication device, and a display device and map database. Output signals of the inertial measurement unit, the velocity producer, altitude measurement device, the GPS receiver, the data link, and the north finder are processed to obtain highly accurate position measurements of the user. The user's position information can be exchanged with other users through the wireless communication device, and the location and surrounding information can be displayed on the display device by accessing a map database with the user position information.

103 Claims, 44 Drawing Sheets

SELF-CONTAINED/INTERRUPTION-FREE POSITIONING METHOD AND SYSTEM THEREOF

CROSS REFERENCE OF RELATED APPLICATIONS

This is a regular application of a provisional application having an application No. of 60/172,387 and a filing date of Dec. 17, 1999 and another provisional application having an application No. of 60/235,951 and a filing date of Sep. 26, 2000 and that this is also a Continuation-In-Part application of a non-provisional application, application Ser. No. 09/704,211, field Oct. 31, 2000, now U.S. Pat. No. 6,477, 465, which is a regular application of a provisional application having an application No. of 60/167,830 and a filing date of Nov. 29, 1999.

BACKGROUND OF THE PRESENT INVENTION

1. Field of the Present Invention

The present invention relates to a positioning method and system, and more particularly to a self-contained/interruption-free positioning method and system for the earth's surface applications. The system of the present invention possesses the operational flexibility of capability of hand-held and the earth's surface vehicle applications, including air, land, and water vehicles, to determine position information of a user on the earth surface with high accuracy.

2. Description of Related Arts

Currently, most of the earth surface navigators depend on the GPS (Global Positioning System). The GPS is a dual-use, satellite-based radio-navigation system, which is owned, deployed, and operated by the U.S. Department of Defense, but is available for commercial uses around the world to provide accurate location and timing data. Unfortunately, GPS is vulnerable to jamming and shadowing, especially in the earth's surface applications, so that a GPS receiver often cannot provide continuous positioning information without interruption, especially in urban areas. For commercial and scientific the earth's surface applications, it is very important to obtain continuous positioning information in urban areas.

Traditionally, an inertial navigation system (INS) does not need to receive any external radio frequency signals to output position data continuously. However, the cost, size, power, and position-drift characteristics of conventional inertial navigation systems prohibit them from use in commercial the earth's surface navigation applications.

Therefore, it is very desirable to develop a positioning system with reasonable size and weight and power consumption for the earth surface operation without interruption, which can be used in the areas where GPS signals are not available, such as inside buildings, tunnels, forested areas, urbanized terrain, and heavy jamming environments.

SUMMARY OF THE PRESENT INVENTION

A main objective of the self-contained/interruption-free positioning method and system thereof of the present invention is fuse information from an IMU, a velocity producer, a north finder, and an altitude measurement device to achieve a highly accurate self-contained/interruption-free navigation solution with hardware and software modules, so as to determine highly accurate position information of a user on the earth's surface, including persons, air, land, and water vehicles.

Another objective of the self-contained/interruption-free positioning method and system thereof according to the present invention is to determine position information of a user on the earth's surface with high accuracy, such as an accuracy of better than 1 percent of the distance traveled without relying on GPS, wherein output signals of an inertial measurement unit, a velocity producer, a north finder, and an altitude measurement device are processed to obtain highly accurate position measurements of the user on the earth's surface.

Another objective of the self-contained/interruption-free positioning method and system thereof according to the present invention is to determine position information of a user on the earth's surface with high accuracy, where a wireless communication device is built in to exchange the user position information with other users.

Another objective of the self-contained/interruption-free positioning method and system thereof according to the present invention is to determine position information of a user on the earth's surface, wherein a display device is employed to provide location and surrounding information by accessing a map database with the user position information.

Another objective of the self-contained/interruption-free positioning method and system thereof according to the present invention is to provide a plurality of different applications, including person hand-held, air, road and rail, and water navigation, telecommunications, emergency response, oil exploration, mining, and many more.

Another objective of the self-contained/interruption-free positioning method and system thereof according to the present invention is to provide the following capabilities:

(a) Self-contained/interruption-free navigation.

(b) Autonomous position error$\leq$1% of the distance traveled when GPS RF (radio frequency) signals are not available.

(c) Low cost, low power consumption, lightweight.

(d) A unique sophisticated Kalman filter which removes the inherent drift of the free inertial positioning solution derived from the output of the low cost coremicro IMU by means of fusing information from the coremicro IMU, north finder, velocity producer, and an altitude measurement device.

(e) Smoothing of the output noise of the north finder, velocity producer, and an altitude measurement device.

(f) Innovative state variable selection and measurement design of the Kalman filter, including position update, relative position update, heading update, altitude update and autonomous zero velocity update.

(g) Autonomous multiple user stop tests and associated zero-velocity updates. The user is not required to stop to perform a zero-velocity update. But, if the user stops at will, the system can exploit such a benefit autonomously.

(h) Advanced IMU-------MEMS (MicroElectroMechanicalSystems) and ASIC (Application Specific Integrated Circuit) based coremicro™ IMU: Miniaturized (Length/Width/Height) and Lightweight; High Performance and Low Cost; Low Power Dissipation; Exceptional Improvement in Reliability.

(i) Map database and software module to access surrounding information using the current position solution.

(j) Display device and software module to visualize the location of the user and the surrounding information.

In order to accomplish the above objectives, the present invention provides a self-contained/interruption-free positioning method and system thereof, wherein a main IMU (Inertial Measurement Unit) based self-contained/interruption-free positioning module is committed to sense motion measurements of the user to produce self-contained/interruption-free positioning data of the user; a positioning assistant is incorporated to provide interruptible or intermittent or continuous positioning data to assist the main IMU based self-contained/interruption-free positioning module to achieve an improved self-contained/interruption-free positioning data of the user; and a wireless communication device is further built in to exchange the user position information with other users; and a display device is further attached to provide location and surrounding information by accessing a map database with improved self-contained/interruption-free positioning data of the user.

According to the present invention, the self-contained/interruption-free system can receive but not rely on GPS signals and DGPS (differential GPS) signals to achieve a highly accurate positioning solution. Without GPS/DGPS signals, the system also provides a highly accurate positioning solution, such as an accuracy of better than 1 percent of the distance traveled. The system is a right positioning system with reasonable size and weight and power consumption for commercial the earth's surface operation, which can be used in areas where GPS signals are not available, such as tunnels, forested areas, urbanized terrain, and high jamming environments.

DETAIL DESCRIPTION OF THE PREFERRED EMBODIMENT

Figure 1:
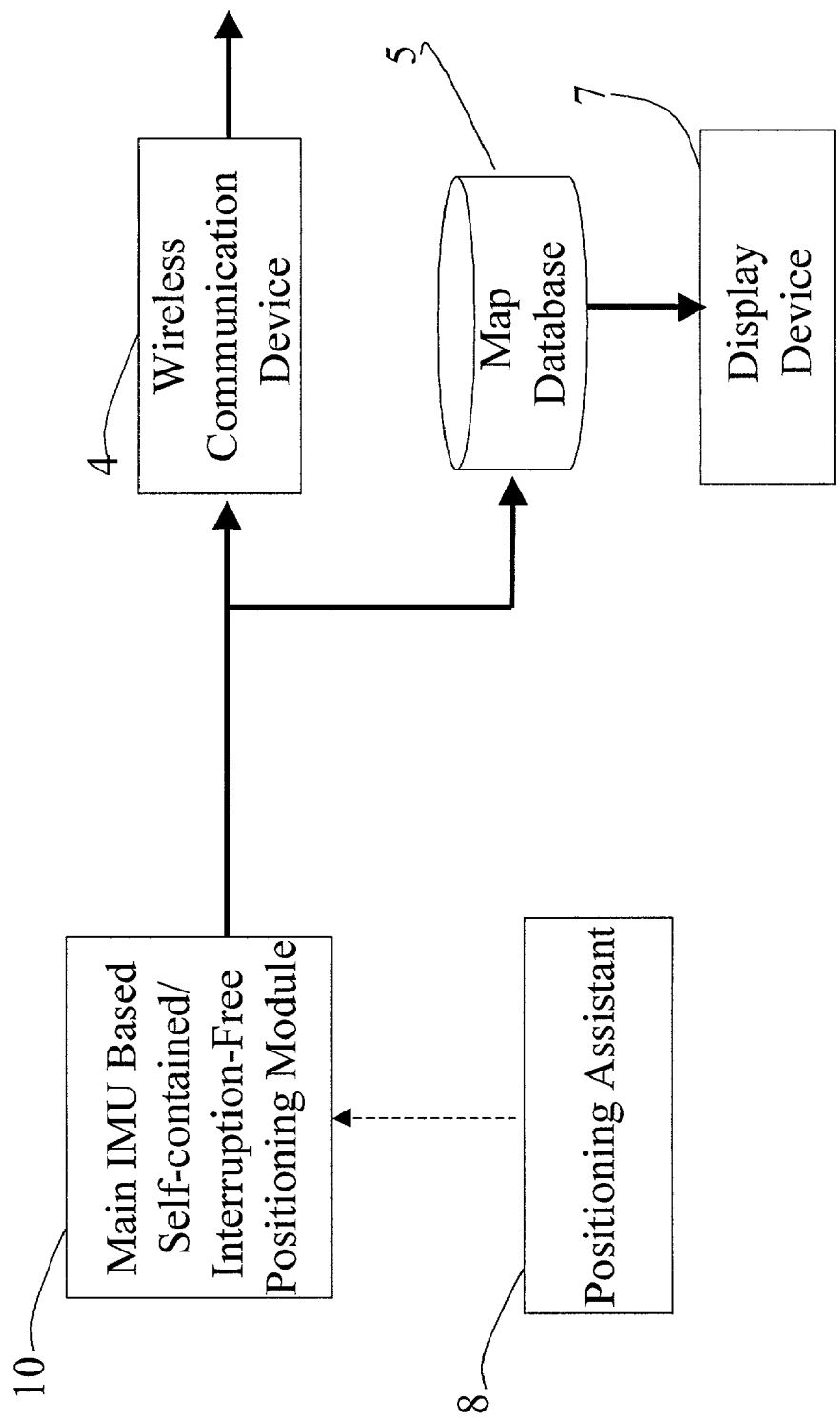
FIG. 1 is a block diagram illustrating a self-contained/interruption-free positioning method and system thereof according to a preferred embodiment of the present invention.

The present invention provides a self-contained/interruption-free positioning system for a user on the earth's surface, which comprises a main IMU (Inertial Measurement Unit) based self-contained/interruption-free positioning module which is utilized to sense motion measurements of the user and to produce self-contained/interruption-free positioning data of the user; a positioning assistant which is included to provide interruptible or intermittent or continuous positioning data to assist the main IMU based self-contained/interruption-free positioning module to achieve an improved self-contained/interruption-free positioning data of the user; a wireless communication device which is built in to exchange the user position information with other users; and a display device which is attached to provide location and surrounding information by accessing a map database with the user position information.

The user can be a person or an air, land, or water vehicle. The self-contained performance means that the system of the present invention functions without need of receiving any external RF (Radio Frequency) signals. The interruption free performance means that the system of present invention outputs position data at very high data rate, for example, 100 Hz. Moreover, the earth's surface includes land, water, and air inside the atmosphere.

It is worth to mention that rapid advance in MEMS technologies make it possible to fabricate low cost, light weight, miniaturized size, and low power angular rate sensors and accelerometers. "MEMS" stands for "MicroElectroMechanical Systems", or small integrated electrical/mechanical devices. MEMS devices involve creating controllable mechanical and movable structures using IC (Integrated Circuit) technologies. MEMS includes the concepts of integration of Microelectronics and Micromachining. Examples of successful MEMS devices include inkjet-printer cartridges, accelerometers that deploy car airbags, and miniature robots.

Microelectronics, the development of electronic circuitry on silicon chips, is a very well developed and sophisticated technology. Micromachining utilizes process technology developed by the integrated circuit industry to fabricate tiny sensors and actuators on silicon chips. In addition to shrinking the sensor size by several orders of magnitude, integrated electronics can be placed on the same chip, creating an entire system on a chip. This instrument will result in, not only a revolution in conventional military and commercial products, but also new commercial applications that could not have existed without small, inexpensive inertial sensors.

MEMS inertial sensor techniques offer tremendous cost, size, reliability, power consumption improvements for guidance, navigation, and control systems, compared with conventional inertial sensors. The applicant invented a coremicro™ IMU (Inertial Measurement Unit), which is "The world's smallest" IMU, and is based on the combination of solid state MicroElectroMechanical Systems (MEMS) inertial sensors and Application Specific Integrated Circuits (ASIC) implementation. The coremicro™ IMU is a fully self-contained motion-sensing unit. It provides angle increments, velocity increments, a time base (sync) in three axes and is capable of withstanding high vibration and acceleration. The coremicro™ IMU is opening versatile commercial applications, in which conventional IMUs can not be applied. They include land navigation, automobiles, personal navigators, robotics, air and marine vehicles, unmanned vehicles, various communication, instrumentation, guidance, navigation, and control applications.

The coremicro™ IMU which is only one cubic inch can be used in commercial the earth's surface applications, including hand-held, air, land, and water vehicles.

The coremicro™ IMU is preferred for the present invention. But, the present invention is not limited to the coremicro™ IMU. Any IMU device with such specifications can be used in the system of the present invention.

Referring to FIG. 1, a self-contained/interruption-free positioning system of a user on the earth's surface, comprises a main IMU based self-contained/interruption-free positioning module 10, a positioning assistant 8, a wireless communication device 4, a map database 5, and a display device 7.

The main IMU based self-contained/interruption-free positioning module 10 is adapted for sensing motion measurements of the user by the IMU and producing self-contained/interruption-free positioning data of the user.

The positioning assistant 8 is adapted for providing interruptible or intermittent positioning data of the user to assist the main IMU based self-contained/interruption-free positioning module to achieve an improved self-contained/interruption-free positioning data of the user.

The wireless communication device 4 is adapted for exchanging the improved self-contained/interruption-free positioning data with other users.

The map database 5 is adapted for providing map data to obtain surrounding information of location of the user by accessing the map database using the improved self-contained/interruption-free positioning data.

The display device 7 is adapted for visualizing the improved self-contained/interruption-free positioning data of the user using the surrounding information.

Figure 2:
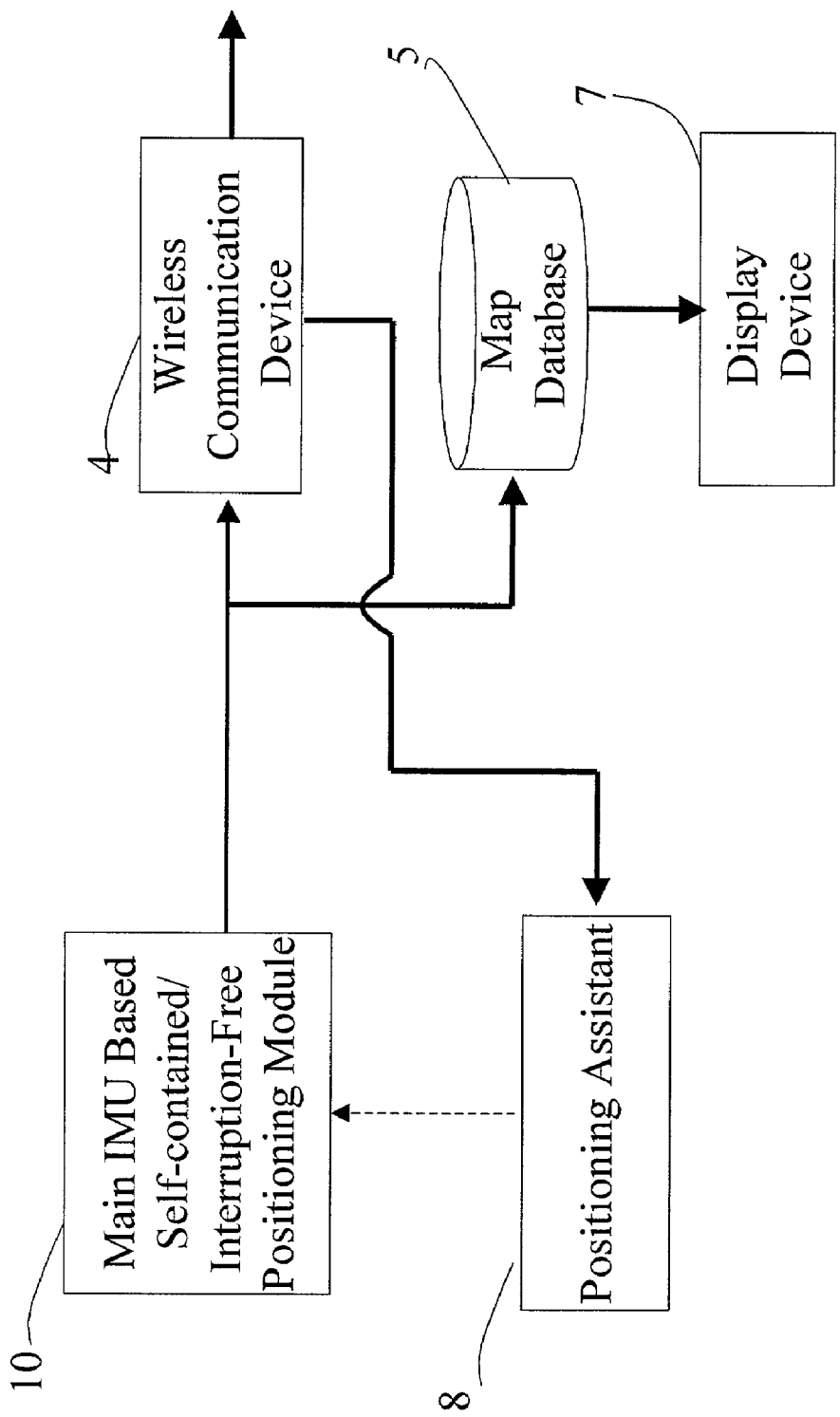
FIG. 2 is a block diagram illustrating a first alternative mode of the above preferred embodiment of the present invention.

If the positioning assistant 8 can output positioning data continuously, it can be applied to the present invention obviously. Referring to FIG. 2, the positioning assistant 8 is preferably a radio positioning system based on the wireless communication device 4.

If a conventional pure Inertial Navigation System (INS) method is applied to a MEMS-based IMU including the coremicro™ IMU to produce the self-contained/interruption-free positioning data, the self-contained/interruption-free positioning data can not be used in an extended period due to the drift of the self-contained/interruption-free positioning data. In the preferred system of the present invention, an inertial navigation system (INS) is built based on the coremicro™ IMU that is the core of the main IMU based self-contained/interruption-free positioning module 10.

Figure 5:
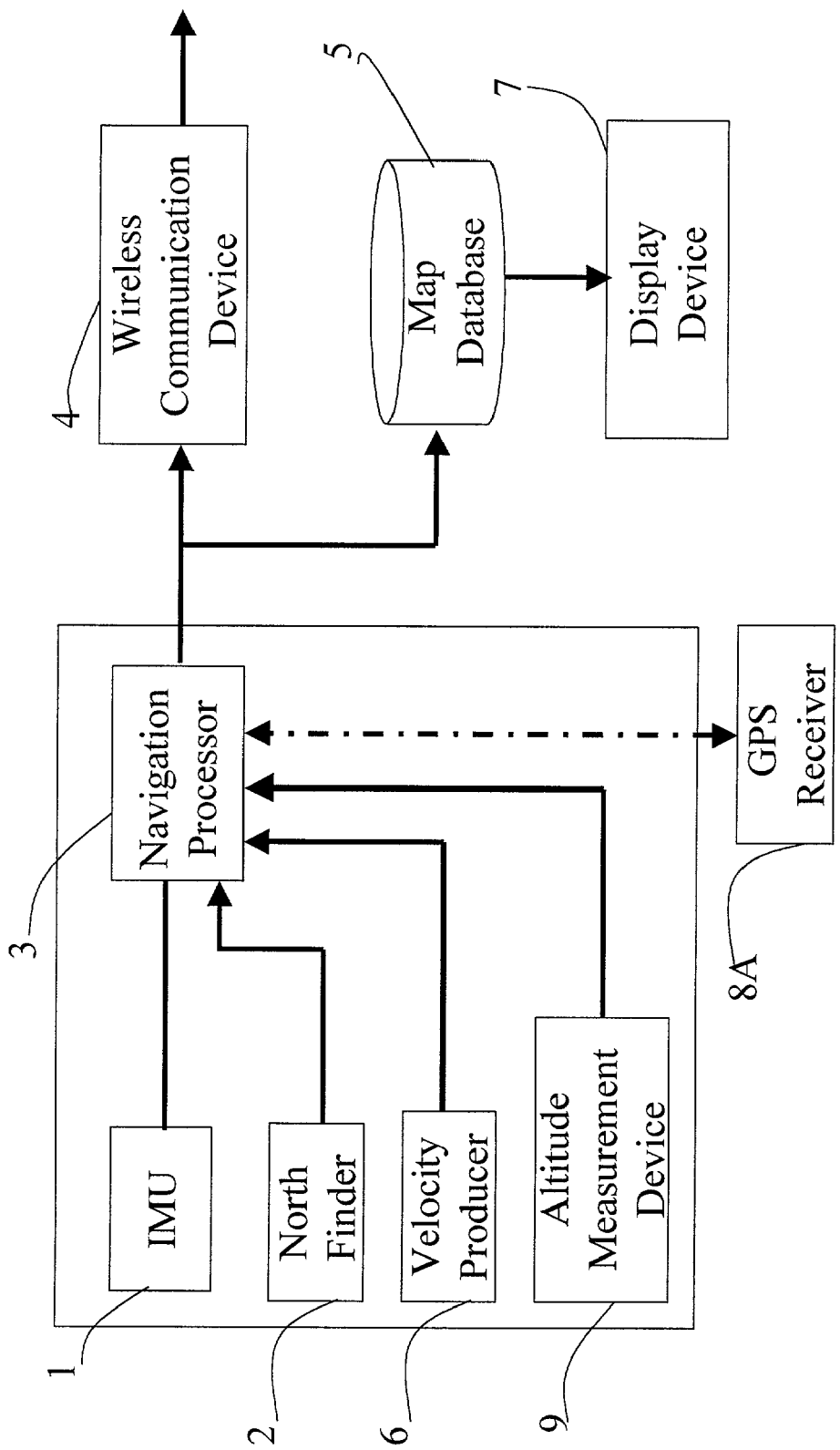
FIG. 5 is a block diagram illustrating the main IMU based self-contained/interruption-free positioning module according to the above preferred embodiment of the present invention.

To compensate for the drift error of the INS, multiple navigation sensors are integrated into the main self-contained/interruption-free positioning module 10, referring to FIG. 5, including:

an inertial measurement unit (IMU) 1, for sensing the traveling motions of the user so as to produce digital angular increments and velocity increments data in response to the user motion;

a north finder 2, for producing the heading measurement of the user;

a velocity producer 6, for producing velocity data in the body frame of the user with respect to ground;

an altitude measurement device 9, for produce altitude measurement of the user to form a mean sea level height of the user;

a navigation processor 3, connected with the inertial measurement unit 1, the north finder 2, the velocity producer 6, altitude measurement device 9, and positioning assistant 8, so as to receive the digital angular increments and velocity increments data, heading measurement, velocity data in the body frame, and interruptible or intermittent positioning data from the positioning assistant 8, performing the following:

producing IMU position, velocity, and attitude data using digital angular increments and velocity increments data;

producing optimal estimate of errors of IMU position, velocity, and attitude data, which are fed back to the inertial navigation processing module to correct the IMU position, velocity, and attitude data error to output the corrected IMU position, velocity, and attitude data as self-contained/interruption-free positioning data of the user or the improved self-contained/interruption-free positioning data of the user when the interruptible or intermittent positioning data from the positioning assistant 8.

The north finder 2 is used to measure the heading of the user. The velocity producer 6 is used to measure the relative velocity with respect to the ground. The altitude measurement device 9 is used to provide the user with a height measurement over Mean Sea Level (MSL).

An autonomous zero velocity updating method is used to autonomously compensate the INS errors. The velocity sensor and zero velocity updating are used to suppress the error growth of the INS based on the established INS error model and other sensor error models. An integration Kalman filter 35 is constructed in the navigation processor 3 to estimate and compensate the INS errors and sensor errors.

Figure 6:
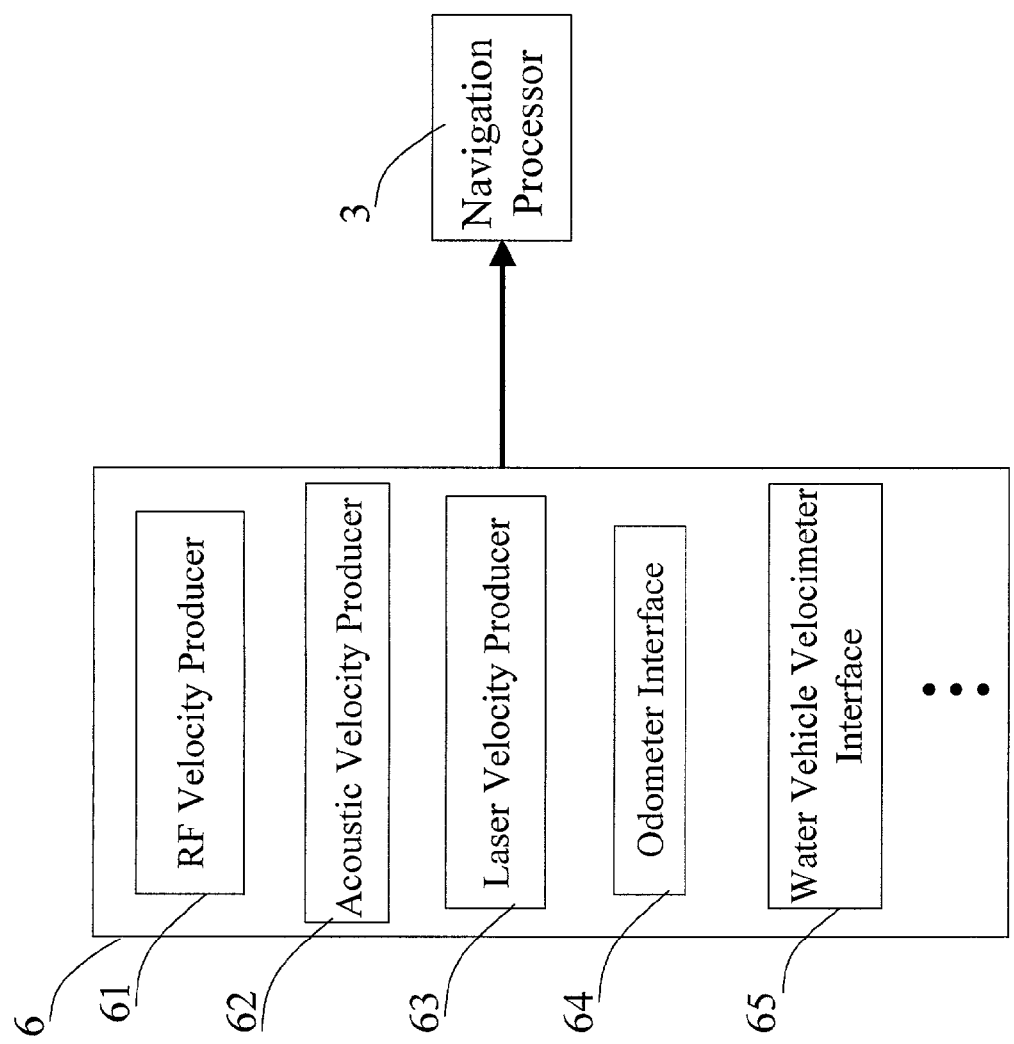
FIG. 6 is a block diagram illustrating the velocity producer according to the above preferred embodiment of the present invention.

The velocity producer 6 is used to produce velocity measurement of the user with respect to ground or water. Referring to FIG. 6, the preferred velocity producer 6 is based on the Doppler effect principal, including:

an RF (radio frequency) velocity producer 61, including a radar;

an acoustic velocity producer 62, including a sonar, and a laser velocity producer 63, including a laser radar.

Based on the Doppler effect, the velocity producer 6 can provide relative velocity measurements of the user to ground by sensing Doppler frequencies. The Doppler effect is a shift in the frequency of a wave radiated from the velocity producer 6 when reflected by an object in motion. In the case of the present invention, Doppler shifts are produced by the relative motion of the user and the ground from which the radio or laser or acoustic waves are reflected.

If the distance between the user and the ground is decreasing, the waves are compressed. Their wavelength is shortened and their frequency is increased. If the distance is increasing, the effect is just the opposite. The wave's Doppler frequency of the returned wave from the ground can be computed as $$f_d = 2\frac{V_R \cos L}{\lambda}$$

where
$f_d$=Doppler frequency of the ground returned wave, hertz
$V_R$=velocity of the user, feet (meters) per second
L=angle between $V_R$ and line of sight to the patch
γ=transmitted wavelength, same units as in $V_R$.

Referring to FIG. 6, the velocity producer 6 further comprises an odometer interface 64, so that the velocity producer 6 can input odometer measurement from an odometer installed in the vehicle when the system of the present invention is used for a land vehicle. The odometer measurement can be transformed to the relative velocity measurement of the user with respect to ground.

Referring to FIG. 6, the velocity producer 6 further comprises a water vehicle velocimeter interface 65, so that the velocity producer 6 can input velocity measurement with respect to water from a velocimeter installed in the water vehicle when the system of the present invention is used for a water vehicle.

Referred to FIG. 5, the positioning assistant 8 can be a GPS receiver 8A to receive interruptible GPS RF (radio frequency) signals to produce GPS raw measurements (pseudorange and range rate) or GPS position and velocity data of the user to the navigation processor 3, as well as GPS receiver status indication showing if the GPS raw measurements (pseudorange and range rate) or GPS position and velocity data of the user are available. If GPS signals can be available continuously, the continuous GPS raw measurements (pseudorange and range rate) or GPS position and velocity data are also incorporated in the present invention.

As shown in FIG. 6, the preferred real-time software running in the navigation processor 3 further comprises:

(4.1) an INS computation module 31, using digital angular increments and velocity increments signals from the IMU 1 to produce inertial positioning measurements, including IMU position, velocity, and attitude data;

(4.2) a magnetic sensor processing module 32, for producing the heading angle;

(4.3) a velocity processing module 33, for producing relative position error measurements for a Kalman filter 35;

(4.4) an altitude measurement processing module 34, for forming a mean sea level height in digital data type using the altitude measurement; and (4.5) an integration Kalman filter 35, for estimating errors of the inertial positioning measurements by means of performing Kalman filtering computation to calibrate the inertial positioning measurement errors.

The IMU 1 and the associated INS computation module 31 are the core of the navigator of present invention. The INS computation module 31 further comprises:

a sensor compensation module 311, for calibrating the error of the digital angular increments and velocity increments signals, which is not proportional to the user's motion; and an inertial navigation algorithm module 322, for computing the IMU position, velocity, and attitude data using the compensated digital angular increments and velocity increments signals.

Figure 10:
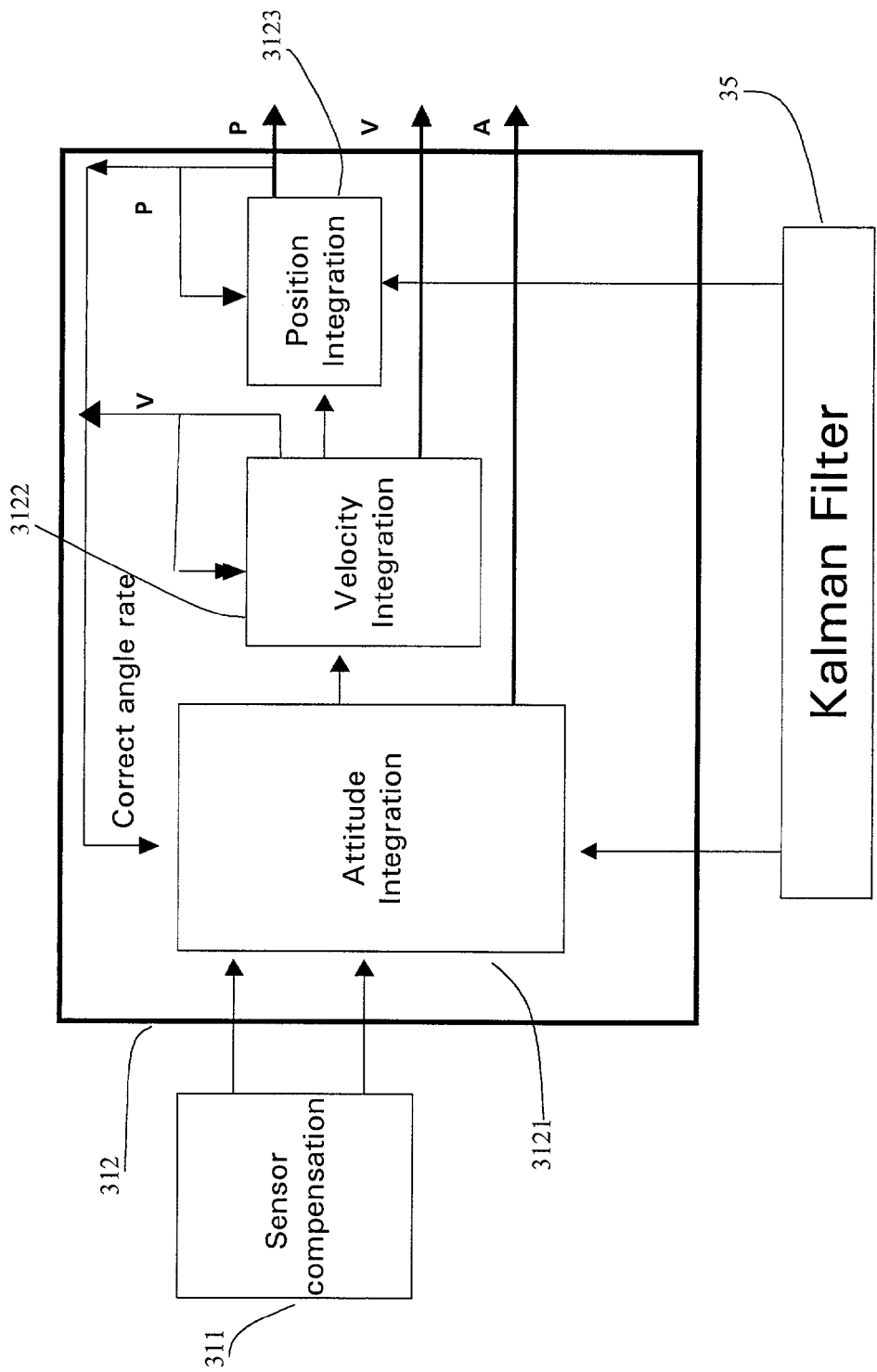
FIG. 10 is a block diagram illustrating processing modules of the inertial navigation processing according to the above preferred embodiment of the present invention.

FIG. 10 shows the inertial navigation algorithm module 322. While the INS provides a self-contained/interruption-free, non-radiating, and deterministic means for three-dimensional navigation with accurate short-term position information, it also exhibits an unbounded position error due to uncompensated gyro and accelerometer errors, especially for low quality IMU based INS systems. The external aiding information must be provided to enhance the long-term accuracy of the system. Multiple navigation sensors 1, 2, 6, and 9 in the present invention are used to aid the core INS. The north finder 2 aiding is used for heading updates. The velocity producer 6 and zero velocity updating are used to suppress the error growth of the INS position. Based on the established INS error model and other sensor error models, the integration Kalman filter 35 is constructed to estimate and compensate the INS errors and sensor errors. The integrated system of the present invention is used to determine the position of the user on the earth's surface.

Figure 3:
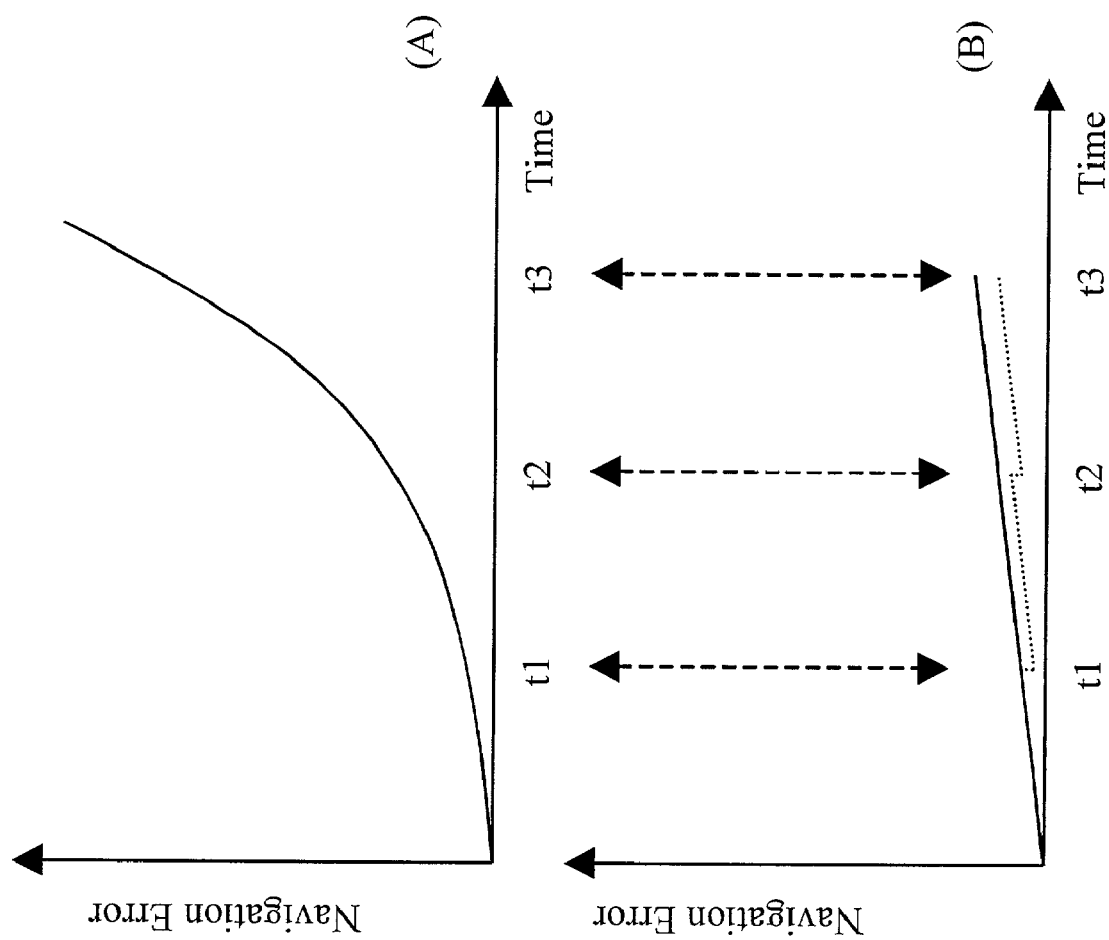
FIG. 3 shows characteristics comparison of a pure INS and an aided INS.

Referring to the block diagram of the system of the present invention as shown in FIG. 5, one of the key technologies in this present invention is the use of automatic zero-velocity updates to greatly reduce the accumulated navigation error when GPS signals are not available. The position error of an inertial navigation system (INS), which is a dead-reckoning system, increases with time with a pattern as shown in FIG. 3(A). The zero-velocity update technology uses the additional zero velocity information to reset the velocity measurement of the navigator, when the user stops. The periodic zero-velocity reset leads to a navigation error pattern as shown in FIG. 3(B).

With the zero-velocity reset and velocity aiding augmented with error estimation and compensation, the growth of the inertial navigation error is greatly reduced. Its navigation error pattern with time is given by the dotted line as shown in FIG. 3(B). The method of the present invention is effective to compensate the errors so as to maintain a navigation accuracy of better than 1% of distance traveled.

The preferred north finder 2 is a magnetic sensor, such as a magnetometer and flux valve, sensing the earth's magnetic field to measure the heading angle of the user.

Figure 11:
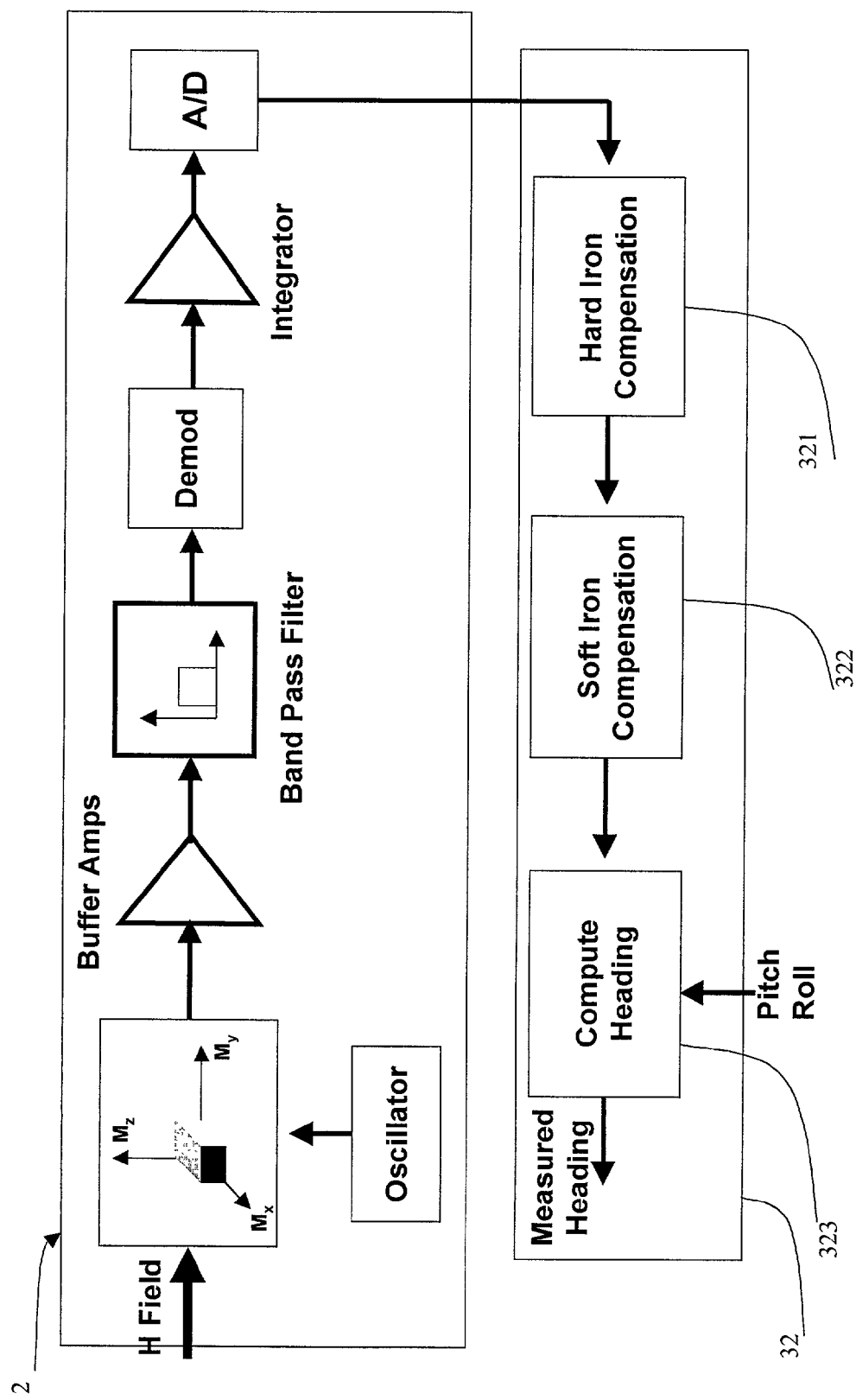
FIG. 11 is a block diagram illustrating the processing of the flux valve according to the above preferred embodiment of the present invention.

FIG. 11 is a block diagram depicting a magnetic sensor and the magnetic sensor processing module 32. The magnetic sensor detects the magnitude and direction of the earth's magnetic field and converts it to electrical information, which is used to obtain the magnetic north.

To obtain the true magnetic north, the earth's magnetic field measurement must be compensated using the measured field strengths, soft iron, and hard iron transformation matrices.

Ferrous metals in the user often magnetize over time, misdirecting magnetic compass readings. In addition, some devices also generate soft iron distortions. Soft iron can either misdirect or magnify existing magnetic fields, making calibration extremely difficult.

Figure 12:
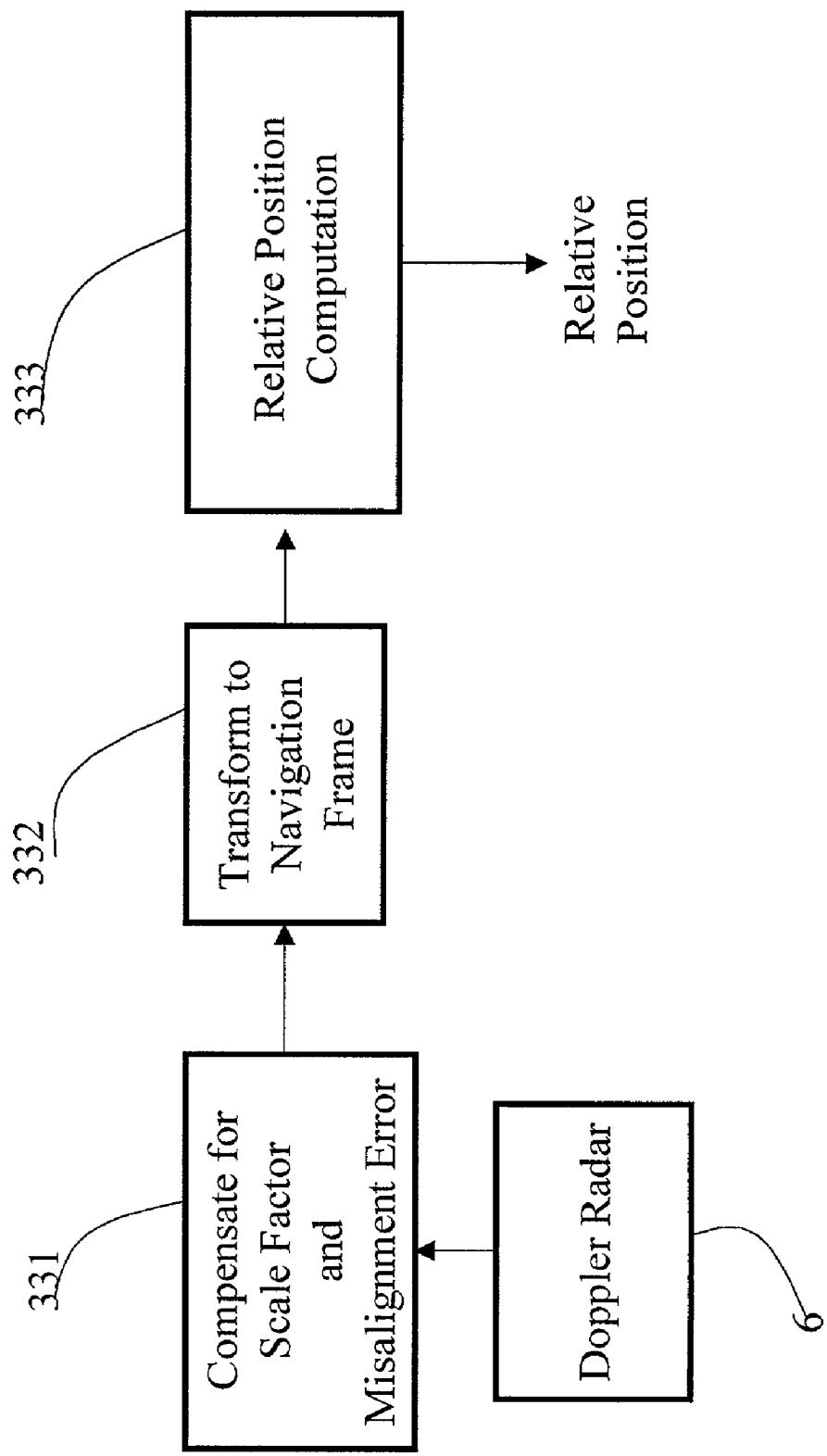
FIG. 12 is a block diagram illustrating the Doppler radar processing according to the above preferred embodiment of the present invention.

FIG. 12 is a block diagram depicting the velocity producer processing module 33.

Figure 7:
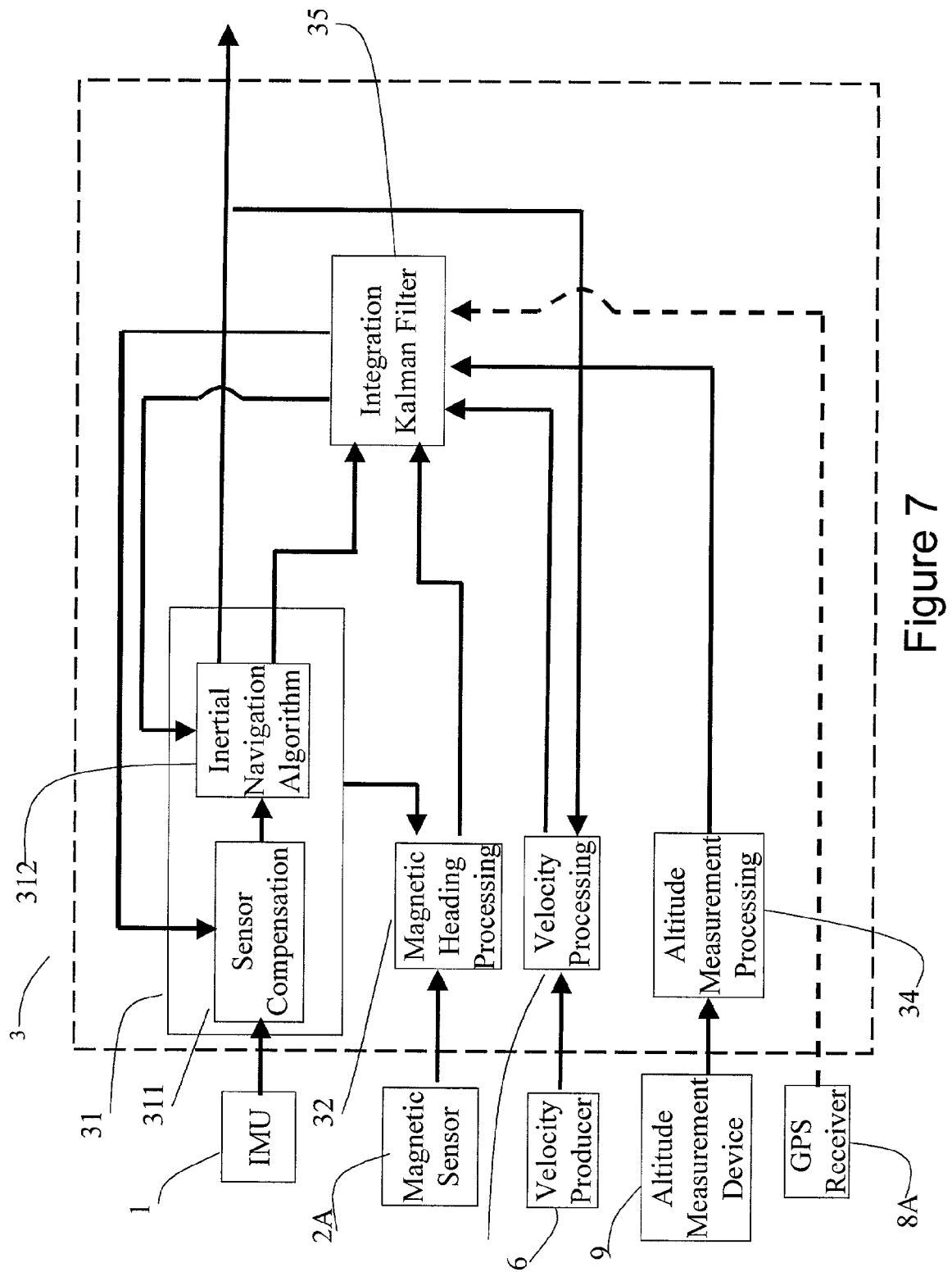
FIG. 7 is a block diagram illustrating the processing modules of the navigation processor of the second preferred embodiment of the system configuration of the present invention.

Referring to FIG. 7, the INS processing module 31 further comprises a sensor compensation module 311 and an inertial navigation algorithm module 312.

Because the installation of the gyros and the accelerometers in an IMU is not precisely in three orthogonal directions, the IMU data must be calibrated before it is applied to the inertial navigation algorithm module 312.

For example, currently, the MEMS IMU is an assembly of low accuracy MEMS silicon gyros and accelerometers. Because the MEMS sensor is very sensitive to temperature and acceleration, a set of special modules are devised in the sensor compensation module design.

The simplified error compensation for the MEMS gyro is expressed as:

$$\epsilon = \epsilon_{drift} + \epsilon_{misalign} + \epsilon_{nonorth} + \epsilon_{scale} + \epsilon_g + \epsilon_{random} + \epsilon_t(T)$$

This error compensation for the MEMS IMU errors is explained as follows.

(1) Stability error $\epsilon_{drift}$, also denoted as drift. Since the time constant is large for the MEMS gyro stability error, this effect is modeled as a constant bias.

(2) Misalignment error $\epsilon_{misalign}$. Misalignment is the difference between the actual orientation of the device sensitive axis and the intended orientation of that axis. This is a constant angular error and is normally kept small by precision mounting and calibrating techniques during installation.

(3) Non-Orthogonal error $\epsilon_{nonorth}$. This error refers to imprecision in assembling the MEMS IMU unit itself. The IMU consists of three micro gyros which are intended to be mounted perfectly along three orthogonal axes. Non-orthogonal error results when one gyro input axis leans into the plane containing the remaining two gyro input axes. This non-orthogonal gyro will detect a component of the angular rate about the other axes.

(4) Scale factor error $\epsilon_{scale}$. This error is calculated as a percentage of the true angular rate sensed by the MEMS rate sensor. Scale factors produce an error in the measured angular rate of a magnitude that is proportional to the true angular rate being measured. Scale factor errors can cause remarkable navigation errors at high angular rates.

(5) G sensitive error $\epsilon_g$. Gyro output variation due to accelerations incident on the device is called g-sensitive error. This produces a rate bias error proportional to the amount of specific force in a maneuver. The specific force is equal to the inertial acceleration of a body minus the gravitational acceleration.

(6) Random walk $\epsilon_{random}$. MEMS gyros are noisy sensors. In the inertial navigation system, the micro gyro acts as an integrator of the sensed angular rate. The actual sensor output of $\Delta\theta$ integrates the noise in the gyro output to produce a smoother signal that randomly wanders through a certain range of errors. Angle random walk is estimated by the compensation processing.

(7) Temperature sensitivity $\epsilon_t(T)$. The MEMS gyro is very sensitive to a change in temperature. It can even be regarded as a good thermometer. The temperature induced error must be removed by the navigation algorithm in the INS. Thus in the IMU error processing we must provide a temperature term which can produce the error data according to the temperature changes during system operation.

Similarly, the error compensation for the MEMS accelerometer is expressed as:

$$\nabla = \nabla_{drift} + \nabla_{misalign} + E_{nonorth} + \nabla_{scale} + \nabla_g + \nabla_{random} + \nabla_t(T)$$

The definition of the error terms in this accelerometer are also similar to that of the MEMS gyro.

Figure 4:
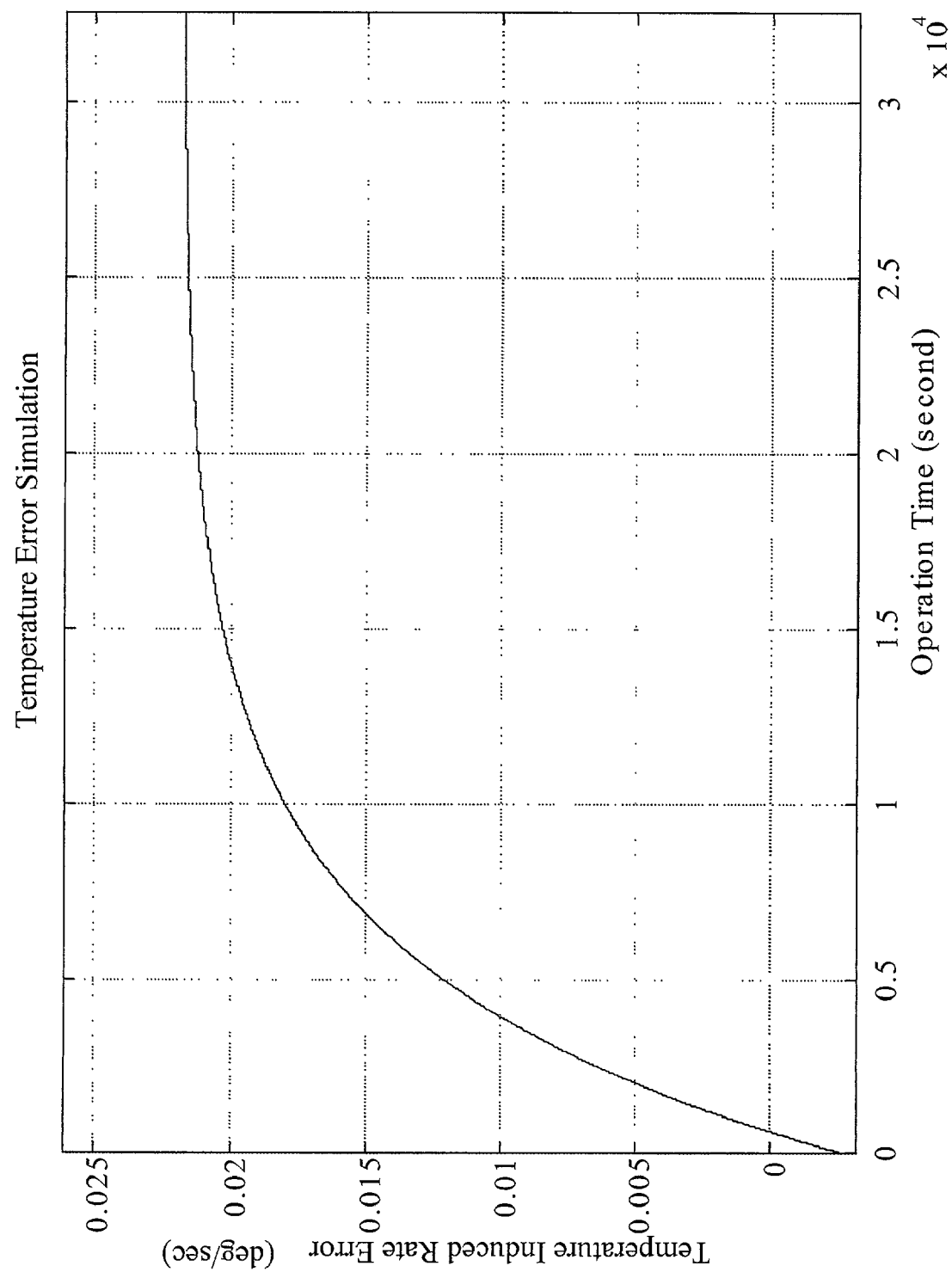
FIG. 4 shows characteristics of temperature induced error of a MEMS angular rate sensor.

In practice the temperature change of an IMU can be approximately described by the first order differential equation $$\dot{T} = -\frac{1}{t_c}(T - T_{bal})$$
$$T(0) = T_0$$

where T represents the IMU temperature, $T_0$ is the initial temperature, $t_c$ is the time constant, $T_{bal}$ is the balance temperature of the IMU. Parameters $t_c$ and $T_{bal}$ are determined by the heat transfer properties of the IMU and the environmental temperature, which can be found by calibration. The temperature induced error can be expressed as $$\epsilon_t = K_t(T - T_{nom})$$

where $T_{nom}$ is the nominal temperature at which the IMU is calibrated, and $K_t$ is the temperature error factor. FIG. 4 shows a typical temperature induced error of a MEMS gyro.

Referring to FIG. 10, the inertial navigation algorithm module 312 further comprises:

an attitude integration module 3121, for integrating the angular increments into attitude data;

a velocity integration module 3122, for transforming measured velocity increments into a suitable navigation coordinate frame by using the attitude data, wherein the transformed velocity increments are integrated into velocity data; and a position integration module 3123, for integrating the navigation frame velocity data into position data.

Referring to FIG. 11, the magnetic sensor processing module 32 for producing the heading angle further comprises:

a hard iron compensation module 321, for receiving the digital Earth's magnetic field vector and compensating the hard iron effects in the digital earth's magnetic field vector;

a soft iron compensation module 322, for compensating the soft iron effects in the digital earth's magnetic field vector; and a heading computation module 323, for receiving the compensated earth's magnetic field vector and pitch and roll from the inertial navigation algorithm module 312 and computing the heading data.

Referring to FIG. 12, the velocity producer processing module 33 for producing relative position error measurements for the Kalman filter module 35 further comprises:

a scale factor and misalignment error compensation module 331, for compensating the scale factor and misalignment errors in the velocity measurement;

a transformation module 331, for transforming the input velocity data expressed in the body frame to the velocity expressed in the navigation frame; and a relative position computation 333, for receiving the IMU velocity and attitude data and the compensated velocity to form the relative position measurements for the Kalman filter 35.

Figure 13:
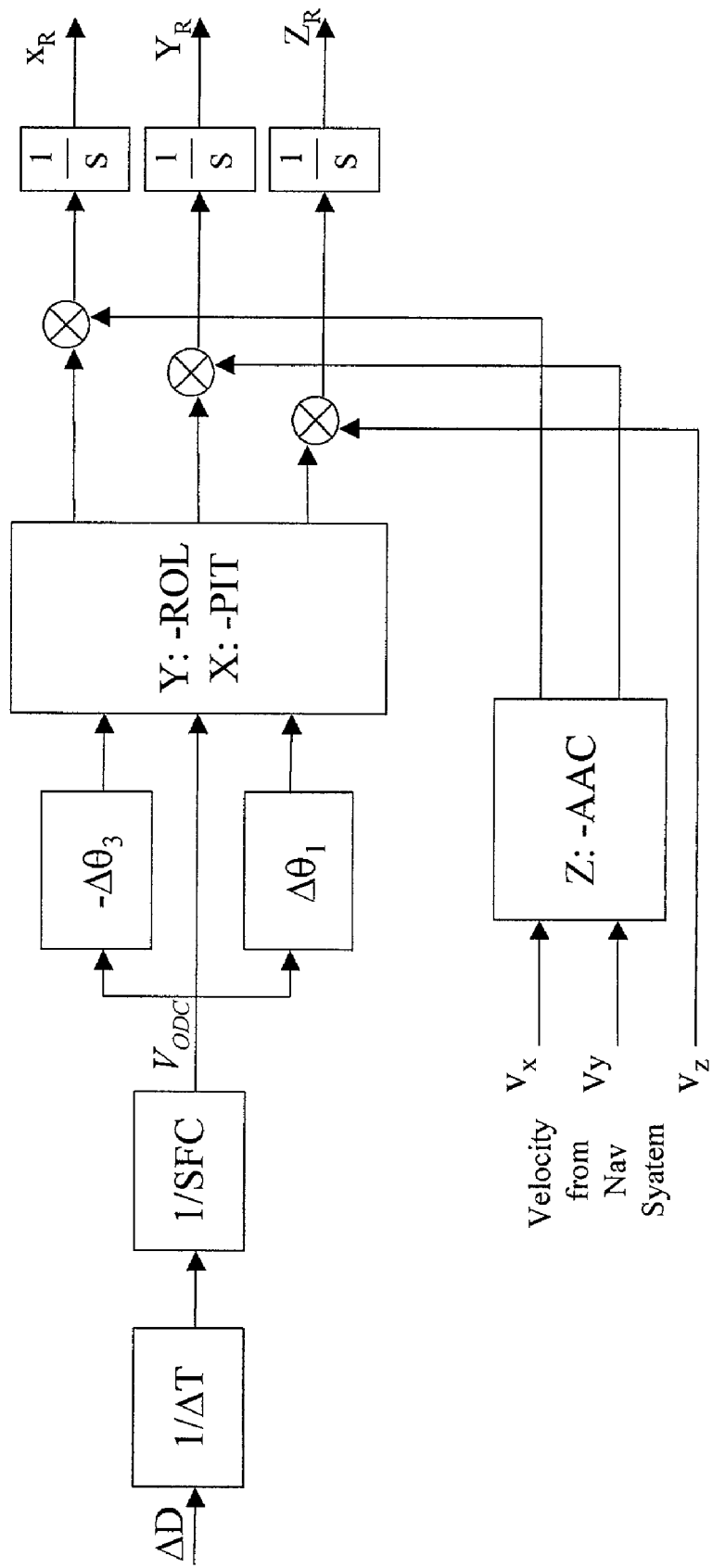
FIG. 13 is a block diagram illustrating the computation of the relative position measurements according to the above preferred embodiment of the present invention.

Referring to FIG. 6 and FIG. 13, the Kalman filter module 35 further comprises:

a motion test module 351, for determining if the user stops automatically;

a GPS integrity monitor 354, for determining if the GPS data is available; and a measurement and time varying matrix formation module 352, for formulating the measurement and time varying matrix for the state estimation module 353 according to the motion status of the user from the motion test module 351 and GPS data availability from the GPS integrity monitor 354.

The state estimation module 353, for filtering the measurements and obtaining the optimal estimates of the IMU positioning errors, including IMU position errors, velocity errors, and attitude errors.

In order to obtain optimal estimates of the IMU position errors, a set of error state equations must be established for the Kalman filter 35. We define the relationship between the reference/ideal system determined p platform and the actual/practical system determined platform pc as $$C_b^{pc} = C_p^{pc} C_b^p = (I + [\phi]) C_b^p$$

where I is the identity matrix. $[\phi]$ is the skew symmetric matrix form of vector $\phi$ $$[\phi] = \begin{bmatrix} 0 & \phi_z & -\phi_y \\ -\phi_z & 0 & \phi_x \\ \phi_y & -\phi_x & 0 \end{bmatrix}$$

Vector $\phi$ consists of three small angle errors between the reference/ideal system determined p platform and the actual/practical system determined platform pc:

$$\phi = \begin{bmatrix} \phi_x \\ \phi_y \\ \phi_z \end{bmatrix}$$

The gyro and accelerometer models are expressed as $$\omega_{tbc}^b = \omega_{tb}^b + \epsilon^b$$

$$f_c^b = f^b + \nabla^b$$

where $\epsilon^b$ and $\nabla^b$ are generalized gyro and accelerometer errors. Superscript b means the errors are expressed in the body or sensor frame.

Then, the generalized linear INS error model, with first order approximation, can be expressed as the following equations:

$$\Delta \dot{X} = \frac{\partial F_x(X)}{\partial X} \Delta X + \begin{bmatrix} [\phi]f^p + \nabla^p \\ O \end{bmatrix} + \begin{bmatrix} \Delta G^p \\ O \end{bmatrix}$$

$$\dot{\phi} = -\varepsilon^p - [\phi]\omega_{ip}^p + \Delta\omega_{ip}^p$$

$$= -\varepsilon^p - [\phi]\omega_{ip}^p + \frac{\partial F_\omega(X)}{\partial X}\Delta X$$

or in vector form $$\phi = \phi \times \omega_{ip}^p + \Delta\omega_{ip}^p - \varepsilon^p$$

where $$f^p = C_b^p f^b$$

$$\nabla^p = C_b^p \nabla^b$$

$$\varepsilon^p = C_b^p \varepsilon^b$$

This generalized INS error model can be used to derive specific error models for different system configurations.

In a preferred embodiment, the state estimation module 353 comprises:

(1) a horizontal filter 3531, for obtaining the estimates of the horizontal IMU positioning errors; and (2) a vertical filter 3532, for obtaining the estimates of the vertical IMU positioning errors.

The preferred state vector for the horizontal filter state vector comprises the following variables:

1. $\theta_x$ position error in x (rad)
2. $\theta_y$ position error in y (rad)
3. $\Delta v_x$ x velocity error (F/s)
4. $\Delta v_y$ y velocity error (F/s)
5. $\phi_x$ x tilt error (rad)
6. $\phi_y$ y tilt error (rad)
7. $\theta_z$ azimuth error (rad)
8. $\Delta x_R$ relative position error in x (FT)
9. $\Delta y_R$ relative position error in y (FT)
10. $\epsilon_x$ x gyro bias error (R/s)
11. $\epsilon_y$ y gyro bias error (R/s)
12. $\epsilon_z$ z gyro bias error (R/s)
13. $\Delta\theta$ velocity producer horizontal boresight (rad)
14. $\Delta SF$ velocity producer scale factor error The preferred state vector for the vertical filter state vector comprises the following variables:

1. $\Delta EL$=elevation error (FT)
2. $\Delta v_z$=z velocity error (F/s)
3. $\Delta Z_R$=z relative position error (FT)
4. $\Delta_{AZB}$=z accelerometer bias (F/s$^2$)
5. $\Delta\theta_v$=velocity producer vertical boresight (rad)

The state estimation module 353 from time to time receives the following external information:

(1) known position, obtained from the GPS receiver 8;

(2) known altitude, obtained from the altitude measurement device 9;

(3) known position change, obtained from the velocity processing module 33;

(4) position change equal to zero, obtained from the zero velocity update processing from the motion tests module 351; and (5) known heading, obtained from the magnetic sensor processing module 32.

The difference between measured velocity from the velocity producer 6 and the IMU velocity, both resolved into a "level body" coordinate, is rapidly integrated into 3 components of relative position.

When the GPS data is available at every Kalman update interval, for example, every 8 seconds, the x and y relative position, x and y difference between GPS position and INS position, and X and Y difference between GPS velocity and INS velocity are provided to the horizontal filter and the z relative position, z difference between GPS position and INS position, z difference between GPS velocity and INS velocity, and difference between the mean sea level height and INS altitude are provided to the vertical filter. The filters will then proceed to update and correct the IMU position.

When the GPS data is not available at every Kalman update interval, for example, every 8 seconds, the x and y relative position are provided to the horizontal filter. The z relative position and difference between the mean sea level height and INS altitude is provided to the vertical filter. The filters will then proceed to update and correct the IMU position.

The motion test module 351 determines if the user has stopped. If the user stops, a zero position change is applied to the Kalman filter. The definition of "stopped" is given in the following description. Suppose the Kalman filter update interval is 8 sec. The motion during the 8 sec period is analyzed to determine if the user "stopped" for the entire 8 sec. If so, the "stop" flag is set. To do the update with small measurement noise, the user must have been "stopped" for the proceeding 8 sec. Once the stop flag has been set, it may be reset as soon as motion is detected, which may be less than 8 sec. If the stop is reset, it may only be set by 8 continuous seconds of no motion.

The motion test module 351 comprises:

(1) a velocity producer change test module, for receiving the velocity producer reading to determine if the user stops or restarts;

(2) a system velocity change test module, for comparing system velocity change between the current interval and the previous interval to determine if the user stops or restarts;

(3) a system velocity test module, for comparing the system velocity magnitude with a predetermined value to determine if the user stops or restarts; and (4) an attitude change test module, for comparing the system attitude magnitude with a predetermined value to determine if the user stops or restarts.

For example, in the velocity producer change test, at the start of the candidate 8 sec interval, the velocity producer input pulses are summed as they are read in. If the absolute value of the accumulation ever exceeds a pre-determined value, such as 2 pulses, at any time in the 8 sec interval, stop is reset.

In the system velocity change test at every pre-determined period, for example, 2 seconds, the average x, y, z velocities (as determined by x, y, z position change in 2 seconds) are compared to the previous 2-second average x, y, z velocities, respectively. If any 2-sec change in any axis exceeds a predetermined value, for example, 0.1 ft/s, the entire 8-sec interval is defined as "not stopped". Note that a velocity of 0.1 ft/s for 2 sec corresponds to a 0.2 ft (or approximate 2 inch) of user disturbance which will be allowed.

In the system velocity test, if we assume an upper bound of 10 ft/s for the magnitude of system velocity error, we use these criteria:

Every 2 seconds compare the average x, y, z velocities with the upper bound of 10 ft/s. Reset stop if any velocity is greater in magnitude than upper bound of 10 ft/s.

In a tracked user with only one velocity producer and with the IMU mounted near the velocity producer, the user may turn by locking this track, giving no velocity producer output and small IMU velocities. This situation is detected by the attitude change test.

The total attitude change in any 2 second interval and in any 8 second interval must be less than 1 degree to set the stop.

The GPS integrity monitor 354 receives the GPS status indication from the GPS receiver 8 to determine if the GPS data is available.

Every update period of the Kalman filter (for example, 8 sec), the x, y, z relative position measurement is passed to the Kalman filter to perform an update. The scalar sigma squared=$[H][P][H^T]+R$ is an estimate of the covariance of this measurement and may be used to test the reasonableness of the magnitude of the measurement. Three such scalars are available, one for each axis.

There are many different altitude measurement devices, such as barometric device and radar altimeter. The barometric altimeter provides the user height above the Mean Sea Level (MSL). The radar altimeter provides the user height above the terrain. The height produced by a radar altimeter is called terrain altitude. To generate the user height above the MSL, the current position is used to query the map data base to obtain the terrain elevation above the MSL. The terrain altitude is added with the terrain elevation to obtain the MSL height of the user.

Referring to FIG. 1, a self-contained/interruption-free positioning method of the present invention for the earth's surface applications comprises the following steps:

(1) sensing motion measurements of the user by a main IMU (Inertial Measurement Unit) to produce digital angular increments and velocity increments signals in response to user motion, (2) providing interruptible positioning data to assist the main IMU based self-contained/interruption-free positioning module by a positioning assistant, (3) producing self-contained/interruption-free positioning data of the user using the motion measurements, and improving self-contained/interruption-free positioning data of the user when the interruptible positioning data is available, (4) exchanging the improved self-contained/interruption-free positioning data with other users by a wireless communication device, (5) providing map data to obtain surrounding map information of location of the user by accessing a map database using said improved self-contained/interruption-free positioning data, and (6) visualizing the improved self-contained/interruption-free positioning data of the user using said surrounding map information by a display device.

In the preferred application, the step (2) is disclosed as follows:

2A. deducing OPS raw measurements or GPS position and velocity data with GPS status indication by a GPS receiver.

In the preferred application, the step (2) is disclosed as follows:

2B. deducing positioning data through a wireless communication device.

Referring to FIG. 5, the step (3) comprises the following steps:

3.1 sensing the earth's magnetic field to measure the heading angle of the user by a magnetic sensor, 3.2 measuring the relative velocity of the user relative to the ground by a velocity producer, 3.3 measuring the altitude measurement of the user to form a mean sea level height of the user in digital type; and 3.4 blending the digital angular increments and velocity increments signals, heading angle, the relative velocity of the user relative to the ground, and the GPS raw measurements or GPS position and velocity data to produce optimal positioning data.

In order to improve the performance, after step (6), self-contained/interruption-free processing method of the present invention further comprises a step of:

aiding the code and carrier phase tracking processing of the GPS signals with the velocity and acceleration data to improve the anti-jamming and high-dynamics capability of the GPS receiver.

The step (3.4) further comprises the following preferred modules:

3.4.1 computing inertial positioning measurements using the digital angular increments and velocity increments signals;

3.4.2 computing the heading angle using the earth's magnetic field measurements, 3.4.3 creating relative position error measurements in the velocity producer processing module using the relative velocity of the user relative to the ground for a Kalman filter, 3.4.4 converting the altitude measurements to the mean sea level height of the user in digital type, and 3.4.5 estimating errors of inertial positioning measurements by means of performing Kalman filtering computation to calibrate the inertial positioning measurements.

In principle, step (3.4.1) can be called inertial navigation system processing. Inertial navigation is the process of calculating position by integrating velocity and computing velocity by integrating total acceleration. Total acceleration is calculated as the sum of gravitational acceleration, plus the acceleration produced by applied non-gravitational forces. In a modern INS, the attitude reference is provided by a software integration function residing in an INS computer using inputs from a three-axis set of inertial angular rate sensors. The angular rate sensor and accelerometer triad is mounted to a common rigid structure within the INS chassis to maintain precision alignment between each inertial sensor. Such an arrangement has been denoted as a strapdown INS because of the rigid attachment of the inertial sensors within the chassis, hence, to the user in which the INS is mounted.

The primary functions executed in the INS computation module 31 are the angular rate integration into attitude function, denoted as attitude integration, use of the attitude data to transform the measured acceleration into a suitable navigation coordinate frame where it is integrated into velocity, denoted as velocity integration, and integration of navigation frame velocity into position, denoted as position integration. Thus, three integration functions are involved, attitude, velocity, and position, each of which requires high accuracy to assure negligible error compared to inertial sensor accuracy requirements.

Therefore, step (3.4.1) further comprises the steps of:

3.4.1.1 integrating the angular increments into attitude data, referred to as attitude integration processing;

3.4.1.2 transforming the measured velocity increments into a suitable navigation coordinate frame by use of the attitude data, wherein the transferred velocity increments are integrated into velocity data, denoted as velocity integration processing, and 3.4.1.3 integrating the navigation frame velocity data into position data, denoted as position integration processing.

In the strapdown INS, a mathematical frame (or an imaginary frame) is introduced, which emulates the motion of a level platform, so it is also called the platform frame and denoted by P. The user velocity relative to the earth is represented in this mathematical frame. Written in the compact vector form, the velocity integration equation of the strapdown INS can be expressed as follows:

$$\dot{V} = f^P + G^P - (\omega_{ep}^P + 2\Omega_{ie}^P) \times V$$

where V is the user velocity relative to the earth, represented in the P frame.

$f^P$ is the specific force represented in the P frame, or the accelerometer output transformed to the mathematical platform.

$G^P$ is the gravitational acceleration represented in the P frame.

$\omega_{ep}^P$ is the angular velocity of the mathematical platform with respect to the earth frame expressed in the P frame.

$\Omega_{ie}^P$ is the earth rate represented in the P frame.

In order to obtain a definite velocity equation for the INS, we have to first define the motion of the mathematical platform.

The P frame in the strapdown INS is a level platform, so its angular position with respect to the local geographical frame (N frame) can be described by an azimuth angle α. The angular velocity of the platform with respect to the inertial frame can be expressed as:

$$\omega_{ip}^P = \omega_{np}^P + C_n^P \omega_{en}^n + C_n^P \Omega_{ie}^n$$

where $\omega_{np}^P$ is the angular velocity of the P frame with respect to the N frame.

$C_n^P$ is direction cosine matrix of the P frame relative to the N frame.

$\omega_{en}^n$ is the angular velocity of the local geographical frame (N frame) with respect to the earth frame (E frame).

Since the P frame is a mathematical platform, we are able to define its motion. Based on the above equation, we can obtain an equation to describe the motion of the P frame relative to the N frame:

$$\omega_{ipz}^p = \dot{\alpha} + \frac{tg\varphi}{R_n + h} v_x^n + \Omega \sin\varphi$$

We define $\omega_{ipz}^P$ to obtain different mechanization for the INS. In analogy to the gimbaled INS, we let $\omega_{ipz}^P=0$ to have a so-called free-azimuth system, or let $\omega_{ipz}^P=\Omega\sin\phi$ to have a so-called wander-azimuth system. Thus we have the motion of the mathematical platform defined.

For the free-azimuth system $$\dot{\alpha} = -\frac{tg\varphi}{R_n + h} v_x^n - \Omega\sin\varphi$$

For the wander-azimuth system $$\dot{\alpha} = -\frac{tg\varphi}{R_n + h} v_x^n$$

As long as the motion of the P frame is defined, we arrive at a definite velocity equation for the strapdown INS. Further, we can obtain a third-order, nonlinear, time-varying, ordinary differential equation as the INS velocity equation.

Expressed in geographical latitude and longitude, the position integration equation of the INS is written as $$\dot{\varphi} = \frac{v_y^n}{R_m + h} = \frac{1}{R_m + h}(v_x \sin\alpha + v_y \cos\alpha)$$

$$\dot{\lambda} = \frac{v_x^n}{(R_n + h)\cos\varphi} = \frac{1}{(R_n + h)\cos\varphi}(v_x \cos\alpha - v_y \sin\alpha)$$

It is noted that the longitude equation has a singularity at the earth's two poles. The longitude computation will become difficult in the polar areas. In practice, if the polar area navigation is required, we can introduce other position representation variables. For example, we can use the direction cosine matrix of the N frame relative to the earth centered earth fixed frame (ECEF frame), $C_e^n$, as the position variable. Then the position equation is expressed as:

$$\dot{C}_e^n = [\omega_{en}^n] C_e^n$$

This is a matrix differential equation. Where $[\omega_{en}^n]$ is the skew-symmetric matrix corresponding to the vector $\omega_{en}^n$. This differential equation has no singular point and from $C_e^n$, we can calculate the position represented in latitude and longitude. In this equation, however, $C_e^n$ has 9 elements but 3 degrees-of-freedom. Thus in the computation, a normalization procedure is required to keep the $C_e^n$ normalized. That is, at every integration step, we modify $C_e^n$, making it satisfy $$C_e^n C_e^{nT} = I$$

If we regard the INS velocity equation as a nonlinear, time-varying system, the specific force in the P frame, $f^P$, and the gravitational acceleration, $G^P$, can be regarded as the inputs to the system. If we ignore the gravity anomaly, the gravitational acceleration can be represented as $$G^P = \begin{bmatrix} 0 \\ 0 \\ g \end{bmatrix}$$

where g is the normal gravity that can be expressed as $$g = g_0 \left[ 1 - 2A\left(\frac{h}{a}\right) + B\sin^2\varphi \right]$$

where A=1+f+m
B=2.5 m−f
f=flattening of the reference ellipsoid.
m=$\Omega^2 a^2 b$/GM
$g_0$=equatorial gravity.
h=altitude
M=mass of the earth.
G=gravitational constant.

The specific force in the P frame, $f^P$, is the actual accelerometer output transformed into the mathematical platform:

$$f^P = C_b^P f^b$$

where $f^b$ is the accelerometer output vector or the specific force represented in the IMU frame (or the body frame). To carry out this transformation, the direction cosine matrix $C_b^P$ must be known. That is, the attitude of the IMU frame must be obtained. In the strapdown INS the attitude is obtained from high-speed computation. It is through the attitude computation and coordinate system transformation, that the mathematical platform is established. In the implementation of the strapdown INS, the attitude computation is the most critical issue.

In principle, there are many kinds of parameters used to represent the attitude of a rigid body. For example, Euler angles, direction cosine matrix, quaternion, Euler parameters, etc. In practice, the direction cosine matrix and the quaternion are the most frequently used attitude representations in the analysis and computations. Represented with the direction cosine matrix, the attitude differential equation is written as:

$$\dot{C}_p^b = [\omega_{pb}^b] C_p^b$$

This is a matrix differential equation. $[\omega_{pb}^b]$ is the skew-symmetric matrix corresponding to the vector $\omega_{pb}^b$ that is determined by the following equation:

$$\omega_{pb}^b = \omega_{ib}^b - \omega_{ip}^b$$
$$= \omega_{ib}^b - C_p^b(\omega_{ep}^p + C_n^p \Omega_{ie}^n)$$
$$= \omega_{ib}^b - C_p^b \omega_{ip}^p$$

where $\omega_{ib}^b$ is the output of the gyros in the IMU or the IMU angular velocity with respect to the inertial space represented in the IMU frame itself.

We can see that the attitude equation is a $9^{th}$-order, nonlinear, time-varying ordinary differential equation. In this equation, however, the $C_p^b$ has 9 elements but 3 degrees-of-freedom. Thus, in the computation, a normalization procedure is required to keep the $C_p^b$ normalized. That is, in every integration step, we modify $C_p^b$, making it satisfy $$C_p^b C_p^{bT} = I.$$

The quaternion representation is often used in the attitude computation because of its conciseness and efficiency. The quaternion attitude equation is expressed as:

$$\dot{\lambda} = \frac{1}{2} \omega \lambda$$

where $\lambda$ is the quaternion expressed in the column matrix form, and $\omega$ is the 4×4 matrix determined by the angular velocity $\omega_{pb}^b$.

$$\lambda = \begin{bmatrix} \lambda_0 \\ \lambda_1 \\ \lambda_2 \\ \lambda_3 \end{bmatrix}$$

$$\omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix}$$

The quaternion has 4 parameters to represent the body attitude, while a rigid body has only 3 degrees-of-freedom. Thus the components of the quaternion are constrained by the relationship:

$$\lambda_0^2 + \lambda_1^2 + \lambda_2^2 + \lambda_3^2 = 1$$

The quaternion satisfying this equation is called normalized. In the integration of the attitude equation, the normalization of the quaternion is also very simple. The relation between the quaternion and the direction cosine matrix is expressed as follows:

$$C_p^b = \begin{bmatrix} \lambda_1 \\ \lambda_2 \\ \lambda_3 \end{bmatrix} [\lambda_1 \ \lambda_2 \ \lambda_3] + \begin{bmatrix} \lambda_0 & \lambda_3 & -\lambda_2 \\ -\lambda_3 & \lambda_0 & \lambda_0 \\ \lambda_2 & -\lambda_0 & \lambda_0 \end{bmatrix}^2$$

To express the INS model in a compact form we introduce a vector defined as:

$$X = \begin{bmatrix} V \\ \alpha \\ \varphi \\ \lambda \end{bmatrix} = \begin{bmatrix} v_x \\ v_y \\ v_z \\ \alpha \\ \varphi \\ \lambda \end{bmatrix}$$

Then the INS computation model can be written as $$\dot{X} = F_x(X) + \begin{bmatrix} C_b^p f^b \\ O \end{bmatrix} + \begin{bmatrix} G^p \\ O \end{bmatrix}$$

$$\omega_{ip}^p = F_\omega(X)$$

$$\dot{C}_p^b = [\omega_{pb}^b] C_p^b$$

$$\omega_{pb}^b = \omega_{ib}^b - C_p^b \omega_{ip}^p$$

Figure 14:
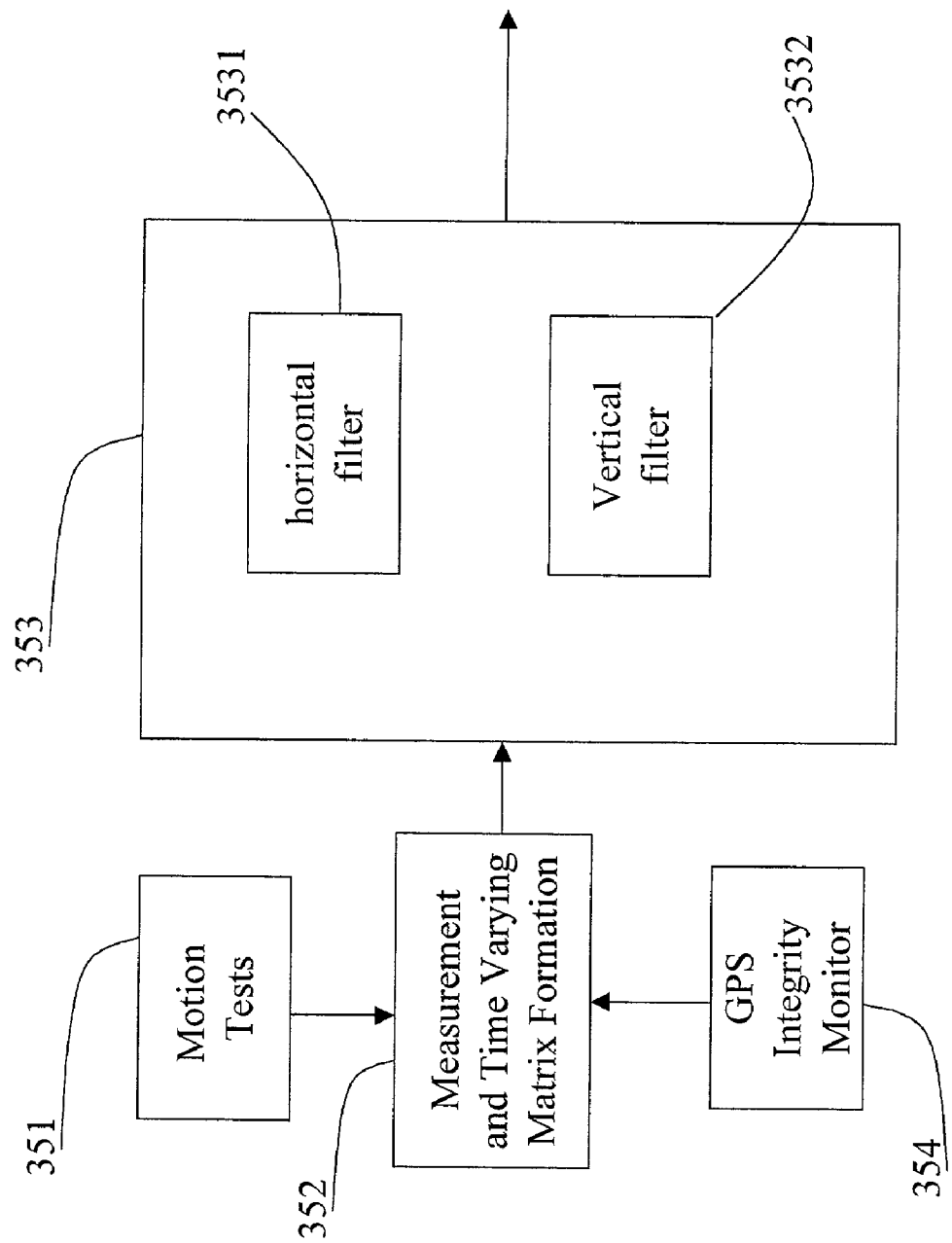
FIG. 14 is a block diagram illustrating the computation of the Kalman filter according to the above preferred embodiment of the present invention.

Referring to FIG. 14, the step (3.4.5) further comprises the steps of:

3.4.5.1 performing motion tests to determine if the user stops to initiate the zero-velocity update;

3.4.5.2 determining if GPS data available using the GPS state status indicator from the GPS receiver;

3.4.5.3 formulating measurement equations and time varying matrix for the Kalman filter; and 3.4.5.4 computing estimates of the error states using Kalman filter.

A flow diagram of the preferred implementation in step (3.3.3) to form the measurement is given in FIG. 13.

The variables and parameters in FIG. 10 are defined and described as follows:

ΔD, Doppler frequency pulses.

ΔT, time interval of high speed navigation/velocity producer loop.

ΔD/ΔT, velocity indicated by the velocity producer.

SFC, scale factor in pulse/(F/s).

$V_{ODC}$, computed velocity.

$\Delta\theta_1$ and $\Delta\theta_3$, horizontal and vertical velocity producer boresight estimates.

PIT and ROL, IMU pitch, roll.

$V_{x,y,z}$, navigation system (wander α) velocity.

AAC, sum of computer a and computer heading. The transformations using PIT, ROL, AAC must be current at high speed navigation rate.

Referring to FIG. 13, the step (3.4.3) further comprises the steps of:

(3.4.3.1) transforming the measured velocity relative to ground expressed in the body frame into the navigation frame;

(3.4.3.2) comparing the measured velocity relative to ground with the IMU velocity to form a velocity difference; and (3.4.3.3) integrating the velocity difference during the predetermined interval.

In the preferred application, the step (2) is disclosed as follows:

2C. deducing differential GPS positioning data through a GPS receiver and a data link.

It is well known that the receiver measurement noise for the L1 and L2 frequencies is about 1.9 mm and 2.4 mm, respectively, while the receiver measurement noise for P(Y) and C/A codes is about 0.3 m and 3 m, respectively. Therefore, the above embodiment of the present patent is enhanced with the differential GPS (DGPS) carrier phase method.

Figure 8:
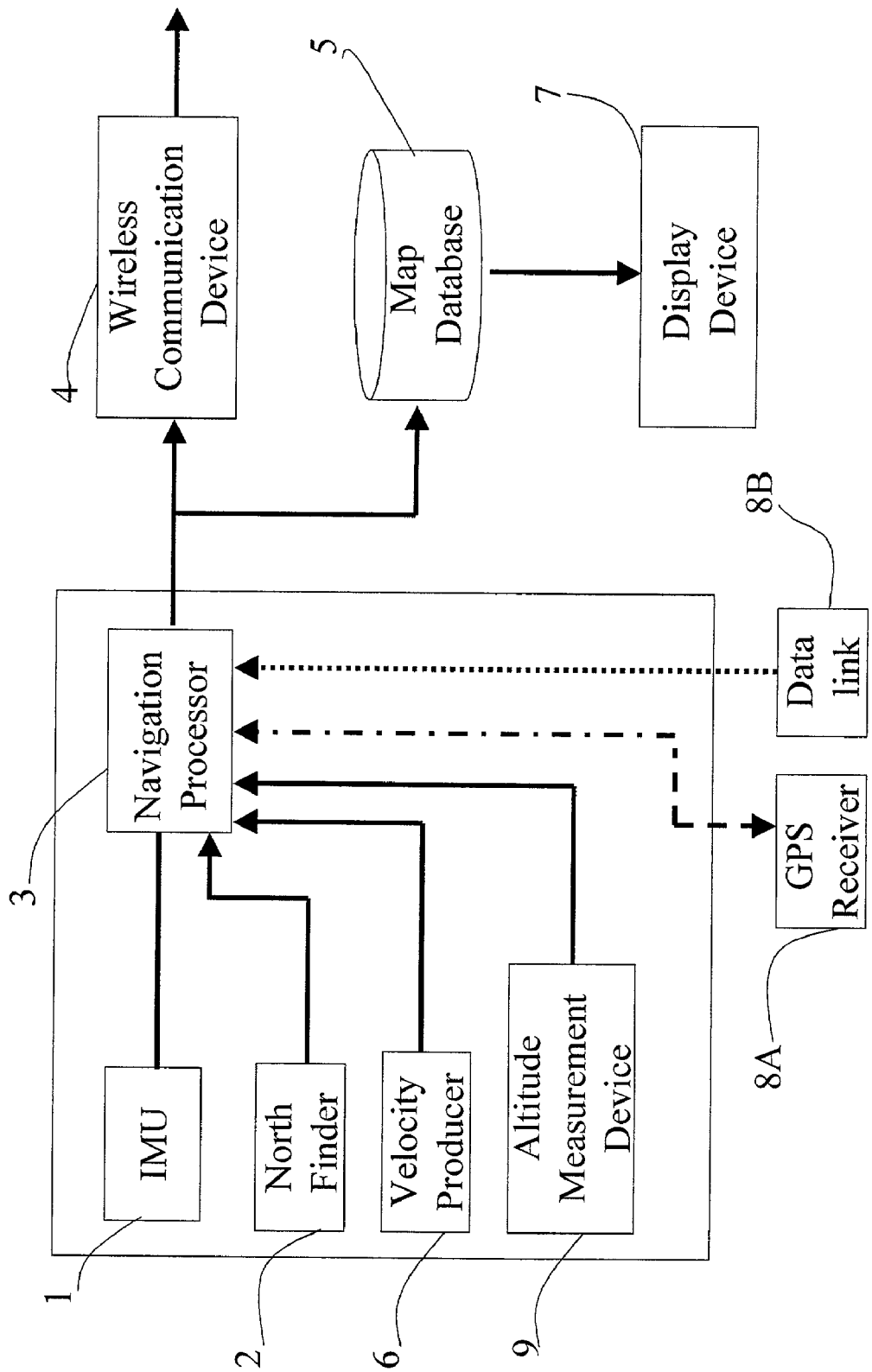
FIG. 8 is a block diagram illustrating a second alternative mode of the above preferred embodiment of the present invention.

Referring to FIG. 8, in order to exploit DGPS, the positioning assistant 8 further comprises:

(1) a GPS receiver 8A, called GPS rover receiver, for receiving GPS RF (radio frequency) signals to produce GPS raw measurements (pseudorange, range rate, and carrier phase) or GPS position and velocity data; and (2) a data link 8B, for receiving the position, velocity, and raw measurements (pseudorange and phase) from a GPS reference site to perform differential GPS positioning.

In order to improve the performance, velocity and acceleration data from the navigation processor are fed back to the GPS receiver to aid the code and carrier phase tracking of the GPS signals.

However, the high accuracy of positioning with GPS carrier phase measurements is based on the prior condition that the phase ambiguities have been resolved. The ambiguity inherent with phase measurements depends upon both the GPS receiver and the satellite. Under the ideal assumptions of no carrier phase tracking error and the known true locations of the receiver and satellite, the ambiguity can be resolved instantaneously through a simple math computation. However, there is the presence of satellite ephemeris error, GPS satellite clock bias, atmospheric propagation delay, multipath effect, receiver clock error and receiver noise in range measurements from the GPS code and phase tracking loops. Therefore, a phase ambiguities resolution is disclosed here to apply DGPS to the above embodiment.

The GPS receiver 8A receives GPS RF (radio frequency) signals from the GPS satellites and outputs the pseudorange, Doppler shifts, GPS satellite ephemerides, as well as atmospheric parameters to the Kalman filter 35.

Figure 9:
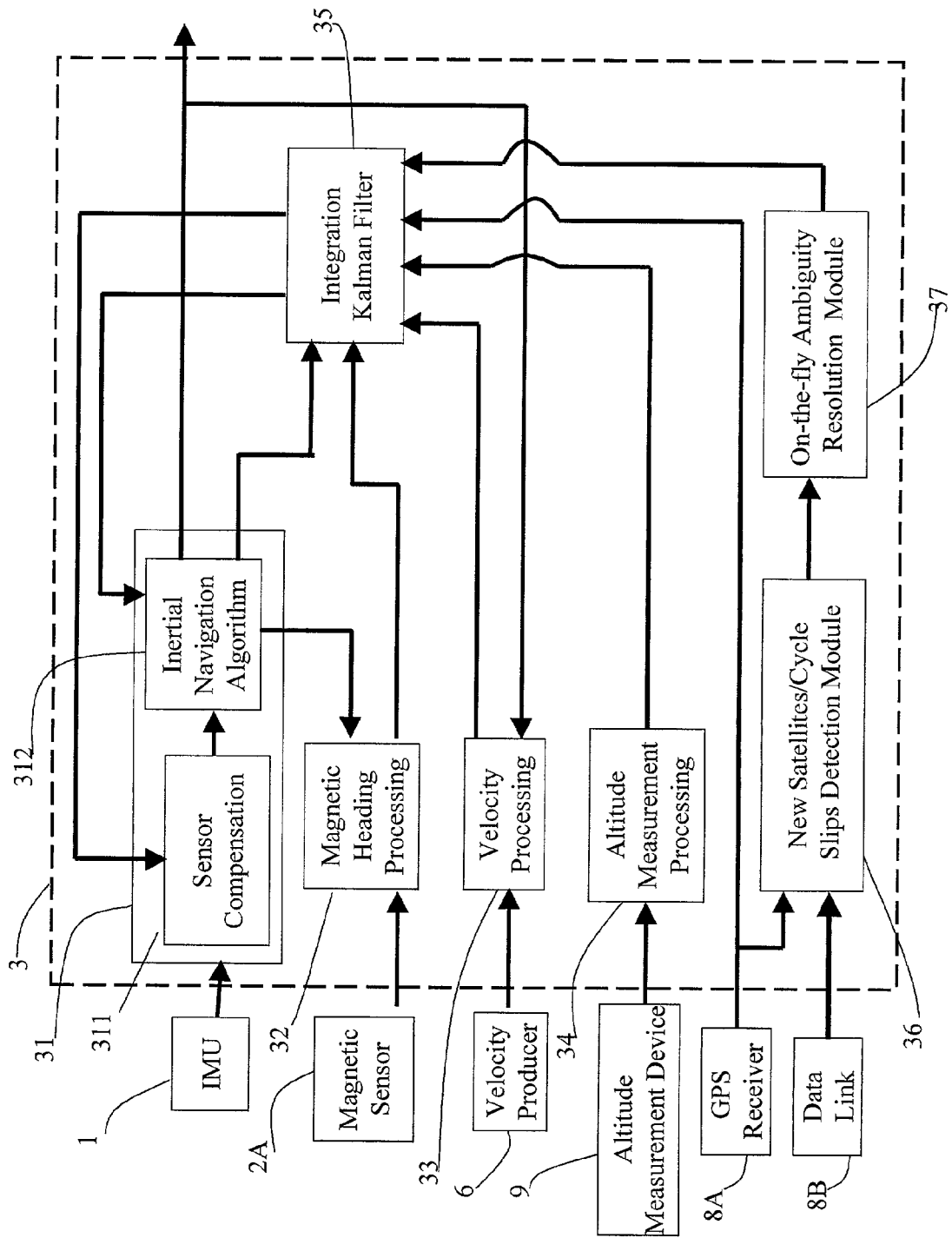
FIG. 9 is a block diagram illustrating the processing modules of the navigation processor including DGPS according to the above preferred embodiment of the present invention.

Correspondingly, referring to FIG. 9, the preferred real-time software running in the navigation processor 3 further comprises:

a new satellites/cycle slips detection module 36, receiving the GPS measurements from the GPS receiver 8A and GPS reference measurement from the data link 8B and determines if new GPS satellites come in view or cycle slips occur; and an on-the-fly ambiguity resolution module 37, receiving the GPS measurements from the GPS receiver 8A and GPS reference measurement from the data link 8B and is activated when new GPS satellites come in view or cycle slips occur to fix the ambiguity integer.

For GPS measurements, the double difference equations for L1 and L2 frequencies are (scalar equations)

$$P_{k_{mr}}^{ij} = \rho_{mr}^{ij} + \rho_{c_{mr}}^{ij} + \frac{I_{mr}^{ij}}{f_k^2} + T_{mr}^{ij} + d_{pc_{k_{mr}}}^{ij} + M_{P_{k_{mr}}}^{ij} + \varepsilon_{P_{k_{mr}}}^{ij}$$

$$\Phi_{k_{mr}}^{ij} = \rho_{mr}^{ij} + \rho_{c_{mr}}^{ij} + \lambda_k N_{k_{mr}}^{ij} - \frac{I_{mr}^{ij}}{f_k^2} + T_{mr}^{ij} + d_{pc_{k_{mr}}}^{ij} + M_{\Phi_{k_{mr}}}^{ij} + \varepsilon_{\Phi_{k_{mr}}}^{ij},$$

$$(k = 1, 2)$$

where $(\cdot)_{mr}^{ij}$ means double difference which is formed by $(\cdot)_m^i - (\cdot)_m^j - (\cdot)_r^i + (\cdot)_r^j$. The subscripts m and r denote two (reference and rover) receivers and the superscripts i and j represent two different GPS satellites. P and Φ are the pseudorange and phase range measurements, respectively. ρ is the geometric distance between the phase centers of two antennas (a GPS user's receiver and a GPS satellite) at the nominal time and $\rho_c$ refers to the correction of nominal geometrical distance. λ represents wavelength. $N_{mr}^{ij}$ is the double difference integer ambiguity.

$$\frac{I_{mr}^{ij}}{f_k^2}$$

is the double difference residual of the ionospheric effect for L1 or L2 frequency and $T_{mr}^{ij}$ denotes the double difference residual of the tropospheric effect. $d_{pc(\ )_{mr}}^{ij}$ refers as the double difference residuals of phase center variations. $M_{(\ )_{mr}}^{ij}$ denotes the double difference residuals of multipath effect. The definitions of the wide lane and narrow lane phase range measurements are $$\Phi_{w_{mr}}^{ij} = \frac{f_1}{f_1 - f_2} \Phi_{1_{mr}}^{ij} - \frac{f_2}{f_1 - f_2} \Phi_{2_{mr}}^{ij}$$

$$\Phi_{n_{mr}}^{ij} = \frac{f_1}{f_1 + f_2} \Phi_{1_{mr}}^{ij} + \frac{f_2}{f_1 + f_2} \Phi_{2_{mr}}^{ij},$$

respectively, and the corresponding integer ambiguities are $$N_{w_{mr}}^{ij} = N_{1_{mr}}^{ij} - N_{2_{mr}}^{ij},$$

$$N_{w_{mr}}^{ij} = N_{1_{mr}}^{ij} + N_{2_{mr}}^{ij}$$

respectively. Therefore, the frequencies for the wide lane and narrow lane ambiguities are equal to $f_w = f_1 - f_2$ and $f_n = f_1 + f_2$, respectively. Linearly combining the L1 and L2 equations and using tk to represent time at epoch k, the sequentially averaged approximated double difference wide lane ambiguity (real number) is expressed as $$\overline{N}_{n_{mr}}^{ij}(t_k) = \frac{\sum_{i=1}^{k} \tilde{N}_{w_{mr}}^{ij}(t_i)}{k} = \frac{(k-1)\overline{N}_{w_{mr}}^{ij}(t_{k-1}) + \tilde{N}_{w_{mr}}^{ij}(t_k)}{k} \quad (1)$$

and the approximated double difference narrow lane ambiguity (real number) is given by $$\tilde{N}_{n_{mr}}^{ij} \approx \left(\lambda_w N_{w_{mr}}^{ij} - \overline{\Phi}_{IS_{mr}}^{ij} + d_{pc_{n_{mr}}}^{ij} - d_{pc_{n_{mr}}}^{ij}\right)/\lambda_n, \quad (2)$$

-continued where $\tilde{N}_{w_{mr}}^{ij} \approx (\Phi_{w_{mr}}^{ij} - P_{n_{mr}}^{ij} - d_{pc_{w_{mr}}}^{ij} + d_{pc_{n_{mr}}}^{ij})/\lambda_w$, $$\overline{\Phi}_{IS_{mr}}^{ij}(t_k) = \frac{\sum_{i=1}^{k} \Phi_{IS_{mr}}^{ij}(t_i)}{k} = \frac{(k-1)\overline{\Phi}_{IS_{mr}}^{ij}(t_{k-1}) + \Phi_{IS_{mr}}^{ij}(t_k)}{k},$$

$\Phi_{IS_{mr}}^{ij} = \Phi_{w_{mr}}^{ij} - \Phi_{n_{mr}}^{ij}$ denotes the ionospheric signal observation, $$P_{n_{mr}}^{ij} = \frac{f_1}{f_1+f_2} P_{1_{mr}}^{ij} + \frac{f_2}{f_1+f_2} P_{2_{mr}}^{ij},$$

$$d_{pc_{n_{mr}}}^{ij} = \frac{f_1}{f_1-f_2} d_{pc_{1_{mr}}}^{ij} - \frac{f_2}{f_1-f_2} d_{pc_{2_{mr}}}^{ij}, \text{ and}$$

$$d_{pc_{n_{mr}}}^{ij} = \frac{f_1}{f_1+f_2} d_{pc_{1_{mr}}}^{ij} + \frac{f_2}{f_1+f_2} d_{pc_{2_{mr}}}^{ij}.$$

and $\lambda_n$ refer to the wavelengths of the wide lane and narrow lane ambiguities, respectively. Also, the ionosphere-free models for pseudorange and phase range are defined as $$P_{IF_{mr}}^{ij} = \frac{f_1^2}{f_1^2-f_2^2} P_{1_{mr}}^{ij} - \frac{f_2^2}{f_1^2-f_2^2} P_{2_{mr}}^{ij}$$

$$\Phi_{IF_{mr}}^{ij} = \frac{f_1^2}{f_1^2-f_2^2} \Phi_{1_{mr}}^{ij} - \frac{f_2^2}{f_1^2-f_2^2} \Phi_{2_{mr}}^{ij},$$

respectively.

Referring to FIG. 9, the on-the-fly ambiguity resolution module 37 is activated when the new satellites/cycle slips detection module 36 is on. And, therefore, the rover raw and Doppler shift measurements from the GPS receiver 8A and the reference raw measurements, Doppler shift measurements, position, and velocity from the data link 8B are input to the on-the-fly ambiguity resolution module 37 to fix the integer ambiguities. After fixing of the integer ambiguities, the integer ambiguities are passed to the Kalman filter 35 to further improve the measurement accuracy of the GPS raw data.

Figure 15:
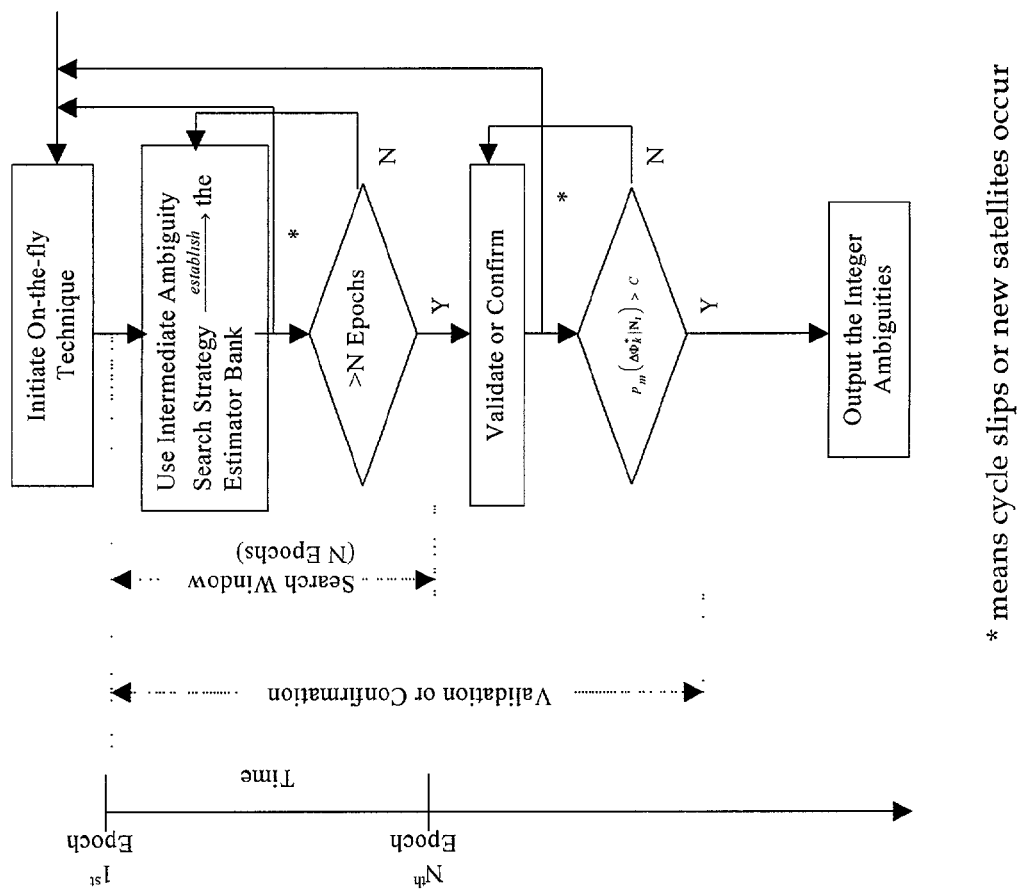
FIG. 15 is a flow diagram of the new process for on-the-fly ambiguity resolution technique of the present invention.

FIGS. 15, 16, 17, and 18 represent the method and process used for the on-the-fly ambiguity resolution module 37. FIG. 15 shows the process of the on-the-fly ambiguity resolution module 37. When the on-the-fly ambiguity resolution module 37 is on, a search window is set up. The search window comprises several time epochs (assumed N epochs). Within the search window, an intermediate ambiguity search strategy (IASS) is used to search an integer ambiguity set at each epoch.

The on-the-fly ambiguity resolution module 37 performs the following steps:

(a) initiating an on-the-fly ambiguity resolution module as the new satellites/cycle slips detection module is on, i.e., the new satellites or cycle slips occur;

(b) fixing integer ambiguities to estimate a more accurate user navigation solution, and (c) sending the selected integer ambiguities from the on-the-fly ambiguity resolution module 37 to the Kalman filter 35.

The above step (b) further comprises the steps of:

(b.1) using intermediate ambiguity search strategy (IASS) and estimator bank to set up an ambiguity set and determine the ambiguity integer; and (b.2) validating and confirming the ambiguity integer.

Basically, IASS comprises the "simplified" least-squares method and the extrawidelaning technique. Before using the least-squares method to search the ambiguities, the observable common satellites between two antennas (reference and rover) are divided into two groups:

the primary satellites. Since the double difference equations are used, the satellite with the highest elevation is defined as the reference satellite. The primary satellites include the next four higher elevation satellites, i.e., there are four independent double difference equations.

the secondary satellites, The rest of the observable satellites are categorized into the secondary satellites.

Figure 16:
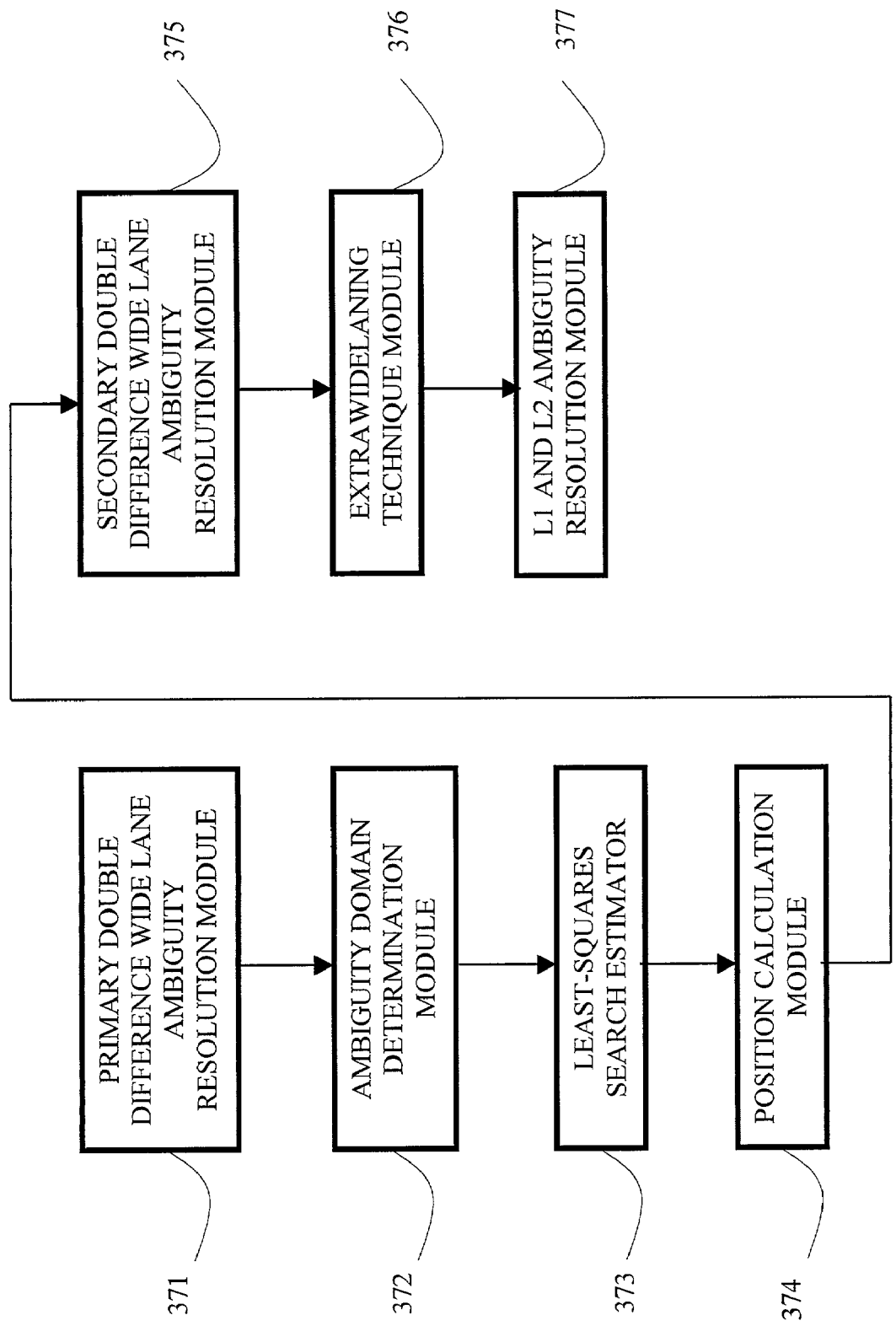
FIG. 16 is a flow diagram of intermediate ambiguity search strategy (IASS) according to the new process for the on-the-fly ambiguity resolution technique of the present invention.

As shown in FIG. 16, the IASS process comprises of a primary double difference wide lane ambiguity resolution module 371, an ambiguity domain determination module 372, a least-squares search estimator 373, a position calculation module 374, a secondary double difference wide lane ambiguity resolution module 375, an extrawidelaning technique module 376, and an L1 and L2 ambiguity resolution module 377.

The first step of the IASS is to resolve the primary double difference wide lane ambiguities in the primary double difference wide lane ambiguity resolution module. The a priori information about the rover position (obtained from ionosphere-free pseudorange measurements) and the approximated double difference wide lane ambiguities (Equation (1)) are combined with the primary double difference wide lane phase range measurements to form the simultaneous equations. Also, the a priori information about the rover position can be given by the output of the navigation processor 3. Use the minimum variance with a priori information to estimate the rover position and primary double difference wide lane ambiguities.

After the estimation of the primary double difference wide lane ambiguities, the estimated primary double difference wide lane ambiguities and the corresponding cofactor matrix are sent to the ambiguity domain determination module, wherein an ambiguity search domain is established based on the estimated double difference wide lane ambiguities and the corresponding cofactor matrix. The ambiguity search domain is sent to the least-squares search estimator. A standard least-squares search method is applied to search the ambiguity set in the least-squares search estimator. Also, the standard least-squares search method can be simplified to accelerate the ambiguity search. The "simplified" least-squares search method is defined as directly searching the ambiguity set, that minimizes the quadratic form of the residuals $$R_j = (\hat{x}_N - n_j)^T P_{\hat{x}_N}^{-1} (\hat{x}_N - n_j)$$

where $\hat{x}_N$ is the optimal estimate vector of the double difference wide lane ambiguities (real number), $n_j$ is the double difference wide lane ambiguity vector within the search domain (integer number), and $P_{\hat{x}_N}$ is the cofactor matrix corresponding to the optimal double difference wide lane ambiguity estimate, without using statistical or empirical tests (because the estimator bank will execute the task of confirmation).

The fixed primary double difference wide lane ambiguities are sent to the position calculation module to compute the rover position. The calculated rover position is sent to the secondary double difference wide lane ambiguity resolution module to fix the secondary double difference wide lane ambiguities by applying the primary wide-lane-ambiguity-fixed rover position solution into the secondary double difference wide lane phase measurements.

Substituting the resolved double difference wide lane ambiguities into Equation (2), the approximated double difference narrow lane ambiguities (real numbers) are calculated. The extrawidelaning technique states that if the wide lane ambiguity is even (or odd), the corresponding narrow ambiguity is even (or odd), and vice versa. Using the extrawidelaning technique, the narrow lane ambiguities can be resolved in the extrawidelaning technique module. Therefore, in the L1 and L2 ambiguity resolution module, the L1 and L2 ambiguities are calculated from the combination of the wide lane ambiguities and narrow lane ambiguities, which correspond to $$N_{1mr}^{ij} = \frac{N_{wmr}^{ij} + N_{nmr}^{ij}}{2} \text{ and } N_{2mr}^{ij} = \frac{N_{nmr}^{ij} - N_{wmr}^{ij}}{2},$$

respectively.

Figure 18:
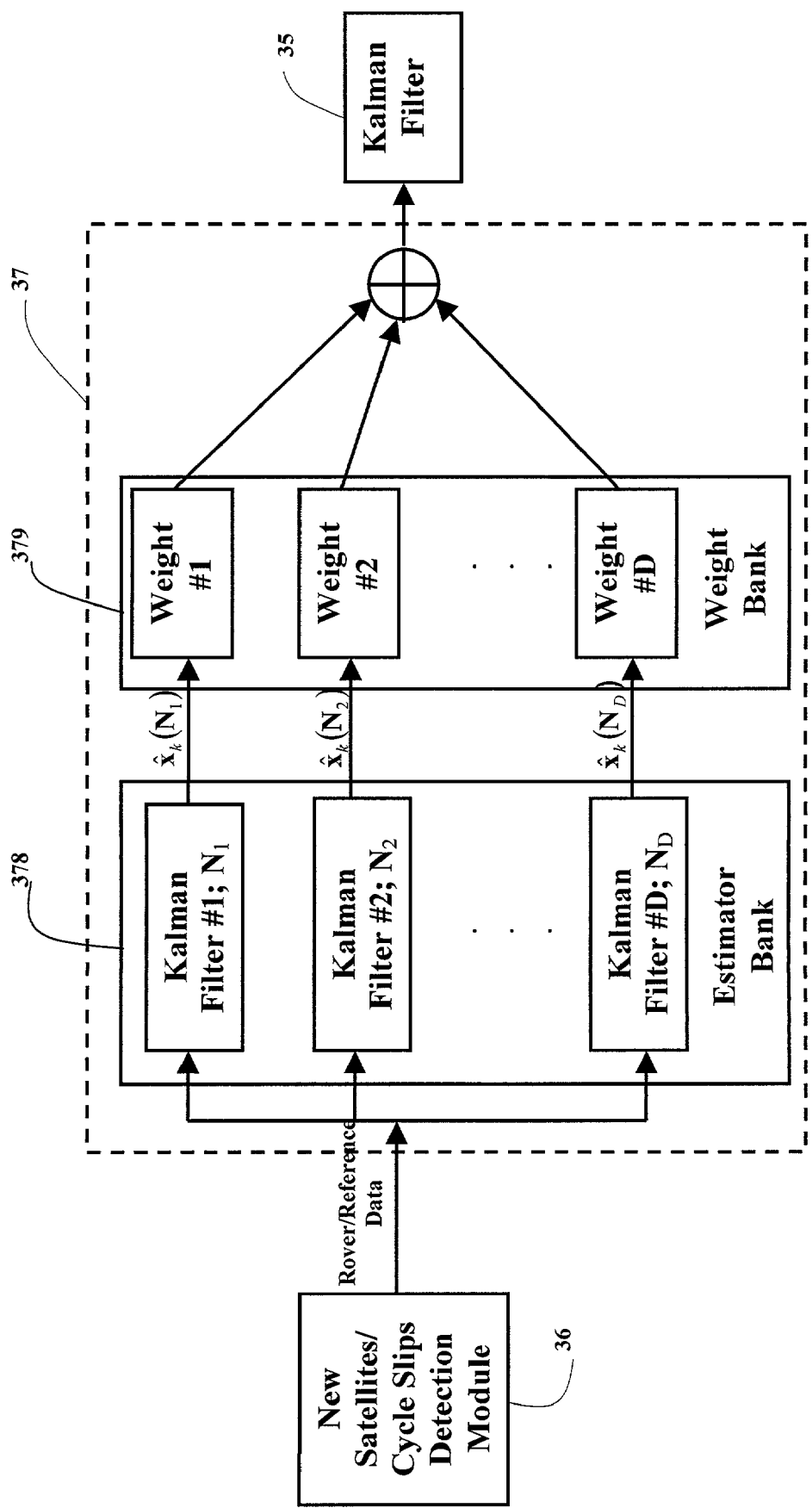
FIG. 18 is a complete form of the estimator bank according to the new process for the on-the-fly ambiguity resolution technique of the present invention.

Returning to FIG. 15, when the current ambiguity set from the IASS is different from the one(s) from the previous epoch(s), the current ambiguity set becomes a new member of an estimator bank 378 and a corresponding weight bank 379. When the current ambiguity set is the same as one of the previous ambiguity set(s) in the estimator bank 378, the number of Kalman filters in the estimator bank 378 remains. The complete form of the estimator bank 378 and weight bank 379 is depicted in FIG. 18.

Figure 17:
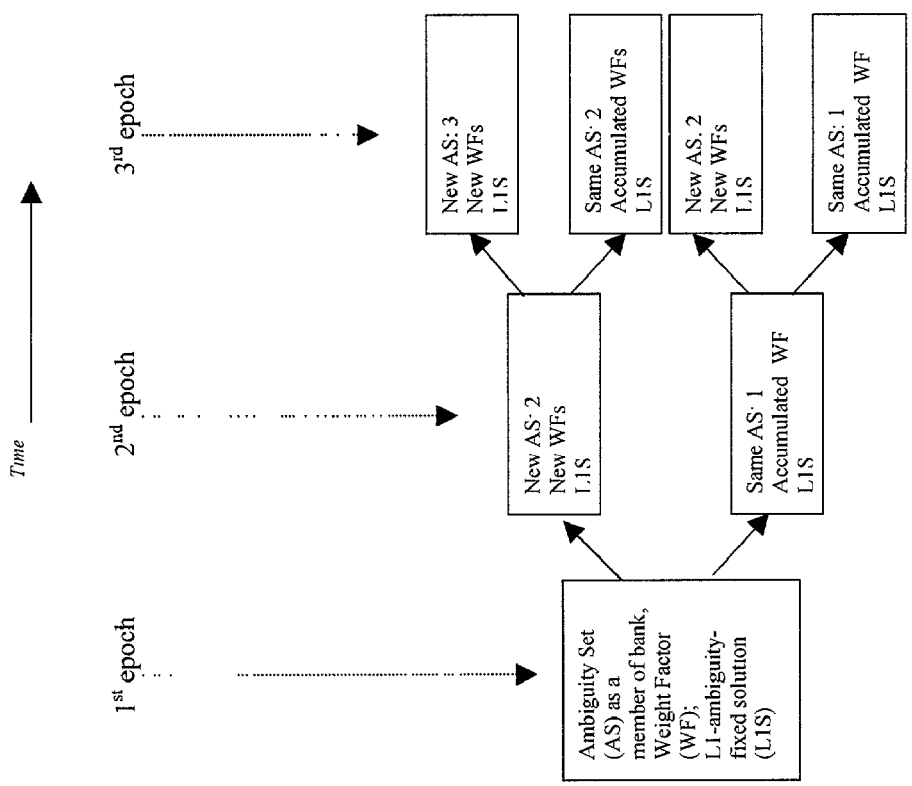
FIG. 17 is a block diagram of the procedure for forming the estimator bank according to the new process for no-the-fly ambiguity resolution technique of the present invention.

The process for establishing the estimator bank and weight bank is shown in FIG. 17 and comprises the following steps:

Search the integer ambiguity set at the first epoch of the search window by using the IASS. The integer ambiguity set becomes a member of the estimator bank because there is no member in the estimator bank 378 before the first epoch. Based on the ambiguity set and phase measurements, the rover position (ambiguity-fixed solution) is estimated, and then a corresponding weight is calculated in the weight bank. The calculation of the weight is according to $$p_m(N_i | \Delta\Phi_k^*) = \frac{p_m(\Delta\Phi_k^* | N_i)}{\sum_{j=1}^{D} p_m(\Delta\Phi_k^* | N_j)}, \quad i = 1, 2, \ldots, D \quad (3)$$

where $$p_m(\Delta\Phi_k^* | N_l) = p_m(\Delta\Phi_k | \Delta\Phi_{k-1}, \Delta\Phi_{k-2} \ldots, \Delta\Phi_l, N_l) p_m(\Delta\Phi_{k-1}^* | N_l), \quad (4)$$

and the first term of the product can be expressed as $$p_m(\Delta\Phi_k | \Delta\Phi_{k-1}, \Delta\Phi_{k-2}, \ldots \Delta\Phi_1, N_i) =$$
$$\frac{1}{\sqrt{(2\pi)^r \det(cov(\Delta\Phi_k))}} \cdot \exp\left(-\frac{\hat{z}_k^T cov(\Delta\Phi_k)^{-1} \hat{z}_k}{2}\right), \quad i = 1, 2, \ldots, D$$

which is assumed and defined as a Gaussian distribution. Equation (4) states the accumulative property of $p_m(\Delta\Phi_k^* | N_l)$, where $p_m(\Delta\Phi_k^* | N_l)$ represents the probability mass function of the measurement sequence $\Delta\Phi_k^* = \{\Delta\Phi_1,$ $\Delta\Phi_2, \ldots, \Delta\Phi_k\}$ up to the current time $t_k$ conditioned by the individual ambiguity set $N_l$. In other words, the calculation of the weight depends on not only the data of the current epoch but also the data of the previous epochs. $\det(\cdot)$ and $(\cdot)^{-1}$ denote the determinant and the inverse of a matrix, respectively. $\hat{z}_k$ is the optimal measurement residual (measurement value—the optimal computed value) at time $t_k$ and $cov(\Delta\Phi_k) = E\{\hat{z}_k \hat{z}_k^T\}$ is the covariance matrix of the measurement at the time $t_k$. r is the dimension of the measurement at each epoch. For the first epoch ($t_1$) (k=1) of the search window, Equation (4) (probability) becomes $$p_m(\Delta\Phi_1^* | N_i) = \frac{1}{\sqrt{(2\pi)^r \det(cov(\Delta\Phi_k))}} \cdot \exp\left(-\frac{\hat{z}_k^T cov(\Delta\Phi_k)^{-1} \hat{z}_k}{2}\right), \quad i = 1, 2, \ldots, D. \quad (5)$$

Of course, the value of the only weight (D=1 in Equation (3)) in the weight bank 379 is equal to one. The optimal rover position for this epoch is equal to the rover position multiplied by the corresponding weight. Based on the optimal rover position and the Doppler shifts, the rover velocity is estimated.

Search the ambiguity set by using the IASS at the second epoch of the search window. Two situations may occur:

2-1. When the integer ambiguity set is the same as the one of the previous epoch (epoch one), the number of the Kalman filters in the estimator bank 378 is still one, as shown in the lower part of FIG. 17. Based on the ambiguity set and the phase measurements (for epoch two), the rover position (ambiguity-fixed solution) can be estimated and the corresponding weight in the weight bank is calculated cumulatively (i.e. Equations (3) and (4), where D=1). The optimal rover position for epoch two is equal to the rover position multiplied by the associated weight (naturally, for this case the value of the weight is equal to one). Based on the optimal rover position and the Doppler shifts, the rover velocity is estimated.

2-2. When the integer ambiguity set is different from the one of the previous epoch (epoch one), the current ambiguity set becomes a new member of the estimator bank, i.e., the number of the Kalman filters in the estimator bank 378 is two, as shown in the upper part of FIG. 17. Based on each ambiguity set and the same phase measurements (for epoch two), the individual rover position (ambiguity-fixed solution) can be estimated and the calculation of each corresponding weight in the weight bank is based on Equations (3) and (5) (where D=2). In other words, when new ambiguity set is resolved, each corresponding weight in the weight bank 379 is calculated from scratch. The optimal rover position for epoch two is equal to the sum of the individual rover position multiplied by the associated weight. Based on the optimal rover position and the Doppler shifts, the rover velocity is estimated.

Follow the same procedure as described in step 2 for the rest of the epochs of the search window. At the last epoch (epoch N) of the search window, after the search of IASS, the estimator bank 378 and weight bank 379 are completely established (referred to FIG. 18).

Referring to FIG. 15, after the period of the search window, still, the phase measurements (reference and rover) are input into the complete estimator bank 378 (as shown in FIG. 18). As shown in FIG. 18, each Kalman filter in the estimator bank 378 has its own ambiguity set, which is selected by the IASS during the search window. Therefore, the number of the Kalman filters, D, in the estimator bank 378 is an arbitrary positive integer number which depends on the number of the different ambiguity sets from the search of the IASS during the search window. Based on each ambiguity set and the phase measurements, the individual rover position (ambiguity-fixed solution) can be estimated and each corresponding weight in the weight bank is calculated cumulatively (based on Equations (3) and (4)). Thus, the optimal rover position is equal to the sum of the individual rover position multiplied by the associated weight. Based on the optimal rover position and the Doppler shifts, the rover velocity is estimated. Follow the same procedure until a criterion is met. The criterion is defined as $$p_m(\Delta\Phi_k*|N_l)>C$$

where C denotes a very large uncertainty to make sure that the ambiguity set is robust enough. After the criterion is met, the estimator bank 378 and weight bank 379 stop functioning and output the selected integer ambiguities into the Kalman filter (referred to FIG. 18). During the confirmation period (from the first epoch of the search window to the epoch when the estimator bank 378 and weight bank 379 stop functioning), the estimator bank 378 and the weight bank 379 identify the correct integer ambiguity set and estimates the rover position in real time. One important characteristic of the estimator bank 378 and weight bank 379 is that the weight in the weight bank corresponding to the correct integer ambiguity in the estimator bank 378 is approaching one while the others (corresponding to the rest of the ambiguity sets) are converging to zero. Therefore, the correct (selected) integer ambiguity set is the one with the weight close to one. During the whole procedure, when new satellites or cycle slips occur, the on-the-fly ambiguity resolution module 37 will be initiated (on).

The preferred IMU 1 is a micro MEMS IMU in which a position and attitude processor is built in. The position and attitude processor can replace the above disclosed INS computation module 31. The micro IMU is disclosed as follows.

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

High cost,
Large bulk (volume, mass, large weight),
High power consumption,
Limited lifetime, and
Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers are the force rebalance type that use closed-loop capacitive sensing and electrostatic forcing. Draper's micromechanical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

Low cost,
Micro size
Lightweight
Low power consumption
No wear/extended lifetime
Instant turn-on
Large dynamic range
High sensitivity
High stability
High accuracy To achieve the high degree of performance mentioned above, a number of problems need to be addressed:

(1) Micro-size angular rate sensors and accelerometers need to be obtained. Currently, the best candidate angular rate sensor and accelerometer to meet the micro size are MEMS angular rate sensors and MEMS accelerometers.

(2) Associated mechanical structures need to be designed.

(3) Associated electronic circuitry needs to be designed.

(4) Associated thermal requirements design need to be met to compensate the MEMS sensor's thermal effects.

(5) The size and power of the associated electronic circuitry needs to be reduced.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Figure 19:
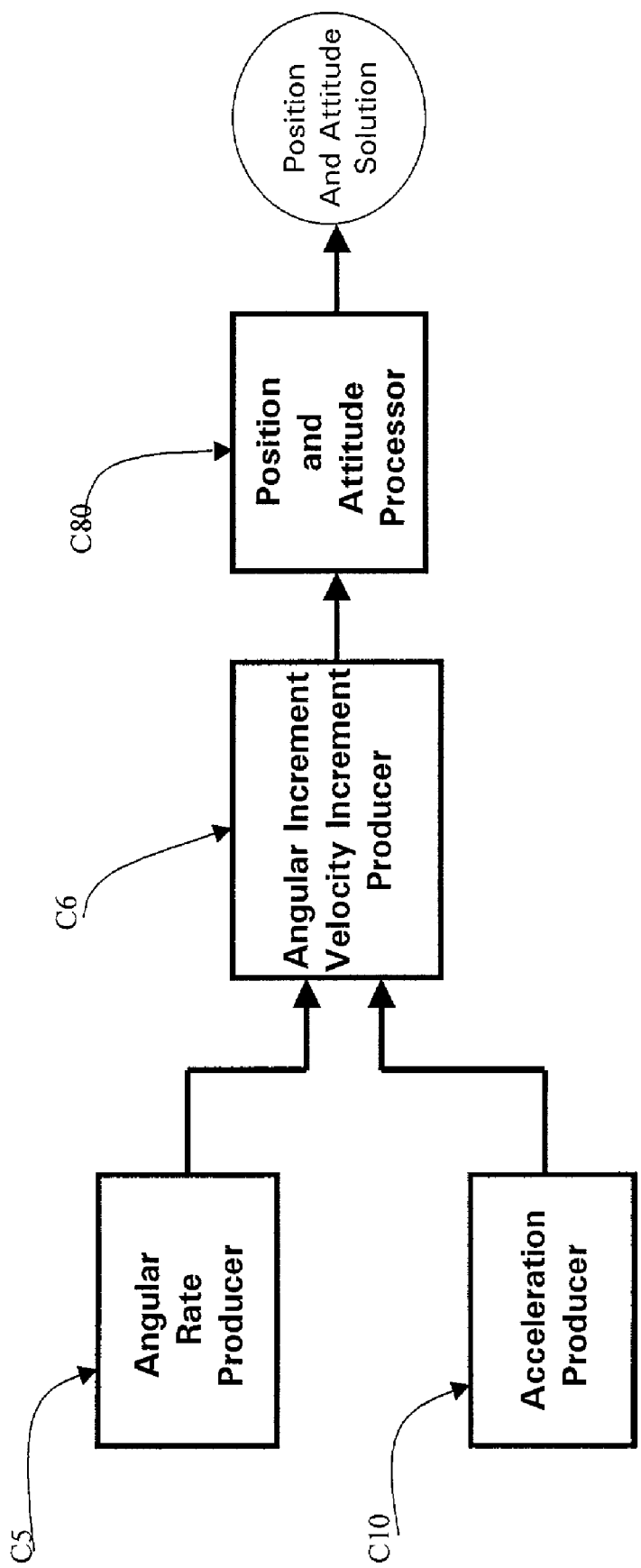
FIG. 19 is a block diagram illustrating the processing module for a micro inertial measurement unit according to the above preferred embodiment of the present invention.

Referring to FIG. 19, the micro inertial measurement unit of the present invention comprises an angular rate producer c5 for producing three-axis (X axis, Y axis and Z axis) angular rate signals; an acceleration producer c10 for producing three-axis (X-axis, Y axis and Z axis) acceleration signals; and an angular increment and velocity increment producer c6 for converting the three-axis angular rate signals into digital angular increments and for converting the input three-axis acceleration signals into digital velocity increments.

Moreover, a position and attitude processor c80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor c80 further comprises two optional running modules:

(1) Attitude and Heading Module c81, producing attitude and heading angle only; and (2) Position, Velocity, Attitude, and Heading Module c82, producing position, velocity, and attitude angles.

In general, the angular rate producer c5 and the acceleration producer c10 are very sensitive to a variety of temperature environments. In order to improve measurement accuracy, referring to FIG. 20, the present invention further comprises a thermal controlling means for maintaining a predetermined operating temperature of the angular rate producer c5, the acceleration producer c10 and the angular increment and velocity increment producer c6. It is worth to mention that if the angular rate producer c5, the acceleration producer c10 and the angular increment and velocity increment producer c6 are operated in an environment under prefect and constant thermal control, the thermal controlling means can be omitted.

Figure 26:
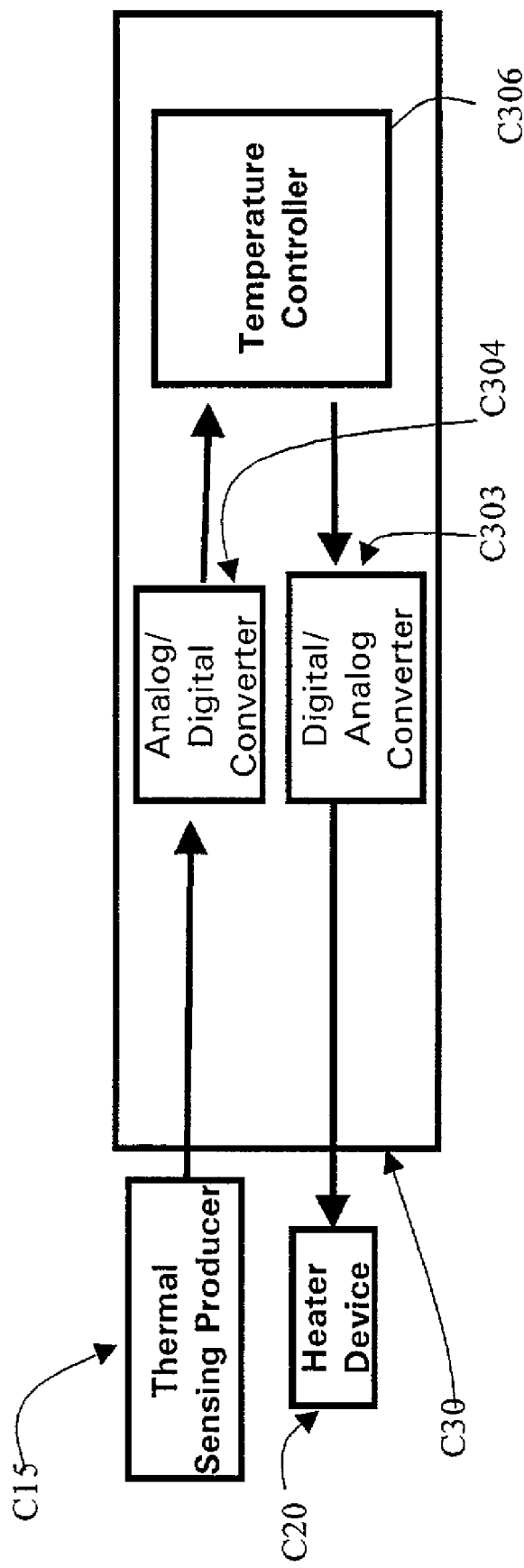
FIG. 26 is a block diagram illustrating a thermal processor for outputting analog voltage signals of the thermal sensing producer according to the above preferred embodiment of the present invention.

According to the preferred embodiment of the present invention, as shown in FIG. 26, the thermal controlling means comprises a thermal sensing producer device c15, a heater device c20 and a thermal processor c30.

The thermal sensing producer device c15, which produces temperature signals, is processed in parallel with the angular rate producer c5 and the acceleration producer c10 for maintaining a predetermined operating temperature of the angular rate producer c5 and the acceleration producer c10 and angular increment and velocity increment producer c6 of the micro IMU, wherein the predetermined operating temperature is a constant designated temperature selected between 150° F. and 185° F., preferable 176° F. (±0.1° F.).

The temperature signals produced from the thermal sensing producer device c15 are input to the thermal processor c30 for computing temperature control commands using the temperature signals, a temperature scale factor, and a predetermined operating temperature of the angular rate producer c5 and the acceleration producer c10, and produce driving signals to the heater device c20 using the temperature control commands for controlling the heater device c20 to provide adequate heat for maintaining the predetermined operating temperature in the micro IMU.

Temperature characteristic parameters of the angular rate producer c5 and the acceleration producer c10 can be determined during a series of the angular rate producer and acceleration producer temperature characteristic calibrations.

Figure 21:
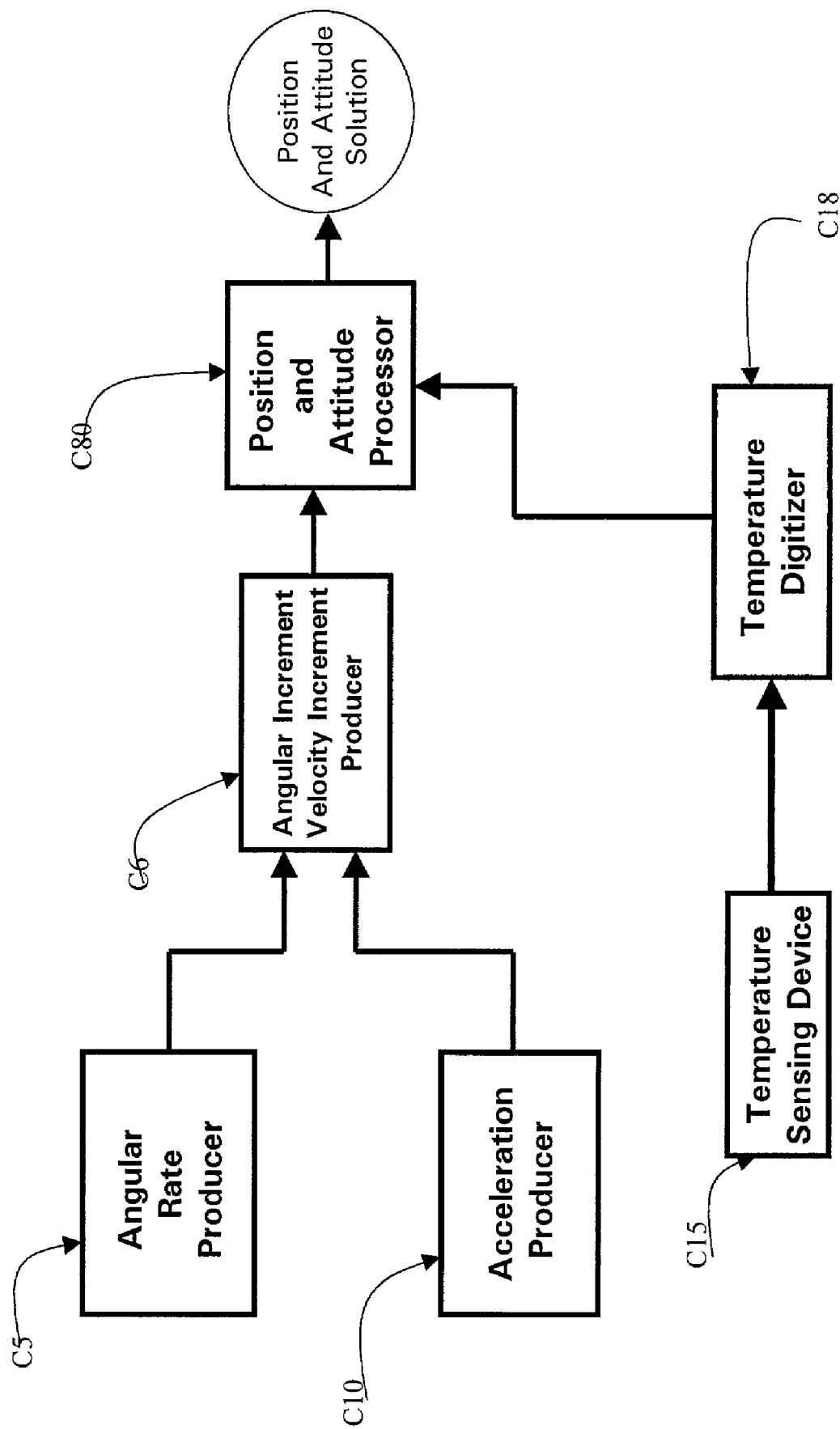
FIG. 21 is a block diagram illustrating the processing modules with thermal compensation processing for the micro inertial measurement unit according to the above preferred embodiment of the present invention.
Figure 30:
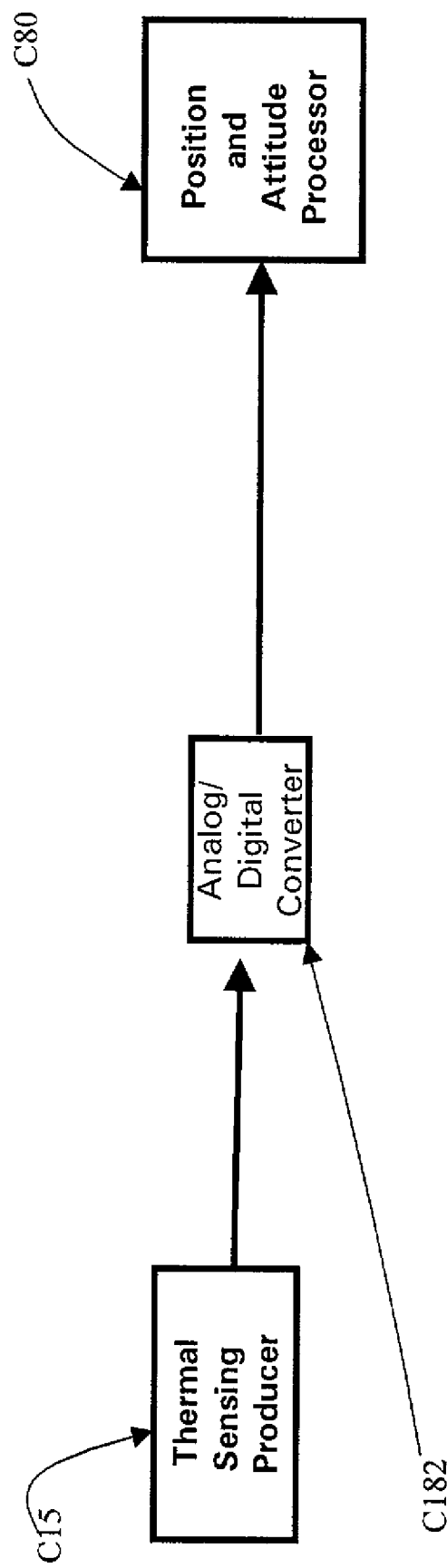
FIG. 30 is a block diagram illustrating a temperature digitizer for outputting analog voltage signals of the thermal sensing producer according to the above preferred embodiment of the present invention.

Referring to FIG. 21, when the above thermal processor c30 and the heater device c20 are not provided, in order to compensate the angular rate producer and acceleration producer measurement errors induced by a variety of temperature environments, the micro IMU of the present invention can alternatively comprise a temperature digitizer c18 for receiving the temperature signals produced from the thermal sensing producer device c15 and outputting a digital temperature value to the position, attitude, and heading processor c80. As shown in FIG. 30, the temperature digitizer c18 can be embodied to comprise an analog/digital converter c182.

Moreover, the position, attitude, and heading processor c80 is adapted for accessing temperature characteristic parameters of the angular rate producer and the acceleration producer using a current temperature of the angular rate producer and the acceleration producer from the temperature digitizer c18, and compensating the errors induced by thermal effects in the input digital angular and velocity increments and computing attitude and heading angle measurements using the three-axis digital angular increments and three-axis velocity increments in the attitude and heading processor c80.

In most applications, the output of the angular rate producer c5 and the acceleration producer c10 are analog voltage signals. The three-axis analog angular rate voltage signals produced from the angular producer c5 are directly proportional to carrier angular rates, and the three-axis analog acceleration voltage signals produced from the acceleration producer c10 are directly proportional to carrier accelerations.

Figure 23:
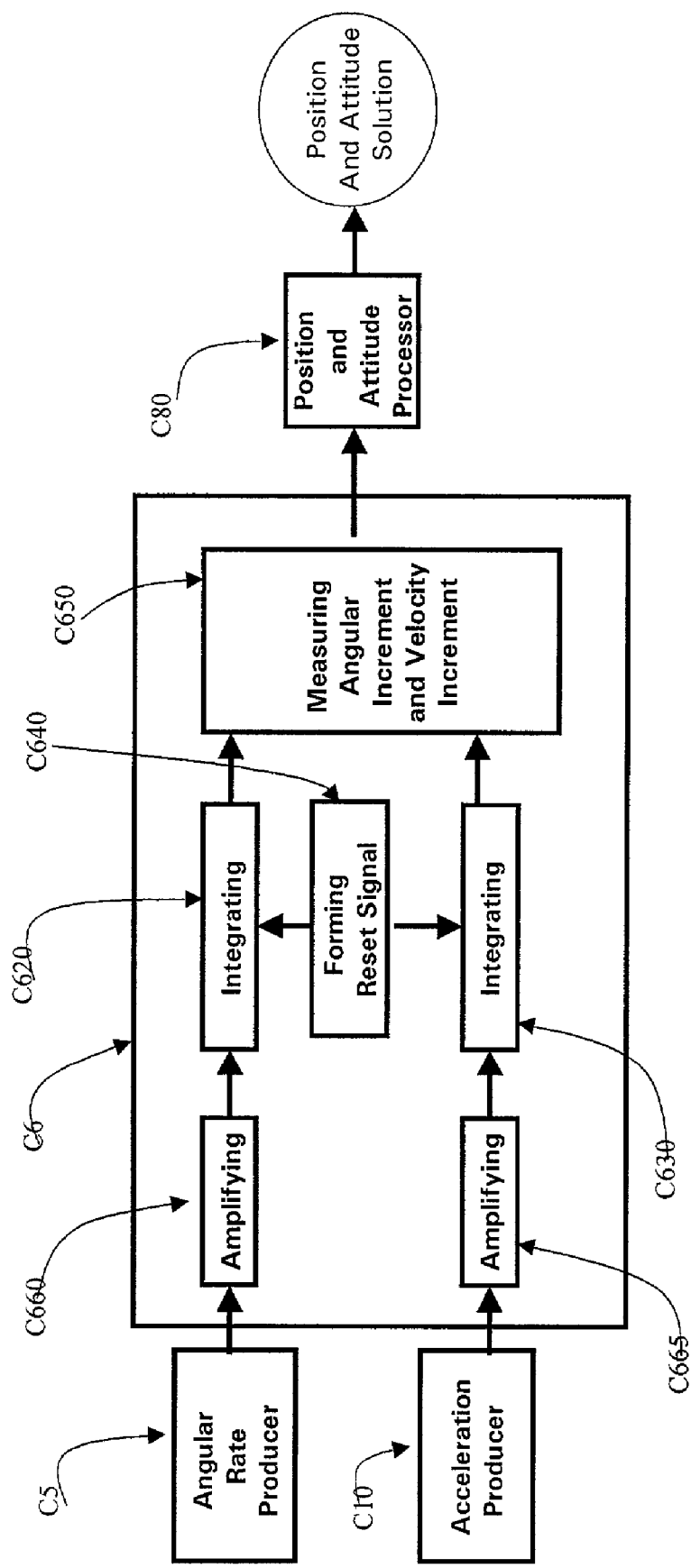
FIG. 23 is a block diagram illustrating another angular increment and velocity increment producer for outputting voltage signals of angular rate producer and acceleration producer for the micro inertial measurement unit according to the above preferred embodiment of the present invention.
Figure 24:
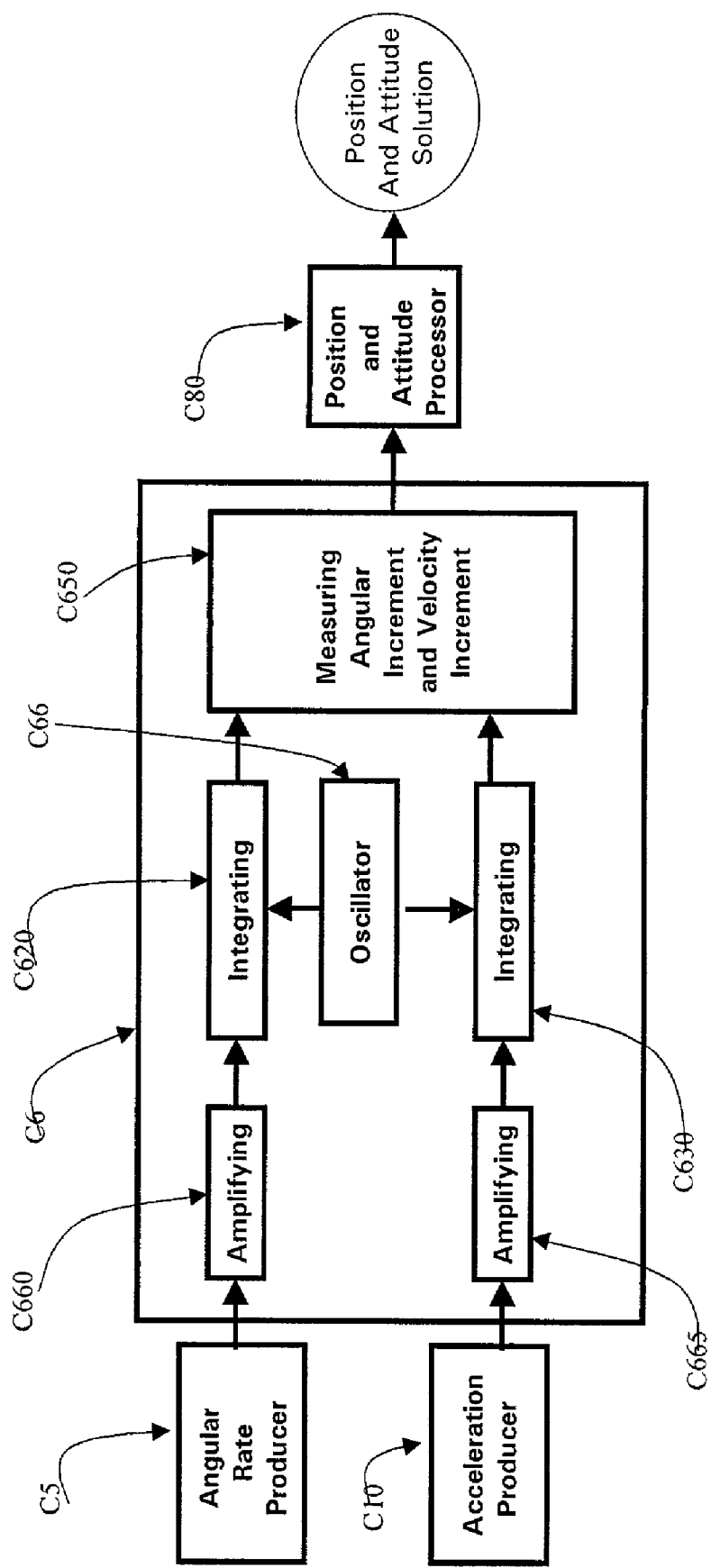
FIG. 24 is a block diagram illustrating another angular increment and velocity increment producer for outputting voltage signals of an angular rate producer and acceleration producer for the micro inertial measurement unit according to the above preferred embodiment of the present invention.

When the outputting analog voltage signals of the angular rate producer c5 and the acceleration producer c10 are too weak for the angular increment and velocity increment producer c6 to read, the angular increment and velocity increment producer c6 may employ amplifying means c660 and c665 for amplifying the analog voltage signals input from the angular rate producer c5 and the acceleration producer c10 and suppress noise signals residing within the analog voltage signals input from the angular rate producer c5 and the acceleration producer c10, as shown in FIGS. 23 and 24.

Figure 22:
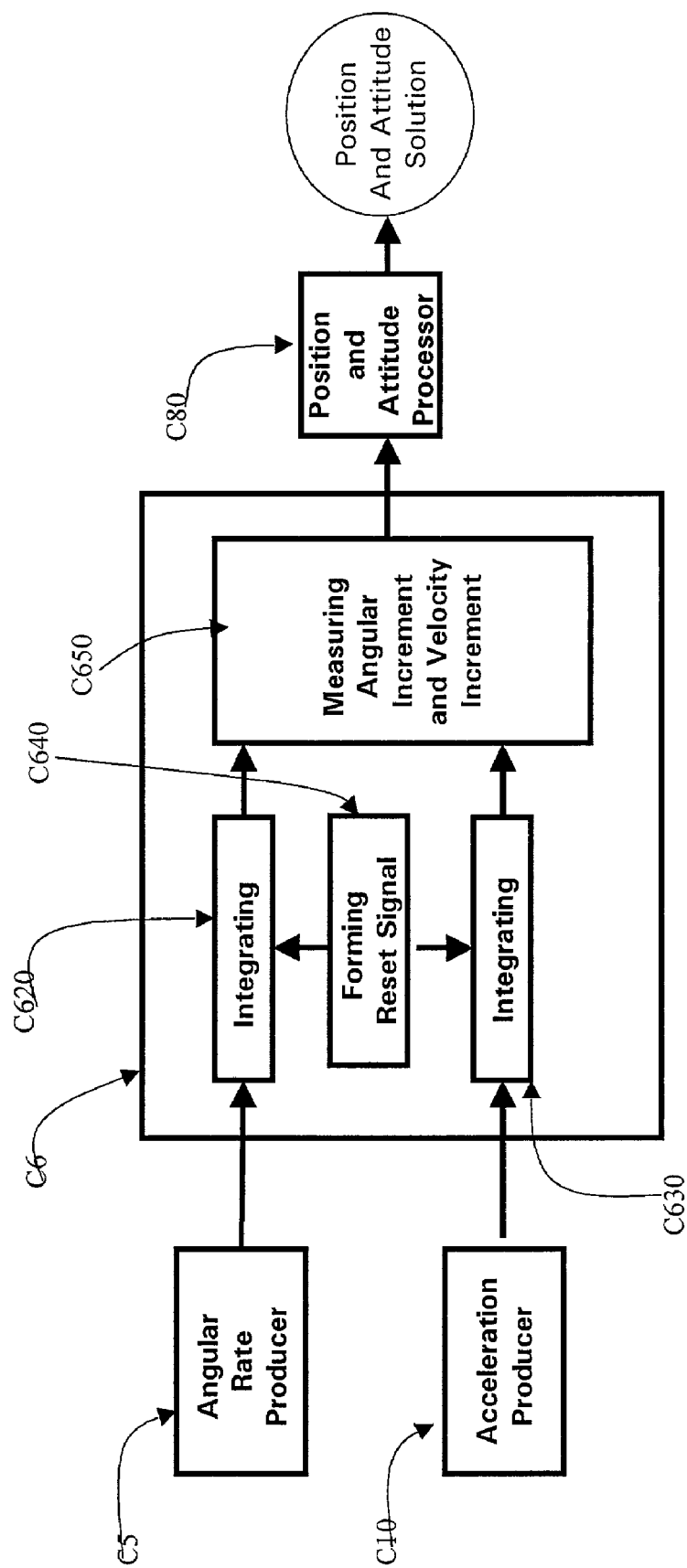
FIG. 22 is a block diagram illustrating an angular increment and velocity increment producer for outputting voltage signals of the angular rate producer and acceleration producer for the micro inertial measurement unit according to the above preferred embodiment of the present invention.

Referring to FIG. 22, the angular increment and velocity increment producer c6 comprises an angular integrating means c620, an acceleration integrating means c630, a resetting means c640, and an angular increment and velocity increment measurement means c650.

The angular integrating means c620 and the acceleration integrating means c630 are adapted for respectively integrating the three-axis analog angular rate voltage signals and the three-axis analog acceleration voltage signals for a predetermined time interval to accumulate the three-axis analog angular rate voltage signals and the three-axis analog acceleration voltage signals as an uncompensated three-axis angular increment and an uncompensated three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve the signal-to-noise ratio, and to remove the high frequency signals in the three-axis analog angular rate voltage signals and the three-axis analog acceleration voltage signals. The signals are directly proportional to the carrier angular rate and acceleration within the three-axis analog angular rate voltage signals and the three-axis analog acceleration voltage signals.

The resetting means forms an angular reset voltage pulse and a velocity reset voltage pulse as an angular scale and a velocity scale which are input into the angular integrating means c620 and the acceleration integrating means c630 respectively.

The angular increment and velocity increment measurement means c650 is adapted for measuring the voltage values of the three-axis accumulated angular increments and the three-axis accumulated velocity increments with the angular reset voltage pulse and the velocity reset voltage pulse respectively to acquire angular increment counts and velocity increment counts as a digital form of the angular increment and velocity increment measurements respectively.

In order to output real three-angular increment and velocity increment values as an optional output format to substitute the voltage values of the three-axis accumulated angular increments and velocity increments, the angular increment and velocity increment measurement means c650 also scales the voltage values of the three-axis accumulated angular and velocity increments into real three-axis angular and velocity increment voltage values.

In the angular integrating means c620 and the acceleration integrating means c630, the three-axis analog angular voltage signals and the three-axis analog acceleration voltage signals are each reset to accumulate from a zero value at an initial point of every predetermined time interval.

As shown in FIG. 24, in general, the resetting means c640 can be an oscillator c66, so that the angular reset voltage pulse and the velocity reset voltage pulse are implemented by producing a timing pulse by the oscillator c66. In applications, the oscillator c66 can be built with circuits, such as Application Specific Integrated Circuits (ASIC) chip and a printed circuit board.

Figure 25:
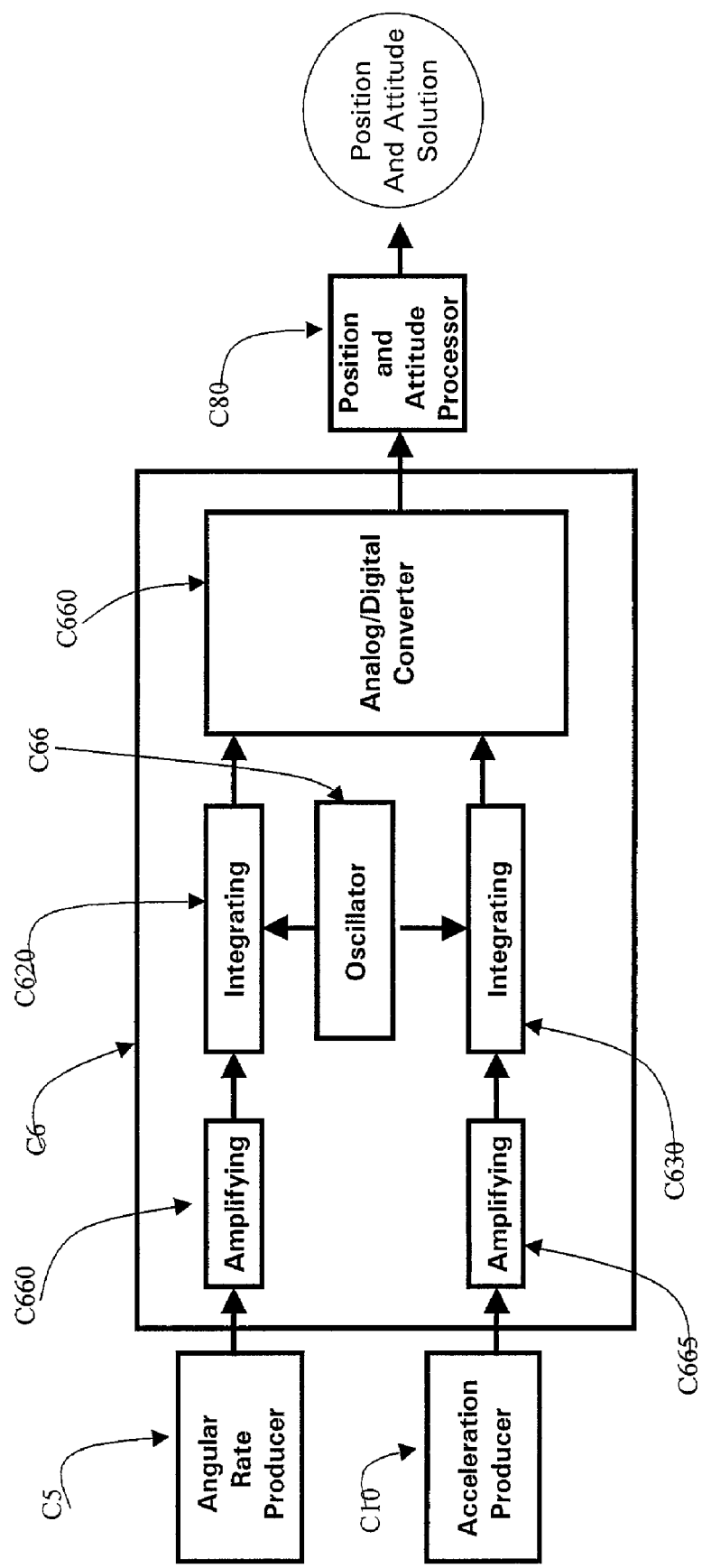
FIG. 25 is a block diagram illustrating another angular increment and velocity increment producer for outputting voltage signals of an angular rate producer and acceleration producer for the micro inertial measurement unit according to the above preferred embodiment of the present invention.

As shown in FIG. 25, the angular increment and velocity increment measurement means c650, which is adapted for measuring the voltage values of the three-axis accumulated angular and velocity increments, is embodied as an analog/digital converter c650. In other words, the analog/digital converter c650 substantially digitizes the raw three-axis angular increment and velocity increment voltage values into digital three-axis angular increment and velocity increments.

Figure 29:
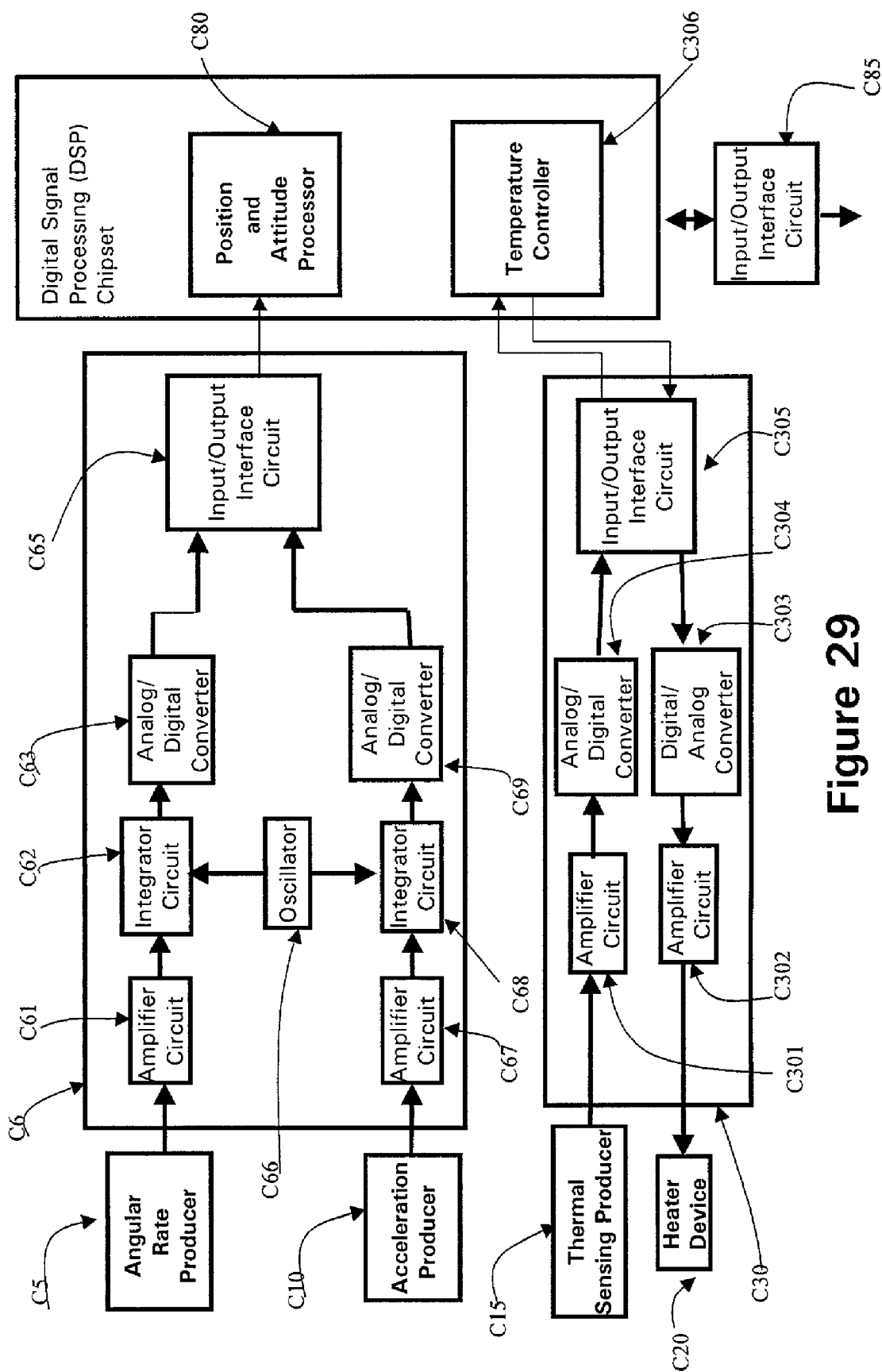
FIG. 29 is a block diagram illustrating a processing module for the micro inertial measurement unit according to the above preferred embodiment of the present invention.
Figure 33:
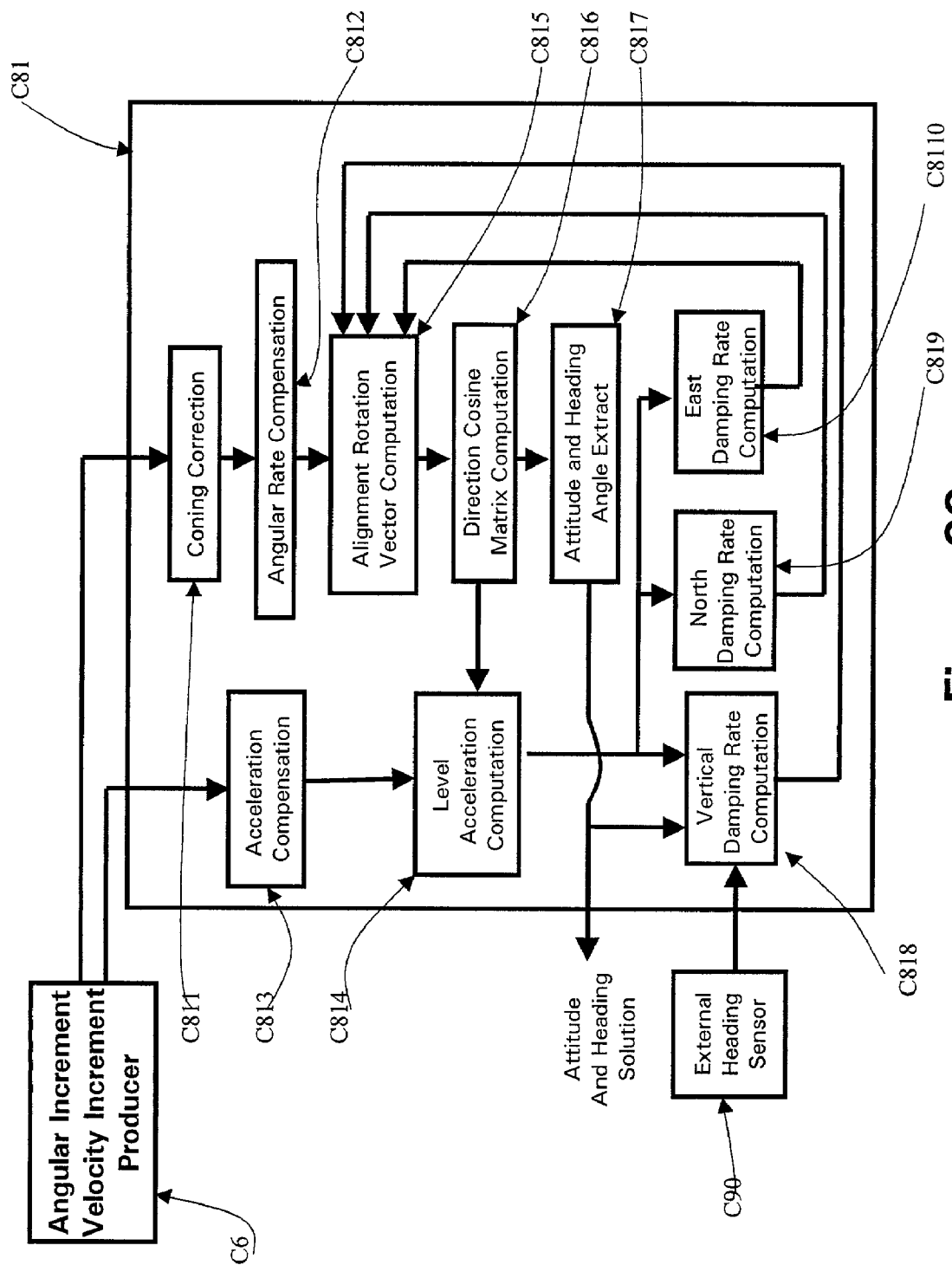
FIG. 33 is a block diagram illustrating the attitude and heading processing module according to the above preferred embodiment of the present invention.

Referring to FIGS. 29 and 33, the amplifying means c660 and c665 of the angular increment and velocity increment producer c6 are embodied by an angular amplifier circuit c61 and an acceleration amplifier circuit c67 respectively to amplify the three-axis analog angular rate voltage signals and the three-axis analog acceleration voltage signals to form amplified three-axis analog angular rate signals and amplified three-axis analog acceleration signals respectively.

The angular integrating means c620 and the acceleration integrating means c630 of the angular increment and velocity increment producer c6 are respectively embodied as an angular integrator circuit c62 and an acceleration integrator circuit c68 for receiving the amplified three-axis analog angular rate signals and the amplified three-axis analog acceleration signals from the angular and acceleration amplifier circuits c61, c67 which are integrated to form the accumulated angular increments and the accumulated velocity increments respectively.

The analog/digital converter c650 of the angular increment and velocity increment producer c6 further includes an angular analog/digital converter c63, a velocity analog/digital converter c69 and an input/output interface circuit c65.

The accumulated angular increments output from the angular integrator circuit c62 and the accumulated velocity increments output from the acceleration integrator circuit are input into the angular analog/digital converter c63 and the velocity analog/digital converter c69 respectively.

The accumulated angular increments are digitized by the angular analog/digital converter c63 by measuring the accumulated angular increments with the angular reset voltage pulse to form digital angular measurements of voltage in terms of the angular increment counts which are output to the input/output interface circuit c65 to generate digital three-axis angular increment voltage values.

The accumulated velocity increments are digitized by the velocity analog/digital converter c69 by measuring the accumulated velocity increments with the velocity reset voltage pulse to form digital velocity measurements of voltage in terms of the velocity increment counts which are output to the input/output interface circuit c65 to generate digital three-axis velocity increment voltage values.

Figure 20:
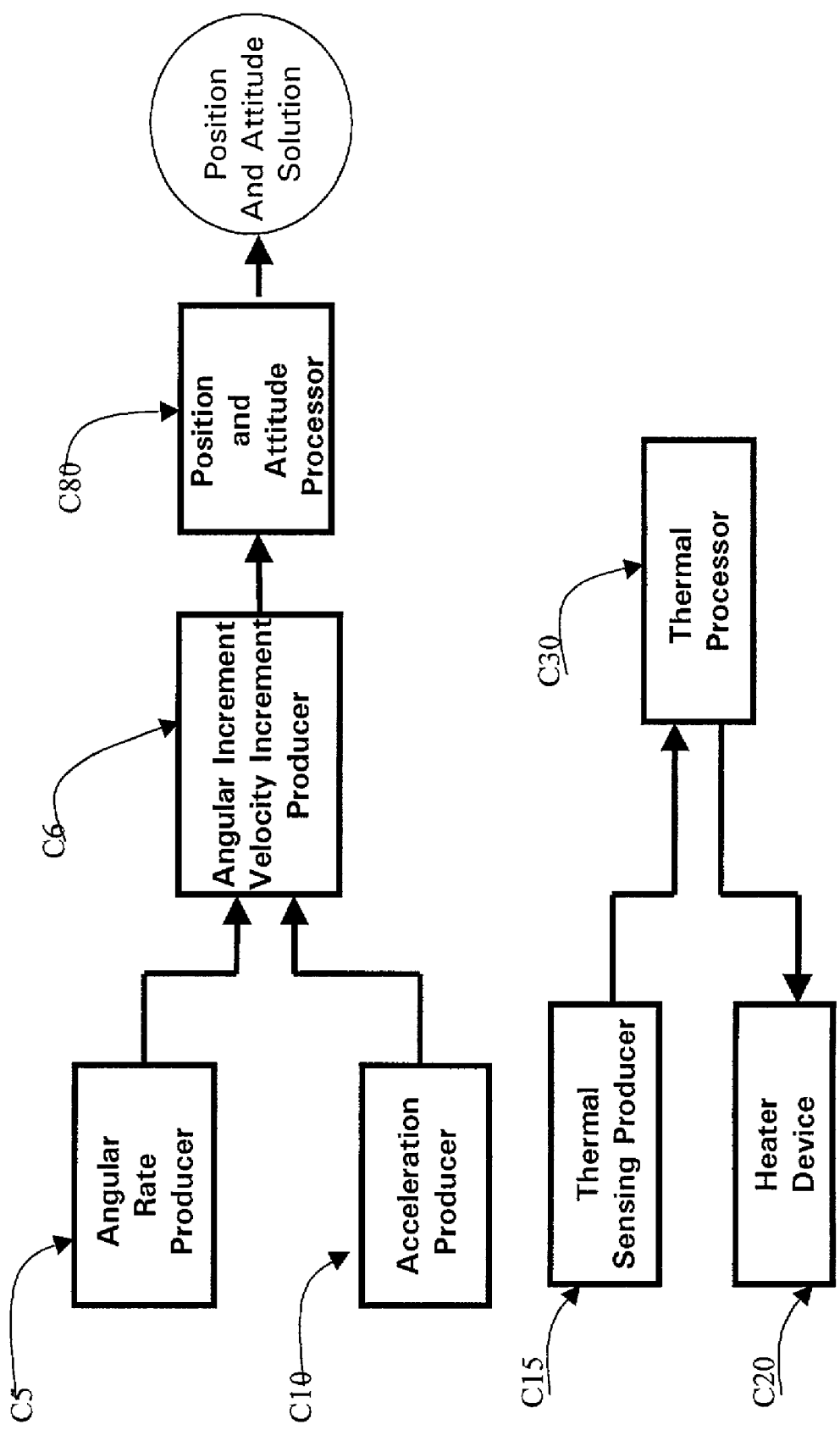
FIG. 20 is a block diagram illustrating the processing modules with thermal control processing for the micro inertial measurement unit according to the above preferred embodiment of the present invention.

Referring to FIGS. 20 and 26, in order to achieve flexible adjustment of the thermal processor c30 for the thermal sensing producer device c15 with analog voltage output and the heater device c20 with analog input, the thermal processor c30 can be implemented in a digital feedback controlling loop as shown in FIG. 26.

The thermal processor c30, as shown in FIG. 26, comprises an analog/digital converter c304 connected to the thermal sensing producer device c15, a digital/analog converter c303 connected to the heater device c20, and a temperature controller c306 connected with both the analog/digital converter c304 and the digital/analog converter c303. The analog/digital converter c304 inputs the temperature voltage signals produced by the thermal sensing producer device c15, wherein the temperature voltage signals are sampled in the analog/digital converter c304 to sampled temperature voltage signals which are further digitized to digital signals and output to the temperature controller c306.

The temperature controller c306 computes digital temperature commands using the input digital signals from the analog/digital converter c304, a temperature sensor scale factor, and a pre-determined operating temperature of the angular rate producer and acceleration producer, wherein the digital temperature commands are fed back to the digital/analog converter c303.

The digital/analog converter c303 converts the digital temperature commands input from the temperature controller c306 into analog signals which are output to the heater device c20 to provide adequate heat for maintaining the predetermined operating temperature of the micro IMU of the present invention.

Figure 27:
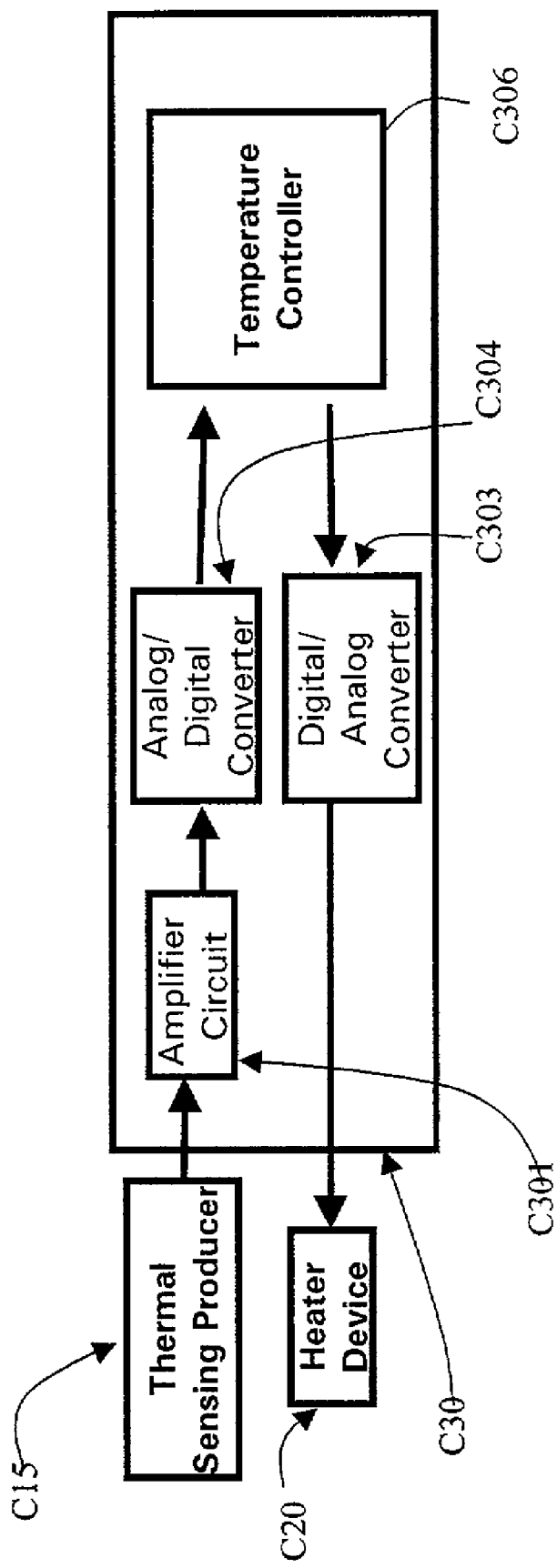
FIG. 27 is a block diagram illustrating another thermal processor for outputting analog voltage signals of the thermal sensing producer according to the above preferred embodiment of the present invention.

Moreover, as shown in FIG. 27, if the voltage signals produced by the thermal sensing producer device c15 are too weak for the analog/digital converter c304 to read, the thermal processor c30 further comprises a first amplifier circuit c301 between the thermal sensing producer device c15 and the digital/analog converter c303, wherein the voltage signals from the thermal sensing producer device c15 is first input into the first amplifier circuit c301 for amplifying the signals and suppressing the noise residing in the voltage signals and improving the signal-to-noise ratio, wherein the amplified voltage signals are then output to the analog/digital converter c304.

The heater device c20 requires a specific driving current signal. In this case, referring to FIG. 28, the thermal processor c30 can further comprise a second amplifier circuit 302 between the digital/analog converter c303 and heater device c20 for amplifying the input analog signals from the digital/analog converter c303 for driving the heater device c20.

In other words, the digital temperature commands input from the temperature controller c306 are converted in the digital/analog converter c303 into analog signals which are then output to the amplifier circuit c302.

Referring to FIG. 29, an input/output interface circuit c305 is required to connect the analog/digital converter c304 and digital/analog converter c303 with the temperature controller c306. In this case, as shown in FIG. 29, the voltage signals are sampled in the analog/digital converter c304 to form sampled voltage signals that are digitized into digital signals. The digital signals are output to the input/output interface circuit c305.

As mentioned above, the temperature controller c306 is adapted to compute the digital temperature commands using the input digital temperature voltage signals from the input/output interface circuit c305, the temperature sensor scale factor, and the pre-determined operating temperature of the angular rate producer and acceleration producer, wherein the digital temperature commands are fed back to the input/output interface circuit c305. Moreover, the digital/analog converter c303 further converts the digital temperature commands input from the input/output interface circuit c305 into analog signals which are output to the heater device c20 to provide adequate heat for maintaining the predetermined operating temperature of the micro IMU.

Referring to FIG. 30, as mentioned above, the thermal processor c30 and the heater device c20 as disclosed in FIGS. 20, 26, 27, 28, and 29 can alternatively be replaced by the analog/digital converter c182 connected to the thermal sensing producer device c15 to receive the analog voltage output from the thermal sensing producer device c15. If the voltage signals produced by the thermal sensing producer device c15 are too weak for the analog/digital converter c182 to read, referring to FIG. 31, an additional amplifier circuit c181 can be connected between the thermal sensing producer device c15 and the digital/analog converter c182 for amplifying the analog voltage signals and suppressing the noise residing in the voltage signals and improving the voltage signal-to-noise ratio, wherein the amplified voltage signals are output to the analog/digital converter c182 and sampled to form sampled voltage signals that are further digitized in the analog/digital converters c182 to form digital signals connected to the attitude and heading processor c80.

Alternatively, an input/output interface circuit c183 can be connected between the analog/digital converter c182 and the attitude and heading processor c80. In this case, referring to FIG. 32, the input amplified voltage signals are sampled to form sampled voltage signals that are further digitized in the analog/digital converters to form digital signals connected to the input/output interface circuit c183 before inputting into the attitude and heading processor c80.

Referring to FIG. 19, the digital three-axis angular increment voltage values or real values and three-axis digital velocity increment voltage values or real values are produced and outputted from the angular increment and velocity increment producer c6.

In order to adapt to digital three-axis angular increment voltage values and three-axis digital velocity increment voltage values from the angular increment and velocity increment producer c6, the attitude and heading module c81, as shown in FIG. 33, comprises a coning correction module c811, wherein digital three-axis angular increment voltage values from the input/output interface circuit c65 of the angular increment and velocity increment producer c6 and coarse angular rate bias obtained from an angular rate producer and acceleration producer calibration constants table at a high data rate (short interval) are input into the coning correction module c811, which computes coning effect errors by using the input digital three-axis angular increment voltage values and coarse angular rate bias, and outputs three-axis coning effect terms and three-axis angular increment voltage values at a reduced data rate (long interval), which are called three-axis long-interval angular increment voltage values.

The attitude and heading module c81 further comprises an angular rate compensation module c812 and an alignment rotation vector computation module c815. In the angular rate compensation module c812, the coning effect errors and three-axis long-interval angular increment voltage values from the coning correction module c811 and angular rate device misalignment parameters, fine angular rate bias, angular rate device scale factor, and coning correction scale factor from the angular rate producer and acceleration producer calibration constants table are connected to the angular rate compensation module c812 for compensating definite errors in the three-axis long-interval angular increment voltage values using the coning effect errors, angular rate device misalignment parameters, fine angular rate bias, and coning correction scale factor, and transforming the compensated three-axis long-interval angular increment voltage values to real three-axis long-interval angular increments using the angular rate device scale factor. Moreover, the real three-axis angular increments are output to the alignment rotation vector computation module c815.

The attitude and heading module c81 further comprises an accelerometer compensation module c813 and a level acceleration computation module c814, wherein the three-axis velocity increment voltage values from the angular increment and velocity increment producer c6 and acceleration device misalignment, acceleration device bias, and acceleration device scale factor from the angular rate producer and acceleration producer calibration constants table are connected to the accelerometer compensation module c813 for transforming the three-axis velocity increment voltage values into real three-axis velocity increments using the acceleration device scale factor, and compensating the definite errors in three-axis velocity increments using the acceleration device misalignment, accelerometer bias, wherein the compensated three-axis velocity increments are connected to the level acceleration computation module c814.

By using the compensated three-axis angular increments from the angular rate compensation module c812, an east damping rate increment from an east damping rate computation module c8110, a north damping rate increment from a north damping rate computation module c819, and vertical damping rate increment from a vertical damping rate computation module c818, a quaternion, which is a vector representing rotation angle of the carrier, is updated, and the updated quaternion is connected to a direction cosine matrix computation module c816 for computing the direction cosine matrix, by using the updated quaternion.

The computed direction cosine matrix is connected to the level acceleration computation module c814 and an attitude and heading angle extract module c817 for extracting attitude and heading angle using the direction cosine matrix from the direction cosine matrix computation module c816.

The compensated three-axis velocity increments are connected to the level acceleration computation module c814 for computing level velocity increments using the compensated three-axis velocity increments from the acceleration compensation module c814 and the direction cosine matrix from the direction cosine matrix computation module c816.

The level velocity increments are connected to the east damping rate computation module c8110 for computing east damping rate increments using the north velocity increment of the input level velocity increments from the level acceleration computation module c814.

The level velocity increments are connected to the north damping rate computation module c819 for computing north damping rate increments using the east velocity increment of the level velocity increments from the level acceleration computation module c814.

The heading angle from the attitude and heading angle extract module c817 and a measured heading angle from the external heading sensor c90 are connected to the vertical damping rate computation module c818 for computing vertical damping rate increments.

The east damping rate increments, north damping rate increments, and vertical damping rate are fed back to the alignment rotation vector computation module c815 to damp the drift of errors of the attitude and heading angles.

Alternatively, in order to adapt real digital three-axis angular increment values and real three-axis digital velocity increment values from the angular increment and velocity increment producer c6, referring to FIG. 33, the real digital three-axis angular increment values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment values and coarse angular rate bias and outputting three-axis coning effect terms and three-axis angular increment values at reduced data rate (long interval), which are called three-axis long-interval angular increment values, into the angular rate compensation module c812.

The coning effect errors and three-axis long-interval angular increment values from the coning correction module c811 and angular rate device misalignment parameters and fine angular rate bias from the angular rate producer and acceleration producer calibration constants table are connected to the angular rate compensation module c812 for compensating definite errors in the three-axis long-interval angular increment values using the coning effect errors, angular rate device misalignment parameters, fine angular rate bias, and coning correction scale factor, and outputting the real three-axis angular increments to the alignment rotation vector computation module c815.

The three-axis velocity increment values from the angular increment and velocity increment producer c6 and acceleration device misalignment, and acceleration device bias from the angular rate producer and acceleration producer calibration are connected into the accelerometer compensation module c813 for compensating the definite errors in three-axis velocity increments using the acceleration device misalignment, and accelerometer bias; outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce attitude and heading angle.

Figure 32:
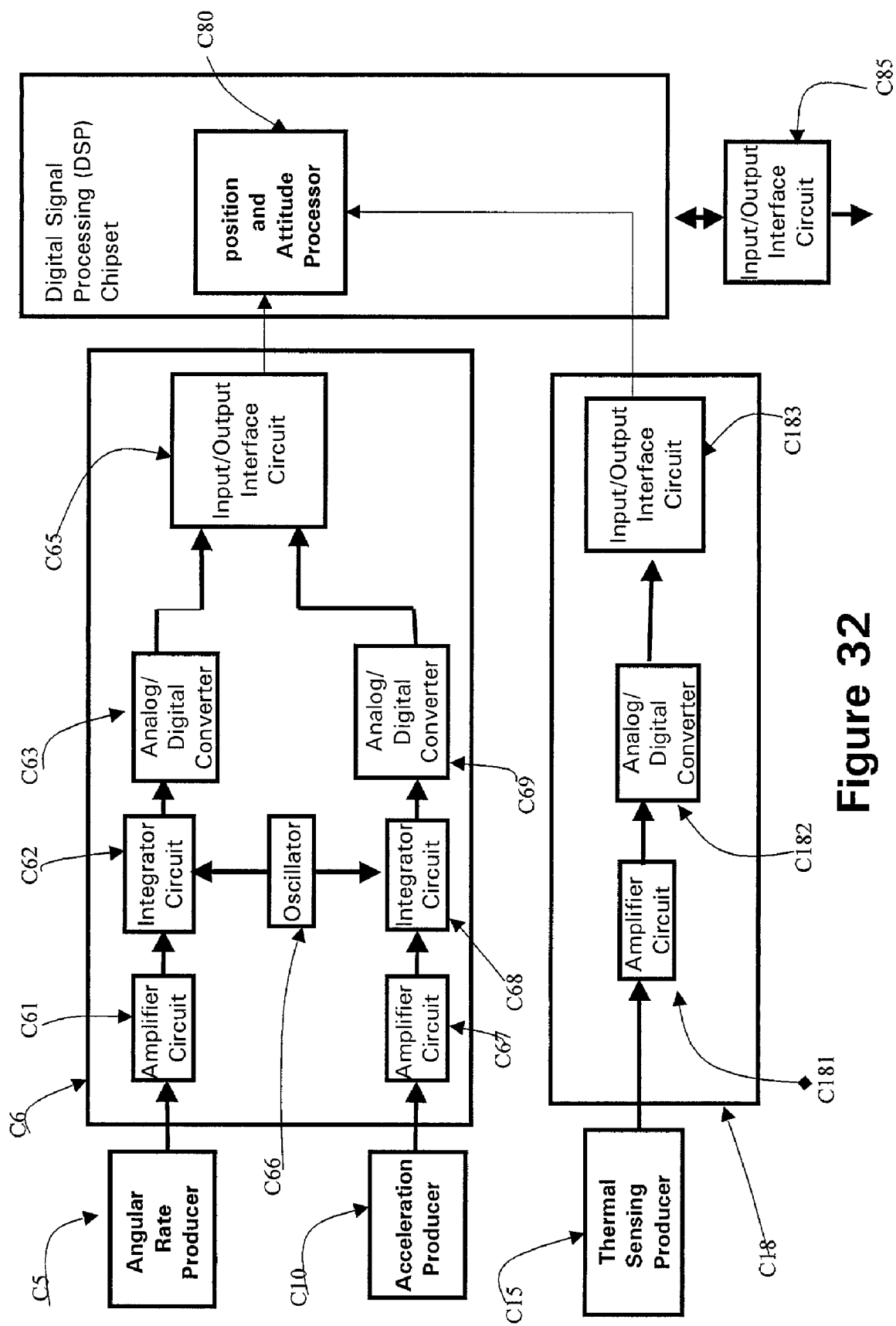
FIG. 32 is a block diagram illustrating a processing module with thermal compensation processing for the micro inertial measurement unit according to the above preferred embodiment of the present invention.

Referring to FIGS. 21, 32, and 33, which use the temperature compensation method by means of the temperature digitizer c18, in order to adapt to digital three-axis angular increment voltage value and three-axis digital velocity increment voltage values from the angular increment and velocity increment producer c6, the digital three-axis angular increment voltage values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment voltage values and coarse angular rate bias, and outputting three-axis coning effect terms and three-axis angular increment voltage values at a reduced data rate (long interval), which are called three-axis long-interval angular increment voltage values, into the angular rate compensation module c812.

The coning effect errors and three-axis long-interval angular increment voltage values from the coning correction module c811 and angular rate device misalignment parameters, fine angular rate bias, angular rate device scale factor, coning correction scale factor from the angular rate producer and acceleration producer calibration constants table, the digital temperature signals from input/output interface circuit c183, and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment voltage values using the coning effect errors, angular rate device misalignment parameters, fine angular rate bias, and coning correction scale factor, transforming the compensated three-axis long-interval angular increment voltage values to real three-axis long-interval angular increments, compensating temperature-induced errors in the real three-axis long-interval angular increments using the angular rate producer temperature characteristic parameters, and outputting the real three-axis angular increments to the alignment rotation vector computation module c815.

The three-axis velocity increment voltage values from the angular increment and velocity increment producer c6 and acceleration device misalignment, acceleration bias, acceleration device scale factor from the angular rate producer and acceleration producer calibration constants table, the digital temperature signals from the input/output interface circuit c183 of the temperature digitizer c18, and temperature sensor scale factor are connected to the acceleration compensation module c813 for computing current temperature of the acceleration producer, accessing acceleration producer temperature characteristic parameters using the current temperature of the acceleration producer, transforming the three-axis velocity increment voltage values into real three-axis velocity increments using the acceleration device scale factor, compensating the definite errors in the three-axis velocity increments using the acceleration device misalignment and acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Alternatively, referring to FIGS. 21, 32, and 33, which use the temperature compensation method, in order to adapt real digital three-axis angular increment values and real three-axis digital velocity increment values from the angular increment and velocity increment producer c6, the attitude and heading module c81 can be further modified to accept the digital three-axis angular increment values from the angular increment and velocity increment producer c6 and coarse angular rate bias obtained from an angular rate producer and acceleration producer calibration constants table at a high data rate (short interval) into the coning correction module c811 for computing coning effect errors in the coning correction module c811 using the input digital three-axis angular increment values and coarse angular rate bias, and outputting three-axis coning effect data and three-axis angular increment data at a reduced data rate (long interval), which are called three-axis long-interval angular increment values, into the angular rate compensation module c812.

The coning effect errors and three-axis long-interval angular increment values from the coning correction module c811 and angular rate device misalignment parameters and fine angular rate bias from the angular rate producer and acceleration producer calibration constants table, the digital temperature signals from the input/output interface circuit c183 and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment values using the coning effect errors, angular rate device misalignment parameters, fine angular rate bias, and coning correction scale factor, compensating temperature-induced errors in the real three-axis long-interval angular increments using the angular rate producer temperature characteristic parameters, and outputting the real three-axis angular increments to an alignment rotation vector computation module c815.

The three-axis velocity increment values from the input/output interface circuit c65 and acceleration device misalignment and acceleration bias from the angular rate producer and acceleration producer calibration constants table, the digital temperature signals from the input/output interface circuit c183 and temperature sensor scale factor are input into the acceleration compensation module c813 for computing current temperature of the acceleration producer, accessing the acceleration producer temperature characteristic parameters using the current temperature of the acceleration producer, compensating the definite errors in the three-axis velocity increments using the input acceleration device misalignment, acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Figure 34:
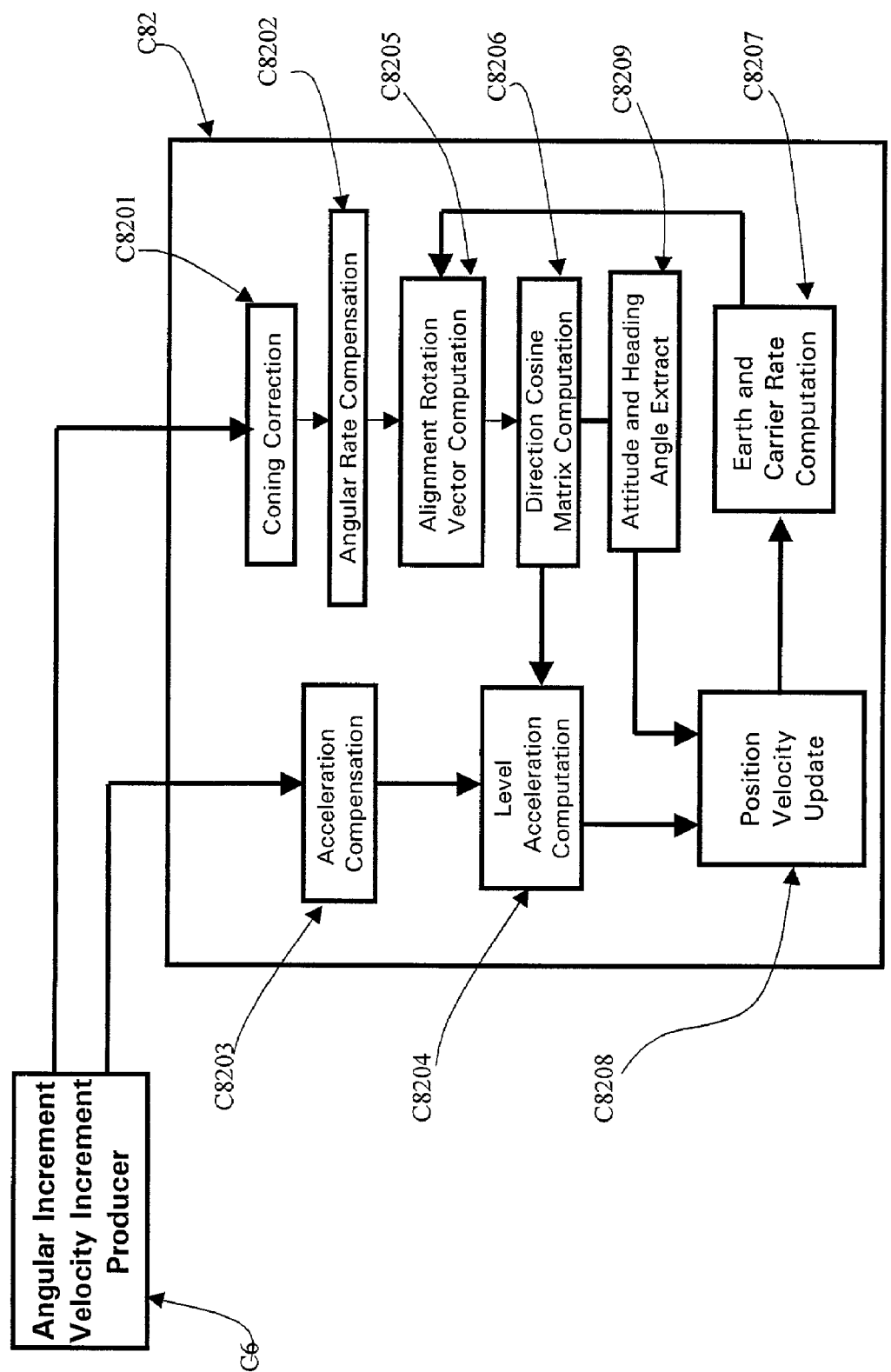
FIG. 34 is a functional block diagram illustrating the position velocity attitude and heading module according to the above preferred embodiment of the present invention.

Referring to FIG. 34, the Position, velocity, and attitude Module c82 comprises:

a coning correction module c8201, which is same as the coning correction module c811 of the attitude and heading module c81;

an angular rate compensation module c8202, which is same as the angular rate compensation module c812 of the attitude and heading module c81;

an alignment rotation vector computation module c8205, which is same as the alignment rotation vector computation module c815 of the attitude and heading module c81;

a direction cosine matrix computation module c8206, which is same as the Direction cosine matrix computation module c816 of the attitude and heading module c81;

an acceleration compensation module c8203, which is same as the acceleration compensation module c813 of the attitude and heading module c81;

a level acceleration computation module c8204, which is same as the acceleration compensation module c814 of the attitude and heading module c81; and an attitude and heading angle extract module c8209, which is same as the attitude and heading angle extract module c817 of the attitude and heading module c81.

A position and velocity update module c8208 accepts the level velocity increments from the level acceleration computation module c8204 and computes position and velocity solution.

An earth and carrier rate computation module c8207 accepts the position and velocity solution from the position and velocity update module c8208 and computes the rotation rate vector of the local navigation frame (n frame) of the carrier relative to the inertial frame (i frame), which is connected to the alignment rotation vector computation module c8205.

Figure 44:
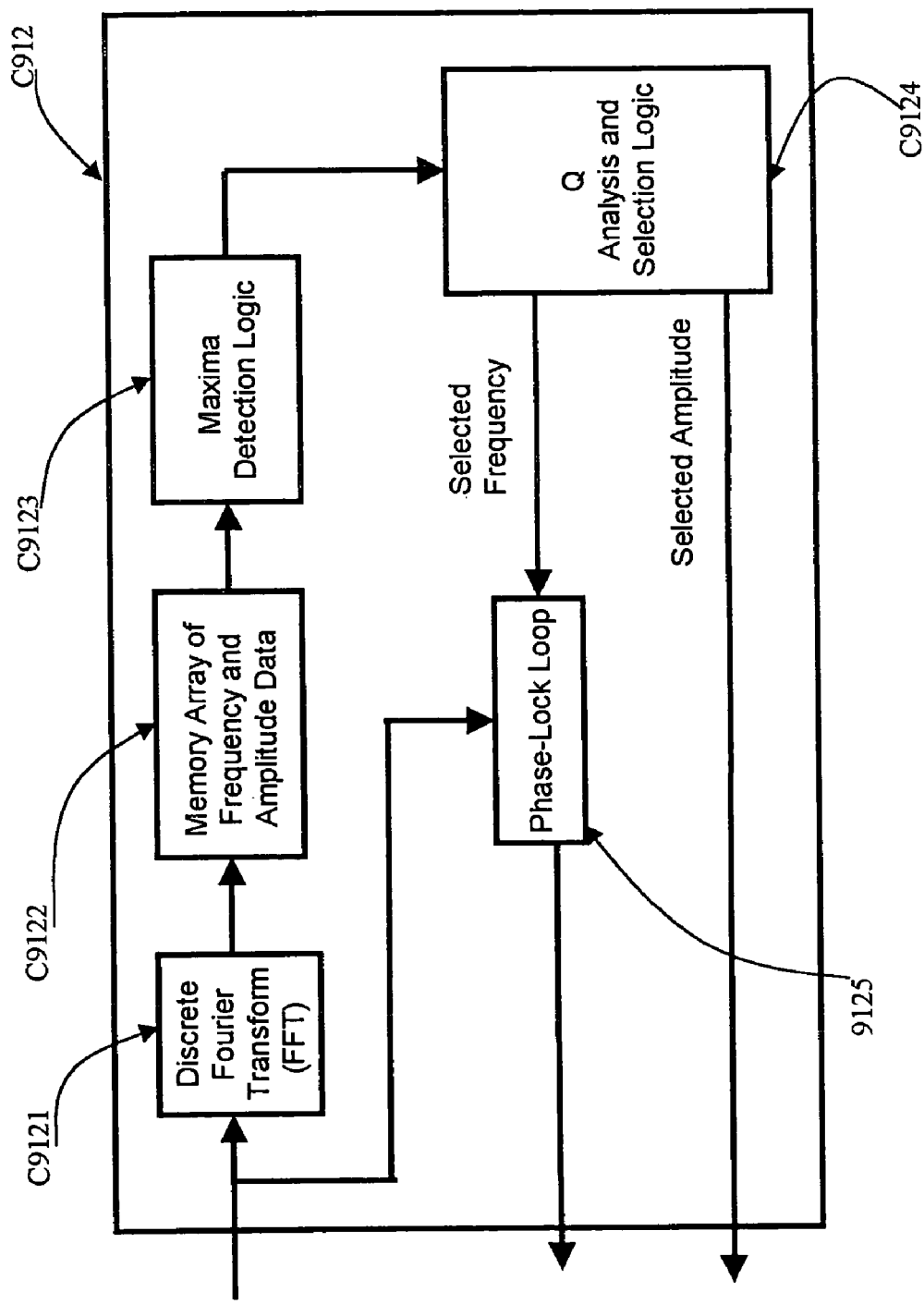
FIG. 44 is a block diagram of the dither motion processing module running in the DSP chipset of the third circuit board of the micro IMU according to the above preferred embodiment of the present invention.

In order to meet the diverse requirements of application systems, referring to FIGS. 29 and 44, the digital three-axis angular increment voltage values, the digital three-axis velocity increment, and digital temperature signals in the input/output interface circuit c65 and the input/output interface circuit c305 can be ordered with a specific format required by an external user system, such as RS-232 serial communication standard, RS-422 serial communication standard, the popular PCI/ISA bus standard, and 1553 bus standard, etc.

Figure 42:
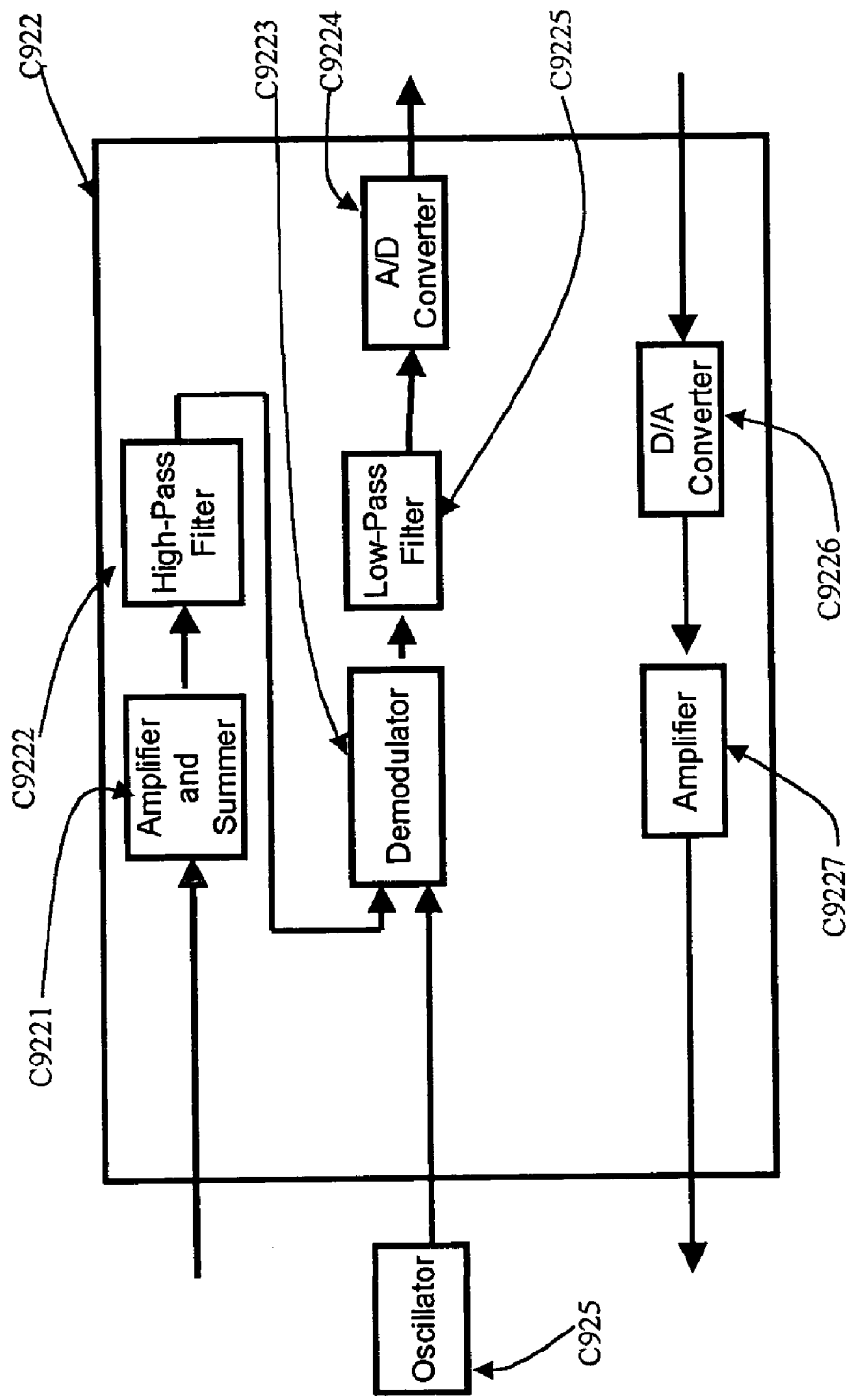
FIG. 42 is block diagram of the dither motion control circuitry of the ASIC chip in the third circuit board of the micro IMU according to the above preferred embodiment of the present invention.

In order to meet diverse requirements of application systems, referring to FIGS. 42 and 44, the digital three-axis angular increment values, the digital three-axis velocity increment, and attitude and heading data in the input/output interface circuit c85 are ordered with a specific format required by an external user system, such as RS-232 serial communication standard, RS-422 serial communication standard, PCI/ISA bus standard, and 1553 bus standard, etc.

As mentioned above, one of the key technologies of the present invention to achieve the micro IMU with a high degree of performance is to utilize a micro size angular rate producer, wherein the micro-size angular rate producer with MEMS technologies and associated mechanical supporting structure and circuitry board deployment of the micro IMU of the present invention are disclosed in the following description.

Another of the key technologies of the present invention to achieve the micro IMU with low power consumption is to design a micro size circuitry with small power consumption, wherein the conventional AISC (Application Specific Integrated Circuit) technologies can be utilized to shrink a complex circuitry into a silicon chip.

Existing MEMS technologies, which are employed into the micro size angular rate producer, use vibrating inertial elements (a micromachine) to sense vehicle angular rate via the Coriolis Effect. The angular rate sensing principle of Coriolis Effect is the inspiration behind the practical vibrating angular rate sensors.

The Coriolis Effect can be explained by saying that when an angular rate is applied to a translating or vibrating inertial element, a Coriolis force is generated. When this angular rate is applied to the axis of an oscillating inertial element, its tines receive a Coriolis force, which then produces torsional forces about the sensor axis. These forces are proportional to the applied angular rate, which then can be measured.

The force (or acceleration), Coriolis force (or Coriolis acceleration) or Coriolis effect, is originally named from a French physicist and mathematician, Gaspard de Coriolis (1792–1843), who postulated his acceleration in 1835 as a correction for the earth's rotation in ballistic trajectory calculations. The Coriolis acceleration acts on a body that is moving around a point with a fixed angular velocity and moving radially as well.

The basic equation defining Coriolis force is expressed as follows:

$$\vec{F}_{Coriolis} = m\vec{a}_{Coriolis} = 2m(\vec{\omega} \times \vec{V}_{Oscillation})$$

where $\vec{F}_{Coriolis}$ is the detected Coriolis force;

m is the mass of the inertial element;

$\vec{a}_{Coriolis}$ the generated Coriolis acceleration;

$\vec{\omega}$ is the applied (input) angular rotation rate;

$\vec{V}_{Oscillation}$ is the oscillation velocity in a rotating frame.

The Coriolis force produced is proportional to the product of the mass of the inertial element, the input rotation rate, and the oscillation velocity of the inertial element that is perpendicular to the input rotation rate.

The major problems with micromachined vibrating type angular rate producer are insufficient accuracy, sensitivity, and stability. Unlike MEMS acceleration producers that are passive devices, micromachined vibrating type angular rate producer are active devices. Therefore, associated high performance electronics and control should be invented to effectively use hands-on micromachined vibrating type angular rate producers to achieve high performance angular rate measurements in order to meet the requirement of the micro IMU.

Therefore, in order to obtain angular rate sensing signals from a vibrating type angular rate detecting unit, a dither drive signal or energy must be fed first into the vibrating type angular rate detecting unit to drive and maintain the oscillation of the inertial elements with a constant momentum. The performance of the dither drive signals is critical for the whole performance of a MEMS angular rate producer.

Figure 35:
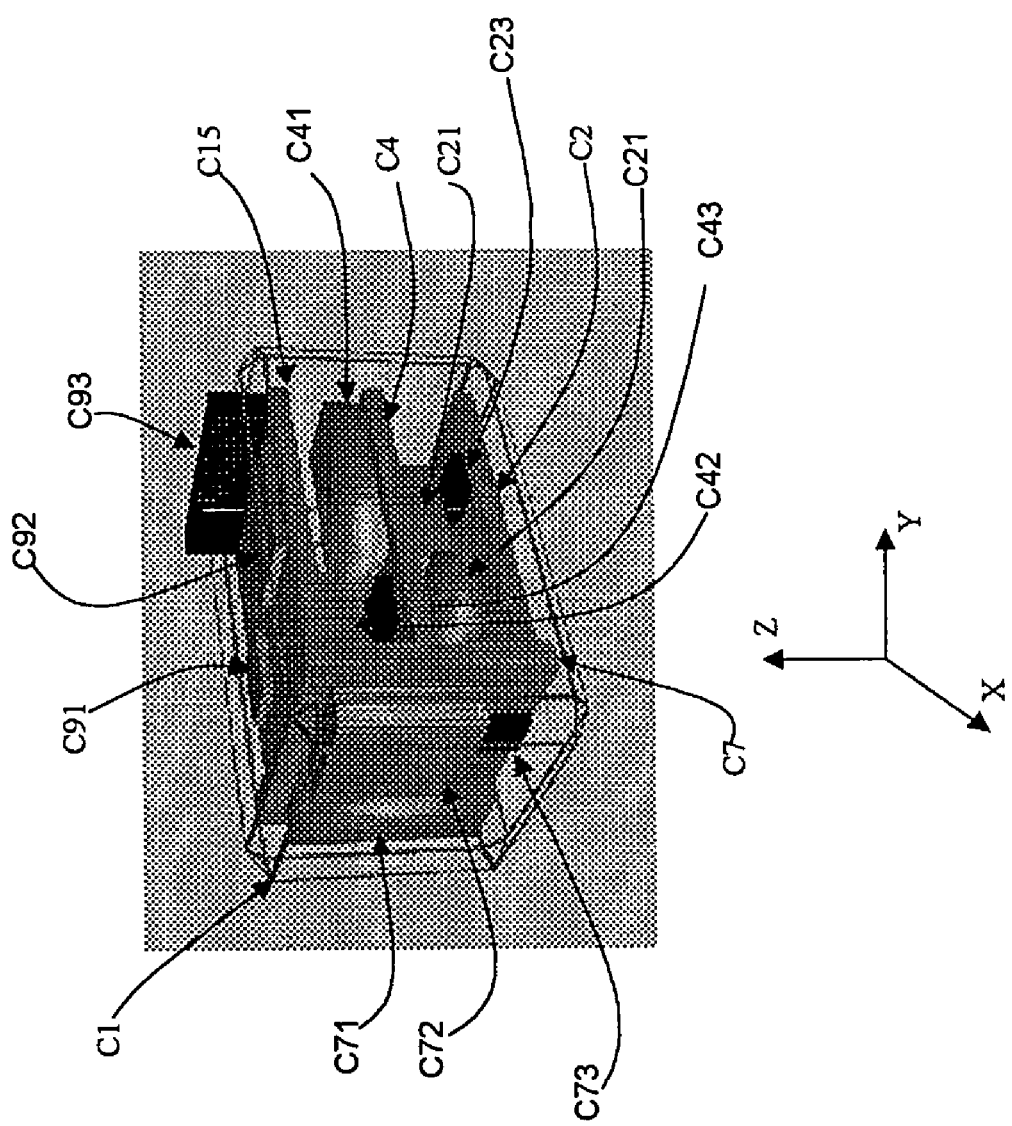
FIG. 35 is a perspective view illustrating the inside mechanical structure and circuit board deployment in the micro IMU according to the above preferred embodiment of the present invention.
Figure 36:
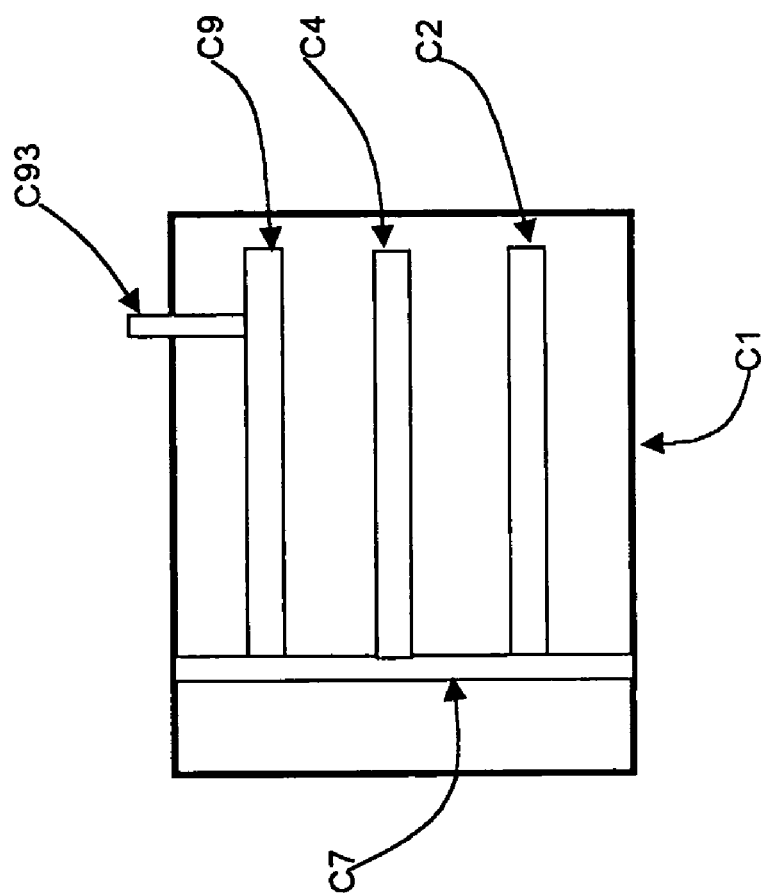
FIG. 36 is a sectional side view of the micro IMU according to the above preferred embodiment of the present invention.

As shown in FIG. 35 and FIG. 36, which are a perspective view and a sectional view of the micro IMU of the present invention as shown in the block diagram of FIG. 32, the micro IMU comprises a first circuit board c2, a second circuit board c4, a third circuit board c7, and a control circuit board c9 arranged inside a metal cubic case c1.

The first circuit board c2 is connected with the third circuit board c7 for producing X axis angular sensing signal and Y axis acceleration sensing signal to the control circuit board c9.

The second circuit board c4 is connected with the third circuit board c7 for producing Y axis angular sensing signal and X axis acceleration sensing signal to the control circuit board c9.

The third circuit board c7 is connected with the control circuit board c9 for producing Z axis angular sensing signal and Z axis acceleration sensing signals to the control circuit board c9.

The control circuit board c9 is connected with the first circuit board c2 and then the second circuit board c4 through the third circuit board c7 for processing the X axis, Y axis and Z axis angular sensing signals and the X axis, Y axis and Z axis acceleration sensing signals from the first, second and control circuit board to produce digital angular increments and velocity increments, position, velocity, and attitude solution.

Figure 37:
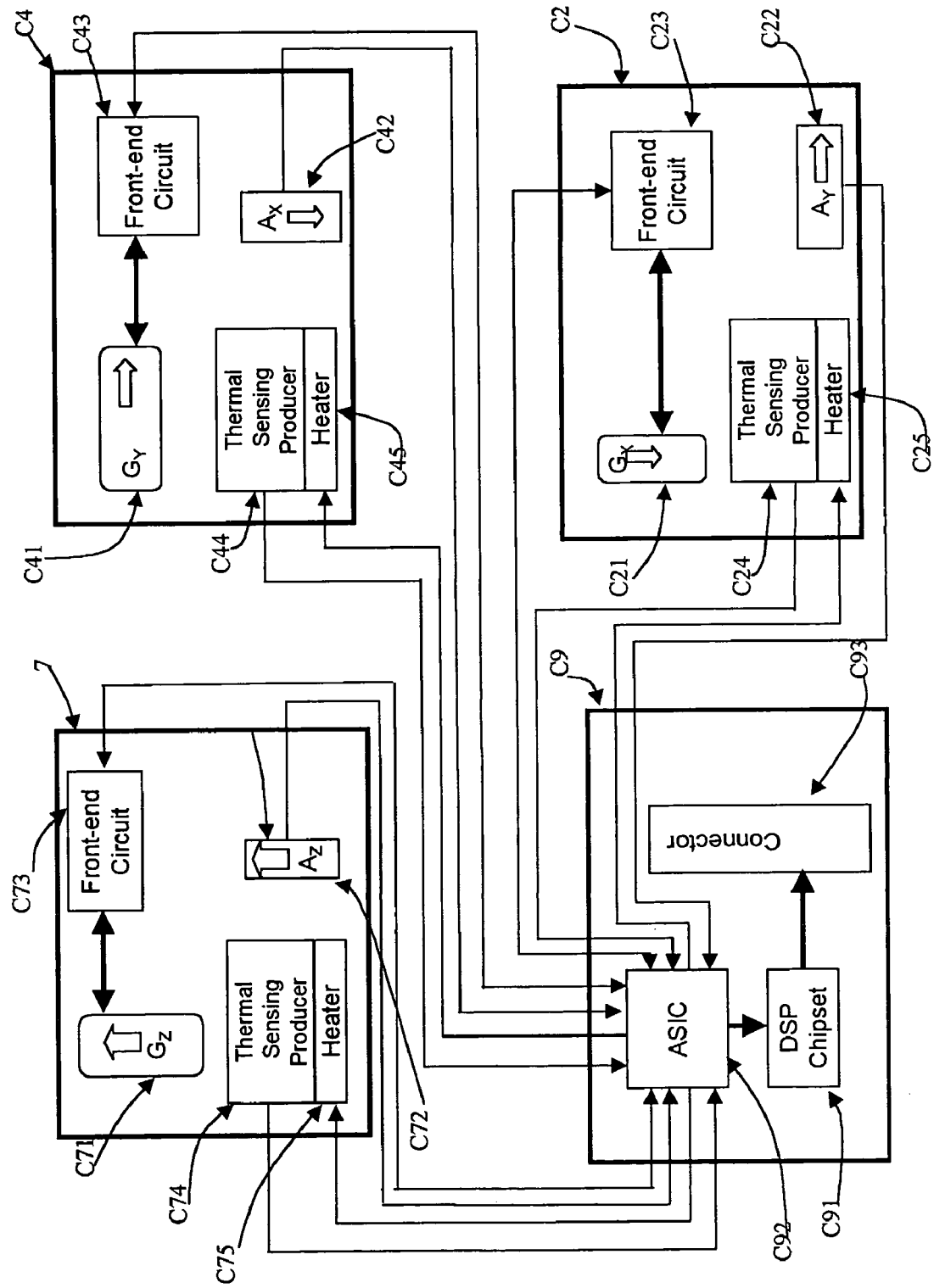
FIG. 37 is a block diagram illustrating the connection among the four circuit boards inside the micro IMU according to the above preferred embodiment of the present invention.
Figure 38:
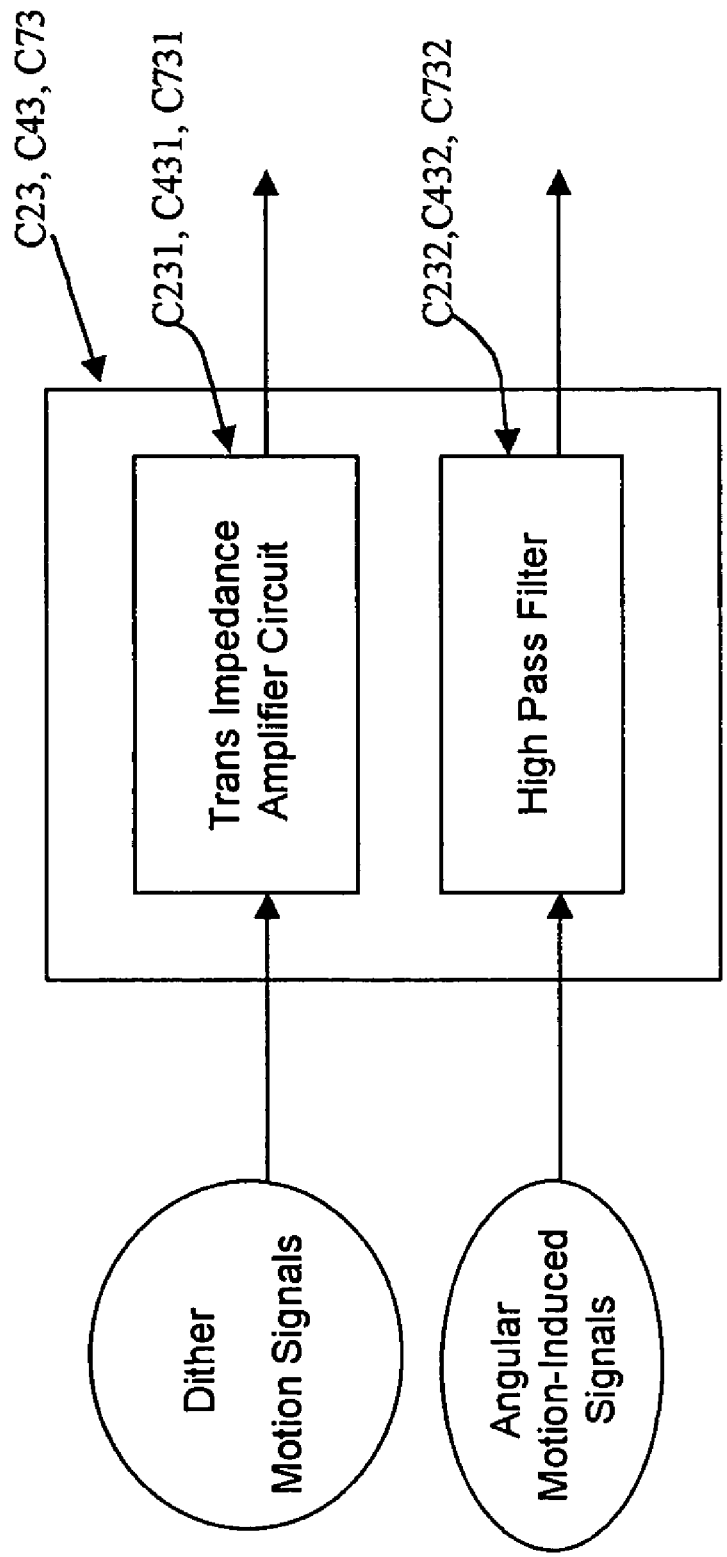
FIG. 38 is a block diagram of the front-end circuit in each of the first, second, and fourth circuit boards of the micro IMU according to the above preferred embodiment of the present invention.
Figure 39:
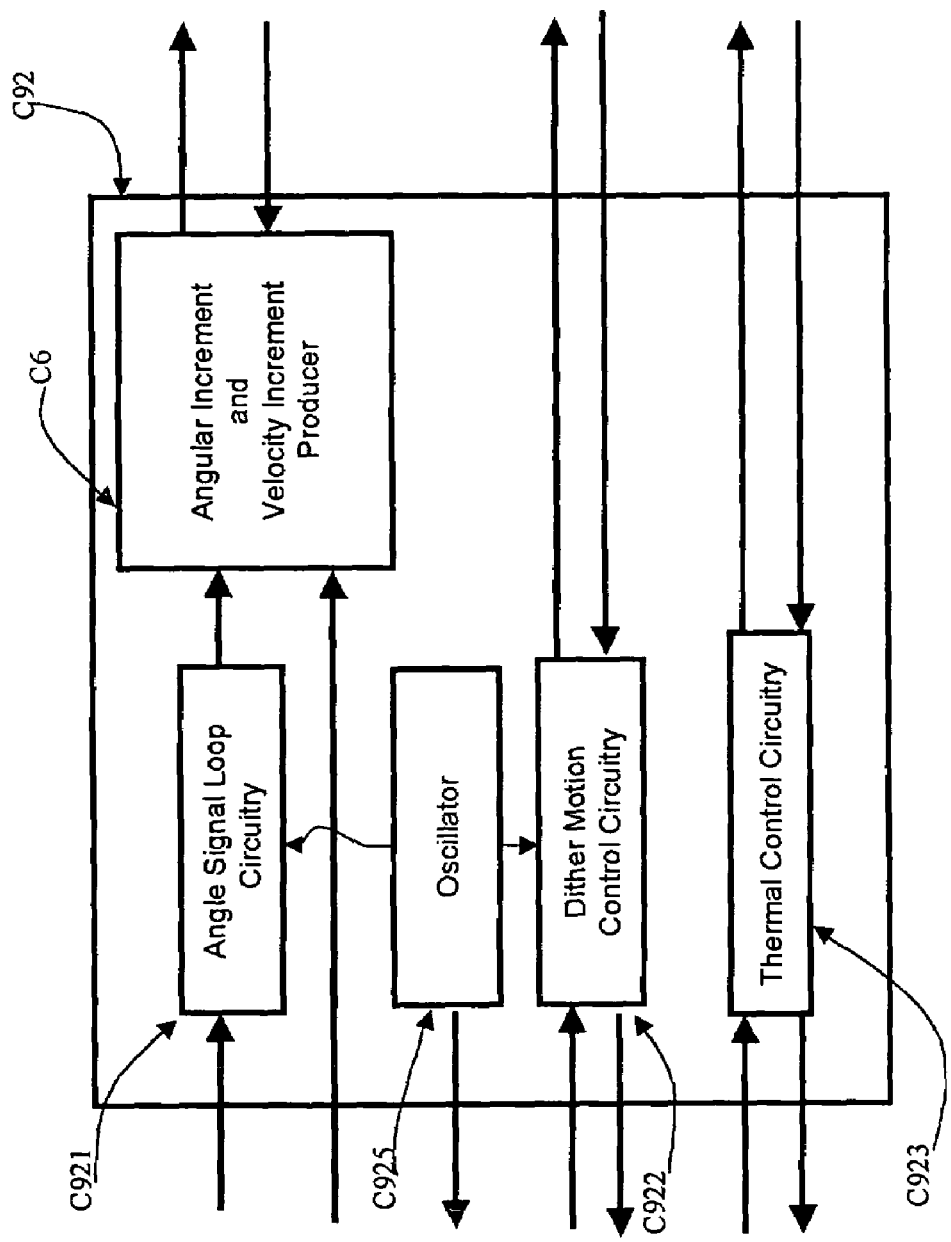
FIG. 39 is a block diagram of the ASIC chip in the third circuit board of the micro IMU according to the above preferred embodiment of the present invention.
Figure 40:
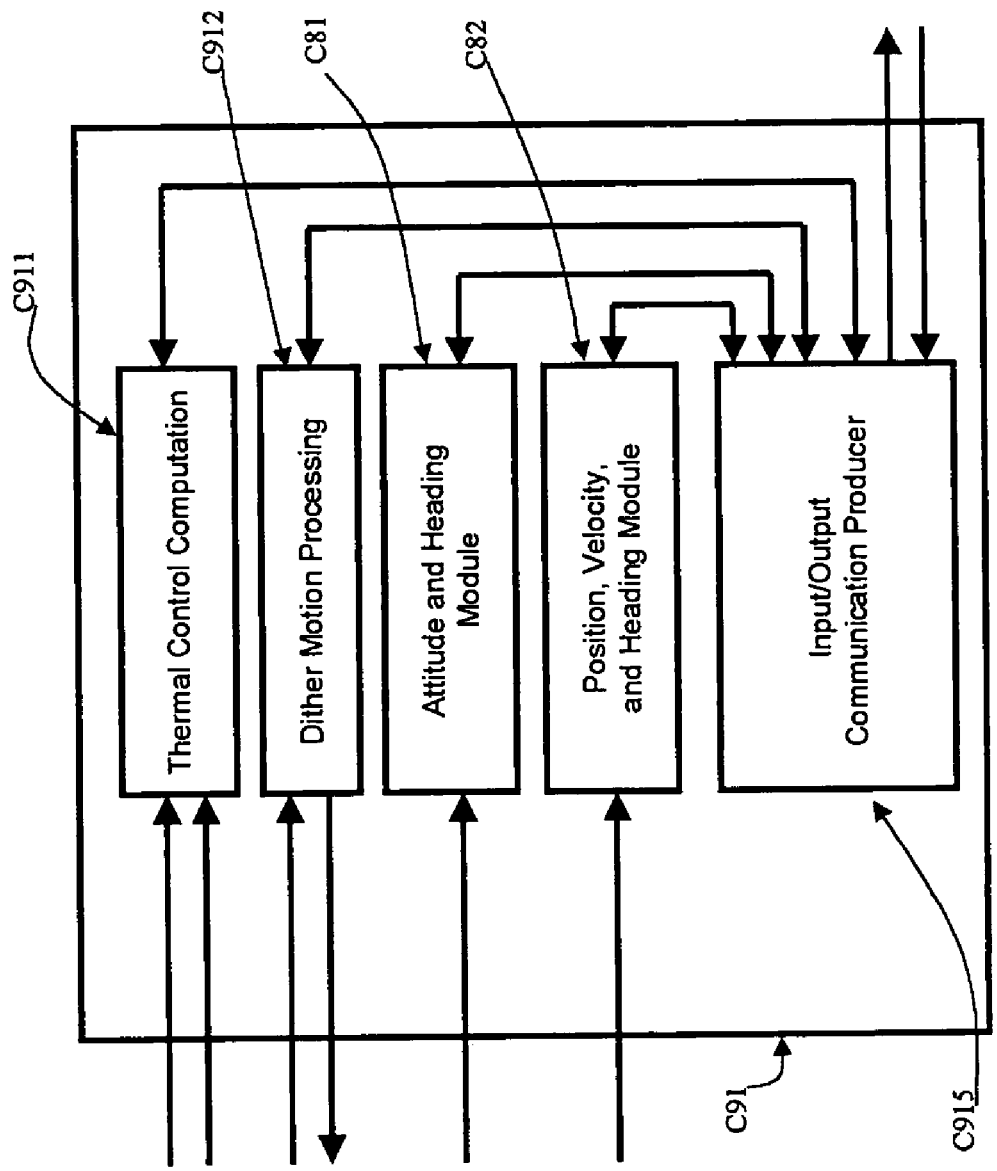
FIG. 40 is a block diagram of processing modules running in the DSP chipset in the third circuit board of the micro IMU according to the above preferred embodiment of the present invention.

As shown in FIG. 37, the angular producer c5 of the preferred embodiment of the present invention comprises:

an X axis vibrating type angular rate detecting unit c21 and a first front-end circuit c23 connected on the first circuit board c2;

a Y axis vibrating type angular rate detecting unit c41 and a second front-end circuit c43 connected on the second circuit board c4;

a Z axis vibrating type angular rate detecting unit c71 and a third front-end circuit c73 connected on the third circuit board c7;

three angular signal loop circuitries c921, which are provided in a ASIC chip c92 connected on the control circuit board c9, for the first, second and third circuit boards c2, c4, c7 respectively;

three dither motion control circuitries c922, which are provided in the ASIC chip c92 connected on the control circuit board c9, for the first, second and third circuit boards c2, c4, c7 respectively;

an oscillator c925 adapted for providing reference pickoff signals for the X axis vibrating type angular rate detecting unit c21, the Y axis vibrating type angular rate detecting unit c41, the Z axis vibrating type angular rate detecting unit c71, the angle signal loop circuitry c921, and the dither motion control circuitry c922; and three dither motion processing modules c912, which run in a DSP (Digital Signal Processor) chipset c91 connected on the control circuit board c9, for the first, second and third circuit boards c2, c4, c7 respectively.

The first, second and third front-end circuits c23, c43, c73, each of which is structurally identical, are used to condition the output signal of the X axis, Y axis and Z axis vibrating type angular rate detecting units c21, c41, c71 respectively and each further comprises:

a trans impedance amplifier circuit c231, c431, c731, which is connected to the respective X axis, Y axis or Z axis vibrating type angular rate detecting unit c21, c41, c71 for changing the output impedance of the dither motion signals from a very high level, greater than 100 million ohms, to a low level, less than 100 ohms to achieve two dither displacement signals, which are A/C voltage signals representing the displacement between the inertial elements and the anchor combs. The two dither displacement signals are output to the dither motion control circuitry c922; and a high-pass filter circuit c232, c432, c732, which is connected with the respective X axis, Y axis or Z axis vibrating type angular rate detecting units c21, c41, c71 for removing residual dither drive signals and noise from the dither displacement differential signal to form a filtered dither displacement differential signal to the angular signal loop circuitry c921.

Each of the X axis, Y axis and Z axis angular rate detecting units c21, c41, and c71 is structurally identical except that sensing axis of each angular rate detecting unit is placed in an orthogonal direction. The X axis angular rate detecting unit c21 is adapted to detect the angular rate of the vehicle along X axis. The Y axis angular rate detecting unit c21 is adapted to detect the angular rate of the vehicle along Y axis. The Z axis angular rate detecting unit c21 is adapted to detect the angular rate of the vehicle along Z axis.

Each of the X axis, Y axis and Z axis angular rate detecting units c21, c41 and c71 is a vibratory device, which comprises at least one set of vibrating inertial elements, including tuning forks, and associated supporting structures and means, including capacitive readout means, and uses Coriolis effects to detect vehicle angular rate.

Each of the X axis, Y axis and Z axis vibrating type angular rate detecting units c21, c41, c71 receives signals as follows:

1) dither drive signals from the respective dither motion control circuitry c922, keeping the inertial elements oscillating; and 2) carrier reference oscillation signals from the oscillator c925, including capacitive pickoff excitation signals.

Each of the X axis, Y axis and Z axis vibrating type angular rate detecting units c21, c41, c71 detects the angular motion in X axis, Y axis and Z axis respectively of a vehicle in accordance with the dynamic theory (Coriolis force), and outputs signals as follows:

1) angular motion-induced signals, including rate displacement signals which may be modulated carrier reference oscillation signals to a trans Impedance amplifier circuit c231, c431, c731 of the first, second, and third front-end circuit c23; and 2) its inertial element dither motion signals, including dither displacement signals, to the high-pass filter c232, c432, c732 of the first, second, and third front-end circuit c23.

The three dither motion control circuitries c922 receive the inertial element dither motion signals from the X axis, Y axis and Z axis vibrating type angular rate detecting units c21, c41, c71 respectively, reference pickoff signals from the oscillator c925, and produce digital inertial element displacement signals with known phase.

In order to convert the inertial element dither motion signals from the X axis, Y axis and Z axis vibrating type angular rate detecting units c21, c41, c71 to processible inertial element dither motion signals, referring to FIG. 42, each of the dither motion control circuitries c922 comprises:

an amplifier and summer circuit c9221 connected to the trans impedance amplifier circuit c231, c431, c731 of the respective first, second or third front-end circuit c23, c43, c73 for amplifying the two dither displacement signals for more than ten times and enhancing the sensitivity for combining the two dither displacement signals to achieve a dither displacement differential signal by subtracting a center anchor comb signal with a side anchor comb signal;

a high-pass filter circuit c9222 connected to the amplifier and summer circuit c9221 for removing residual dither drive signals and noise from the dither displacement differential signal to form a filtered dither displacement differential signal;

a demodulator circuit c9223 connected to the high-pass filter circuit c2225 for receiving the capacitive pickoff excitation signals as phase reference signals from the oscillator c925 and the filtered dither displacement differential signal from the high-pass filter c9222 and extracting the in-phase portion of the filtered dither displacement differential signal to produce an inertial element displacement signal with known phase;

a low-pass filter c9225 connected to the demodulator circuit c9223 for removing high frequency noise from the inertial element displacement signal input thereto to form a low frequency inertial element displacement signal;

an analog/digital converter c9224 connected to the low-pass filter c9225 for converting the low frequency inertial element displacement analog signal to produce a digitized low frequency inertial element displacement signal to the dither motion processing module c912 (disclosed in the following text) running the DSP chipset c91;

a digital/analog converter c9226 processing the selected amplitude from the dither motion processing module c912 to form a dither drive signal with the correct amplitude; and an amplifier c9227 which generates and amplifies the dither drive signal to the respective X axis, Y axis or Z axis vibrating type angular rate detecting unit c21, c41, c71 based on the dither drive signal with the selected frequency and correct amplitude.

The oscillation of the inertial elements residing inside each of the X axis, Y axis and Z axis vibrating type angular rate detecting units c21, c41, c71 is generally driven by a high frequency sinusoidal signal with precise amplitude. It is critical to provide the X axis, Y axis and Z axis vibrating type angular rate detecting units c21, c41, c71 with high performance dither drive signals to achieve keen sensitivity and stability of X-axis, Y-axis and Z axis angular rate measurements.

The dither motion processing module c912 receives digital inertial element displacement signals with known phase from the analog/digital converter c9224 of the dither motion control circuitry c922 for:

(1) finding the frequencies which have the highest Quality Factor (Q) Values, (2) locking the frequency, and (3) locking the amplitude to produce a dither drive signal, including high frequency sinusoidal signals with a precise amplitude, to the respective X axis, Y axis or Z axis vibrating type angular rate detecting unit c21, c41, c71 to keep the inertial elements oscillating at the pre-determined resonant frequency.

The three dither motion processing modules c912 is to search and lock the vibrating frequency and amplitude of the inertial elements of the respective X axis, Y axis or Z axis vibrating type angular rate detecting unit c21, c41, c71. Therefore, the digitized low frequency inertial element displacement signal is first represented in terms of its spectral content by using discrete Fast Fourier Transform (FFT).

Discrete Fast Fourier Transform (FFT) is an efficient algorithm for computing discrete Fourier transform (DFT), which dramatically reduces the computation load imposed by the DFT. The DFT is used to approximate the Fourier transform of a discrete signal. The Fourier transform, or spectrum, of a continuous signal is defined as:

$$X(j\omega) = \int_{-\infty}^{\infty} x(t)e^{-j\omega t}dt$$

The DFT of N samples of a discrete signals X(nT) is given by:

$$X_s(k\omega) = \sum_{n=0}^{N-1} x(nT)e^{-j\omega Tnk}$$

where $\omega=2\pi/NT$, T is the inter-sample time interval. The basic property of FFT is its ability to distinguish waves of different frequencies that have been additively combined.

After the digitized low frequency inertial element displacement signals are represented in terms of their spectral content by using discrete Fast Fourier Transform (FFT), Q (Quality Factor) Analysis is applied to their spectral content to determine the frequency with global maximal Q value. The vibration of the inertial elements of the respective X axis, Y axis or Z axis vibrating type angular rate detecting unit c21, c41, c71 at the frequency with global maximal Q value can result in minimal power consumption and cancel many of the terms that affect the excited mode. The Q value is a function of basic geometry, material properties, and ambient operating conditions.

A phase-locked loop and digital/analog converter is further used to control and stabilize the selected frequency and amplitude.

Referring to FIG. 44, the dither motion processing module c912 further includes a discrete Fast Fourier Transform (FFT) module c9121, a memory array of frequency and amplitude data module c9122, a maxima detection logic module c9123, and a Q analysis and selection logic module c9124 to find the frequencies which have the highest Quality Factor (Q) Values.

The discrete Fast Fourier Transform (FFT) module c9121 is arranged for transforming the digitized low frequency inertial element displacement signal from the analog/digital converter c9224 of the dither motion control circuitry c922 to form amplitude data with the frequency spectrum of the input inertial element displacement signal.

The memory array of frequency and amplitude data module c9122 receives the amplitude data with frequency spectrum to form an array of amplitude data with frequency spectrum.

The maxima detection logic module c9123 is adapted for partitioning the frequency spectrum from the array of the amplitude data with frequency into plural spectrum segments, and choosing those frequencies with the largest amplitudes in the local segments of the frequency spectrum.

The Q analysis and selection logic module c9124 is adapted for performing Q analysis on the chosen frequencies to select frequency and amplitude by computing the ratio of amplitude/bandwidth, wherein the range for computing bandwidth is between +−½ of the peek for each maximum frequency point.

Moreover, the dither motion processing module c912 further includes a phase-lock loop c9125 to reject noise of the selected frequency to form a dither drive signal with the selected frequency, which serves as a very narrow bandpass filter, locking the frequency.

Figure 41:
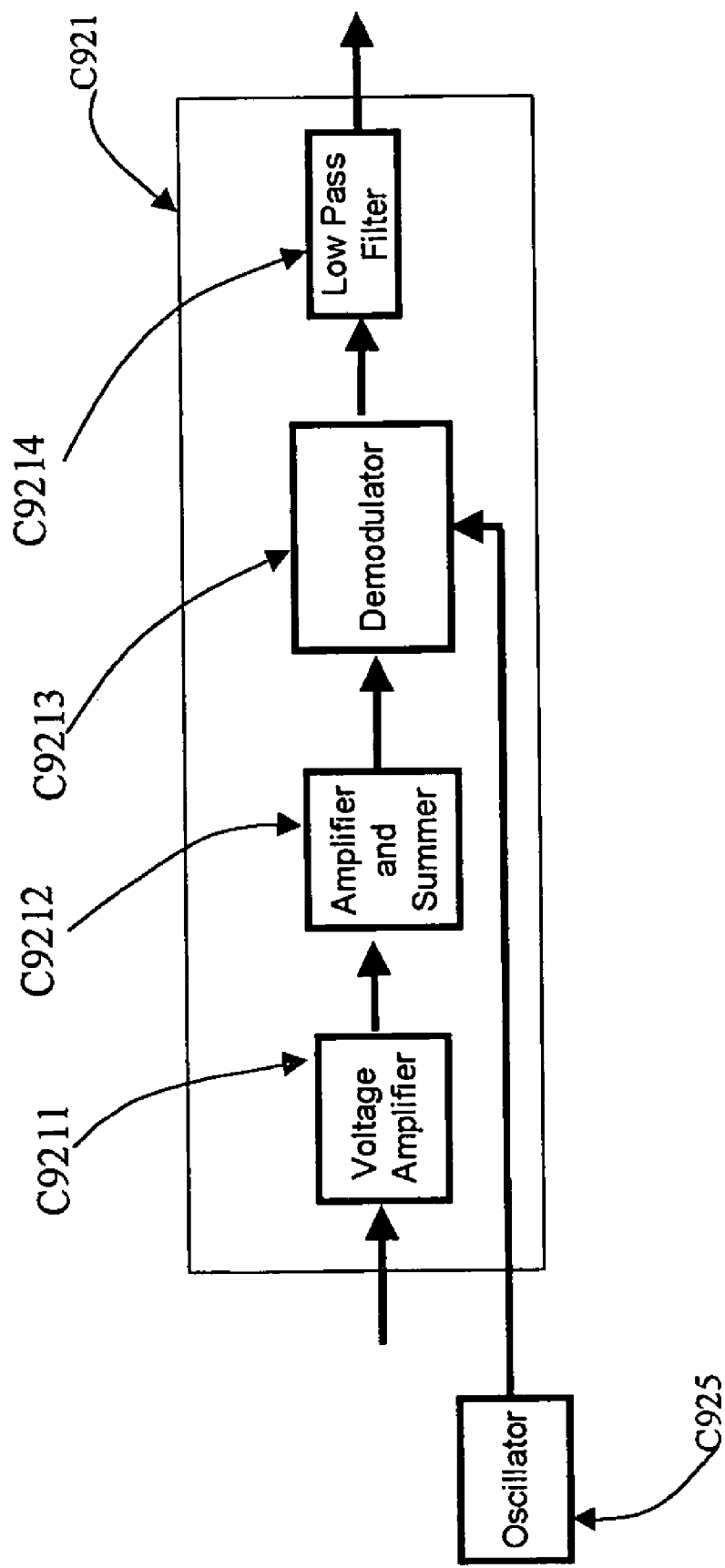
FIG. 41 is a block diagram of the angle signal loop circuitry of the ASIC chip in the third circuit board of the micro IMU according to the above preferred embodiment of the present invention.

The three angle signal loop circuitries c921 receive the angular motion-induced signals from the X axis, Y axis and Z axis vibrating type angular rate detecting units c21, c41, c71 respectively, reference pickoff signals from the oscillator c925, and transform the angular motion-induced signals into angular rate signals. Referring to FIG. 41, each of the angle signal loop circuitries c921 for the respective first, second or third circuit board c2, c4, c7 comprises:

a voltage amplifier circuit c9211, which amplifies the filtered angular motion-induced signals from the high-pass filter circuit c232 of the respective first, second or third front-end circuit c23, c43, c73 to an extent of at least 100 milivolts to form amplified angular motion-induced signals;

an amplifier and summer circuit c9212, which subtracts the difference between the angle rates of the amplified angular motion-induced signals to produce a differential angle rate signal;

a demodulator c9213, which is connected to the amplifier and summer circuit c9212, extracting the amplitude of the in-phase differential angle rate signal from the differential angle rate signal and the capacitive pickoff excitation signals from the oscillator c925;

a low-pass filter c9214, which is connected to the demodulator c9213, removing the high frequency noise of the amplitude signal of the in-phase differential angle rate signal to form the angular rate signal output to the angular increment and velocity increment producer c6.

Figure 28:
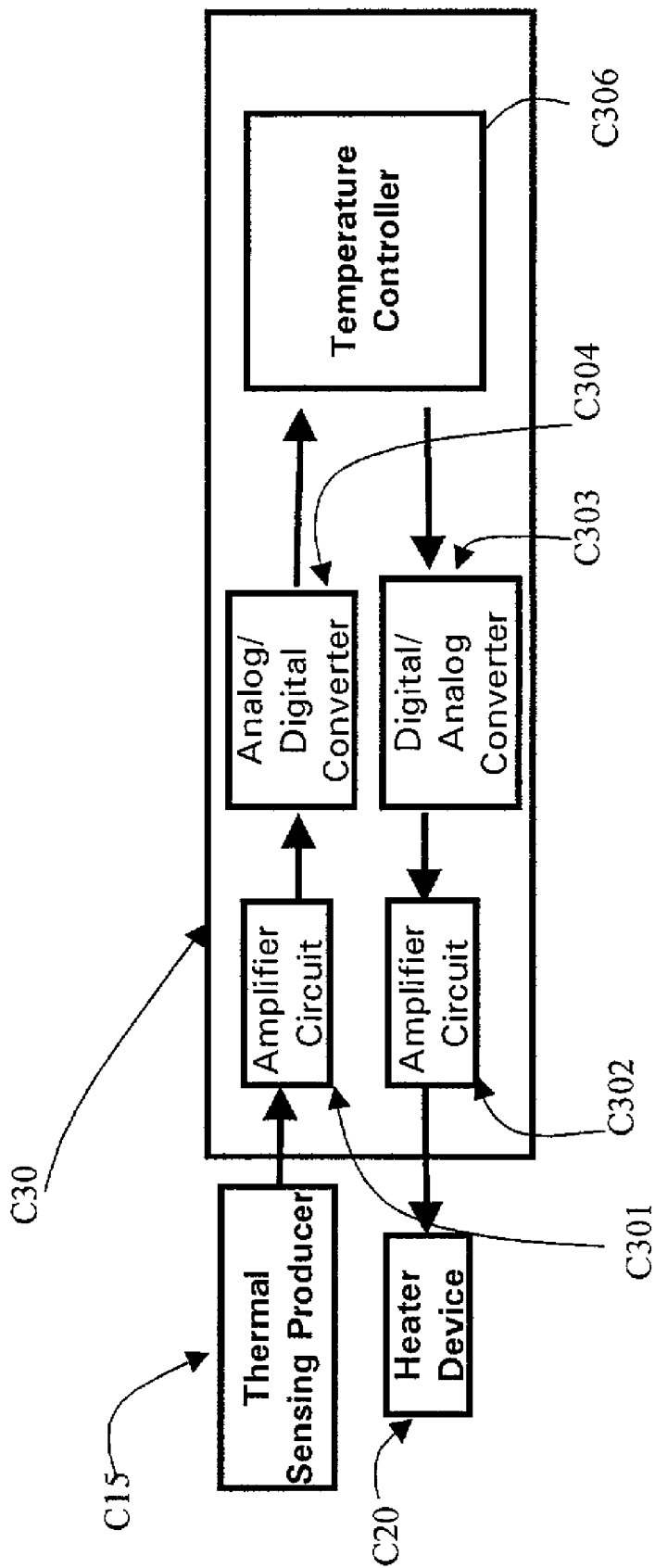
FIG. 28 is a block diagram illustrating another thermal processor for outputting analog voltage signals of the thermal sensing producer according to the above preferred embodiment of the present invention.

Referring to FIGS. 28 to 30, the acceleration producer c10 of the preferred embodiment of the present invention comprises:

a X axis accelerometer c42, which is provided on the second circuit board c4 and connected with the angular increment and velocity increment producer 6 provided in the AISC chip c92 of the control circuit board c9;

a Y axis accelerometer c22, which is provided on the first circuit board c2 and connected with angular increment and velocity increment producer c6 provided in the AISC chip c92 of the control circuit board c9; and a Z axis accelerometer c72, which is provided on the third circuit board 7 and connected with angular increment and velocity increment producer 6 provided in the AISC chip c92 of the control circuit board c9.

Referring to FIGS. 20, 36 and FIG. 37, thermal sensing producer device c15 of the preferred embodiment of the present invention further comprises:

a first thermal sensing producing unit c24 for sensing the temperature of the X axis angular rate detecting unit c21 and the Y axis accelerometer c22;

a second thermal sensing producer c44 for sensing the temperature of the Y axis angular rate detecting unit c41 and the X axis accelerometer c42; and a third thermal sensing producer c74 for sensing the temperature of the Z axis angular rate detecting unit c71 and the Z axis accelerometer c72.

Referring to FIGS. 20 and 37, the heater device c20 of the preferred ok, embodiment of the present invention further comprises:

a first heater c25, which is connected to the X axis angular rate detecting unit c21, the Y axis accelerometer c22, and the first front-end circuit c23, for maintaining the predetermined operational temperature of the X axis angular rate detecting unit c21, the Y axis accelerometer c22, and the first front-end circuit c23;

a second heater c45, which is connected to the Y axis angular rate detecting unit c41, the X axis accelerometer c42, and the second front-end circuit c43, for maintaining the predetermined operational temperature of the X axis angular rate detecting unit c41, the X axis accelerometer c42, and the second front-end circuit c43; and a third heater c75, which is connected to the Z axis angular rate detecting unit c71, the Z axis accelerometer c72, and the third front-end circuit c73, for maintaining the predetermined operational temperature of the Z axis angular rate detecting unit c71, the Z axis accelerometer c72, and the third front-end circuit c73.

Referred to FIGS. 20, 29, 30, 39, and 40, the thermal processor c30 of the preferred embodiment of the present invention further comprises three identical thermal control circuitries c923 and the thermal control computation modules c9 11 running the DSP chipset c91.

Figure 43:
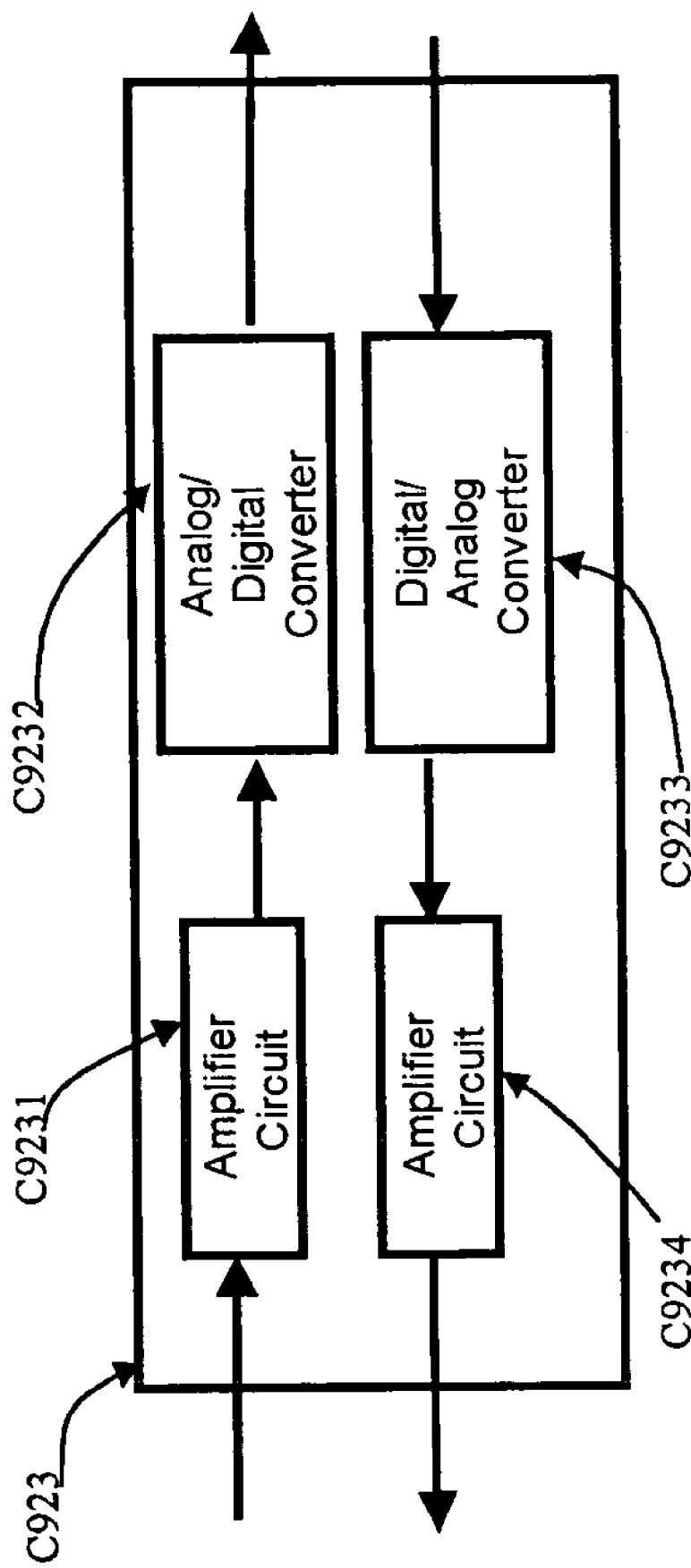
FIG. 43 is a block diagram of the thermal control circuit of the ASIC chip in the third circuit board of the micro IMU according to the above preferred embodiment of the present invention.

As shown in FIGS. 37 and 43, each of the thermal control circuitries c923 further comprises:

a first amplifier circuit c9231, which is connected with the respective X axis, Y axis or Z axis thermal sensing producer c24, c44, c74, for amplifying the signals and suppressing the noise residing in the temperature voltage signals from the respective X axis, Y axis or Z axis thermal sensing producer c24, c44, c74 and improving the signal-to-noise ratio;

an analog/digital converter c9232, which is connected with the amplifier circuit c9231, for sampling the temperature voltage signals and digitizing the sampled temperature voltage signals to digital signals, which are output to the thermal control computation module c911;

a digital/analog converter c9233 which converts the digital temperature commands input from the thermal control computation module c911 into analog signals; and a second amplifier circuit c9234, which receives the analog signals from the digital/analog converter 9233, amplifying the input analog signals from the digital/analog converter c9233 for driving the respective first, second or third heater c25, c45, c75; and closing the temperature controlling loop.

The thermal control computation module c911 computes digital temperature commands using the digital temperature voltage signals from the analog/digital converter c9232, the temperature sensor scale factor, and the pre-determined operating temperature of the angular rate producer and acceleration producer, wherein the digital temperature commands are connected to the digital/analog converter c9233.

Figure 31:
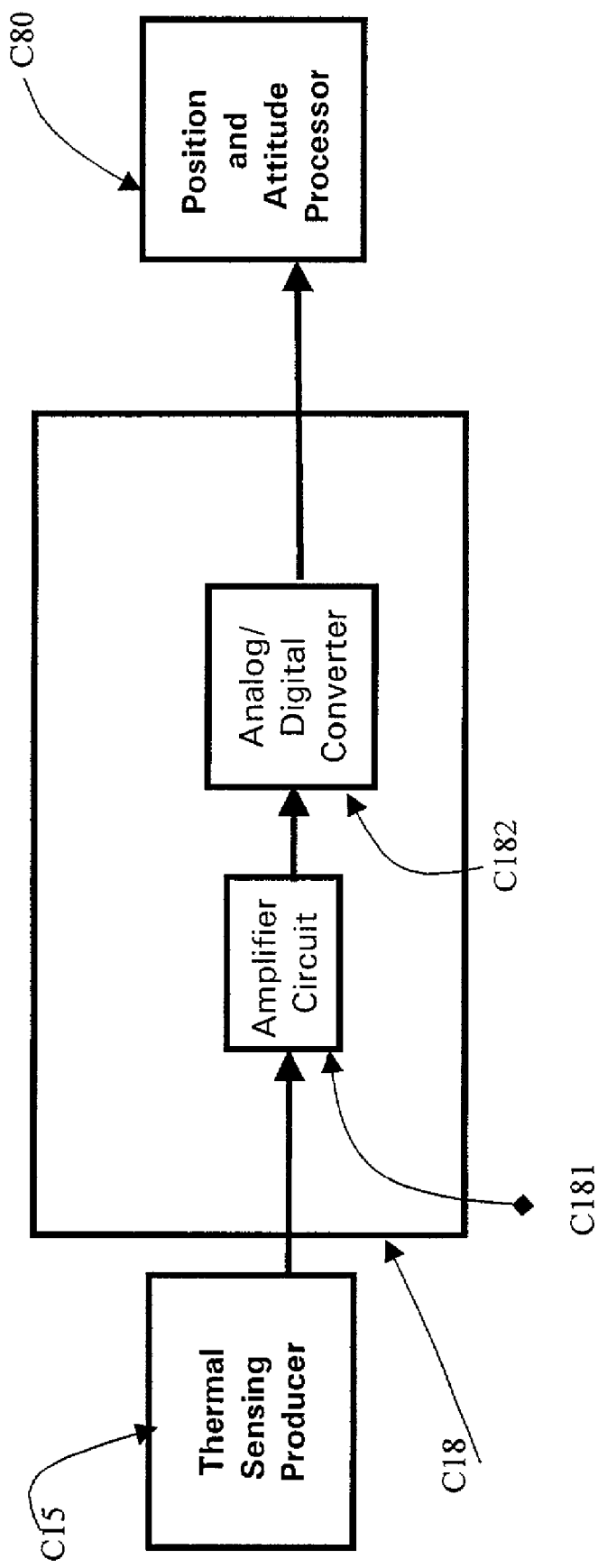
FIG. 31 is a block diagram illustrating a temperature digitizer for outputting analog voltage signals of the thermal sensing producer according to the above preferred embodiment of the present invention.

In order to achieve a high degree of full functional performance for the micro IMU, a specific package of the first circuit board c2, the second circuit board c4, the third circuit board c7, and the control circuit board c9 of the preferred embodiment of the present invention is provided and disclosed as follows:

In the preferred embodiment of the present invention, as shown in FIGS. 35, 31, and 32, the third circuit board c7 is bonded to a supporting structure by means of a conductive epoxy, and the first circuit board c2, the second circuit board c4, and the control circuit board c9 are arranged in parallel to bond to the third circuit board c7 perpendicularly by a non conductive epoxy.

In other words, the first circuit board c2, the second circuit board c4, and the control circuit board c9 are soldered to the third circuit board c7 in such a way as to use the third circuit board c7 as an interconnect board, thereby avoiding the necessity to provide interconnect wiring, so as to minimize the small size.

The first, second, third, and control circuit boards c2, c4, c7, and c9 are constructed using ground planes which are brought out to the perimeter of each circuit board c2, c4, c7, c9, so that the conductive epoxy can form a continuous ground plane with the supporting structure. In this way the electrical noise levels are minimized and the thermal gradients are reduced. Moreover, the bonding process also reduces the change in misalignments due to structural bending caused by acceleration of the IMU.

What is claimed is:

1. A self-contained/interruption-free positioning system for a user on earth surface, comprising:

a main inertial measurement unit (IMU) based self-contained/interruption-free positioning module is utilized for sensing motion measurements of said user and producing self-contained/interruption-free positioning data of said user;

a positioning assistant providing interruptible positioning data to assist said main IMU based self-contained/interruption-free positioning module to achieve improved self-contained/interruption-free positioning data of said user;

a wireless communication device for exchanging said improved self-contained/interruption-free positioning data with other users;

a map database providing map data to obtain a surrounding map information of location of said user by accessing said map database using said improved self-contained/interruption-free positioning data; and a display device for visualizing said improved self-contained/interruption-free positioning data of said user using said surrounding map information;

wherein said main IMU based self-contained/interruption-free positioning module comprises:

an inertial measurement unit (IMU) for sensing traveling displacement motions of said user so as to produce digital angular increments and velocity increments data in response to said traveling displacement motions of said user;

a north finder producing a heading measurement of said user;

a velocity producer producing velocity data in a body frame of said user; and a navigation processor connected with said inertial measurement unit, said north finder, said velocity producer, and said positioning assistant, so as to receive said digital angular increments and velocity increments data, said heading measurement, said velocity data in said body frame, and the interruptible positioning data from said positioning assistant to produce IMU position, veiocity, and attitude data, and an optimal estimate of errors of said IMU position, velocity, and attitude data for correcting said IMU position, velocity, and attitude data error to output corrected IMU position, velocity and attitude data.

2. The self-contained/interruption-free positioning system, as recited in claim 1, wherein said main IMU based self-contained/interruption-free positioning module further comprises an altitude measurement device for producing altitude measurement of said user to form a mean sea level height of said user.

3. The self-contained/interruption-free positioning system, as recited in claim 2, wherein said navigation processor utilizes an inertial navigation processing module for producing said IMU position, velocity, and attitude data, and an optimal filtering module for producing said optimal estimate of errors of said IMU position, velocity, and attitude data.

4. The self-contained/interruption-free positioning system, as recited in claim 3, wherein said navigation processor provides an integration Kalman filter to estimate and compensate INS errors and sensor errors.

5. The self-contained/interruption-free positioning system, as recited in claim 3, wherein said positioning assistant is a radio positioning system based on said wireless communication device.

6. The self-contained/interruption-free positioning system, as recited in claim 5, wherein said navigation processor further provides:

an INS computation module, using said digital angular increments and velocity increments signals from said inertial measurement unit to produce inertial positioning measurement;

an integration Kalman filter for estimating errors of said inertial positioning measurements to calibrate inertial positioning errors;

a magnetic sensor processing module for producing a heading angle;

a velocity producer processing module for producing relative position error measurements for said integration Kalman filter; and an altitude measurement processing module for forming said mean sea level height in a digital data type using said altitude measurement.

7. The self-contained/interruption-free positioning system, as recited in claim 6, wherein said INS computation module further comprises:

a sensor compensation module for calibrating errors of said digital angular increments and velocity increments signals: and an inertial navigation algorithm module for computing IMU position, velocity and attitude data.

8. The self-contained/interruption-free positioning system, as recited in claim 7, wherein said inertial navigation algorithm module comprises:

an attitude integration module for integrating said angular increments into said attitude data;

a velocity integration module for transforming said measured velocity increments into a navigation coordinate frame by using said attitude data to form transformed velocity increments which are integrated into said velocity data; and a position integration module for integrating said navigation frame velocity data into said position data.

9. The self-contained/interruption-free positioning system, as recited in claim 8, wherein said velocity producer processing module further comprises:

a transformation module for transforming an input velocity data expressed in said body frame to a velocity expressed in a navigation frame;

a scale factor and misalignment error compensation module for compensating scale factor and misalignment errors in said velocity; and a relative position computation for receiving said IMU velocity and attitude data and compensated velocity to form said relative position error measurements for said integration Kalman filter.

10. The self-contained/interruption-free positioning system, as recited in claim 9, wherein said integration Kalman filter comprises:

a motion test module for determining if said user stops automatically;

a GPS integrity monitor for determining if GPS data is available;

a measurement and time varying matrix formation module for formulating said measurement and time varying matrix for said state estimation module according to a motion status of said user from said motion test module and GPS data availability from said GPS integrity monitor; and a state estimation module for filtering said measurements and obtaining said optimal estimates of said IMU positioning errors.

11. The self-contained/interruption-free positioning system, as recited in claim 10, wherein said state estimation module provides a horizontal filter for obtaining said estimates of said horizontal IMU positioning errors, and a vertical filter for obtaining said estimates of vertical IMU positioning errors.

12. The self-contained/interruption-free positioning system, as recited in claim 11, wherein said motion test module provides:

a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

13. The self-contained/interruption-free positioning system, as recited in claim 2, wherein said north finder is a magnetic sensor, including a flux valve and a magnetometer, for sensing earth's magnetic field to measure said heading angle of said user.

14. The self-contained/interruption-free positioning system, as recited in claim 13, wherein said velocity producer provides relative velocity measurements of said user to a ground by sensing Doppler frequencies based on a Doppler effect.

15. The self-contained/interruption-free positioning system, as recited in claim 14, wherein said velocity producer is a radio frequency (RF) velocity producer which includes a radar.

16. The self-contained/interruption-free positioning system, as recited in claim 14, wherein said velocity producer is an acoustic velocity producer which includes a sensor.

17. The self-contained/interruption-free positioning system, as recited in claim 14, wherein said velocity producer is a laser velocity producer which includes a laser radar.

18. The self-contained/interruption-free positioning system, as recited in claim 17, wherein said positioning assistant includes a GPS receiver connected with said navigation processor to receive GPS RF (radio frequency) signals to produce GPS positioning data to said navigation processor in order to further improve accuracy of said self-contained/interruption-free positioning data when said GPS signals are available.

19. The self-contained/interruption-free positioning system, as recited in claim 18, wherein said navigation processor further provides:
an INS computation module, using said digital angular increments and velocity increments signals from said inertial measurement unit to produce inertial positioning measurement;
an integration Kalman filter for estimating errors of said inertial positioning measurements to calibrate inertial positioning errors;
a magnetic sensor processing module for producing a heading angle;
a velocity producer processing module for producing relative position error measurements for said integration Kalman filter; and
an altitude measurement processing module for forming said mean sea level height in a digital data type using said altitude measurement.

20. The self-contained/interruption-free positioning system, as recited in claim 19, wherein said INS computation module further comprises:
a sensor compensation module for calibrating errors of said digital angular increments and velocity increments signals; and
an inertial navigation algorithm module for computing IMU position, velocity and attitude data.

21. The self-contained/interruption-free positioning system, as recited in claim 20, wherein said inertial navigation algorithm module comprises:
an attitude integration module for integrating said angular increments into said attitude data;
a velocity integration module for transforming said measured velocity increments into a navigation coordinate frame by using said attitude data to form transformed velocity increments which are integrated into said velocity data; and
a position integration module for integrating said navigation frame velocity data into said position data.

22. The self-contained/interruption-free positioning system, as recited in claim 21, wherein said velocity producer processing module further comprises:

a transformation module for transforming an input velocity data expressed in said body frame to a velocity expressed in a navigation frame;
a scale factor and misalignment error compensation module for compensating scale factor and misalignment errors in said velocity; and
a relative position computation for receiving said IMU velocity and attitude data and compensated velocity to form said relative position error measurements for said integration Kalman filter.

23. The self-contained/interruption-free positioning system, as recited in claim 22, wherein said integration Kalman filter comprises:
a motion test module for determining if said user stops automatically;
a GPS integrity monitor for determining if said GPS data is available;
a measurement and time varying matrix formation module for formulating said measurement and time varying matrix for said state estimation module according to a motion status of said user from said motion test module and GPS data availability from said GPS integrity monitor; and
a state estimation module for filtering said measurements and obtaining said optimal estimates of said IMU positioning errors.

24. The self-contained/interruption-free positioning system, as recited in claim 23, wherein said state estimation module provides a horizontal filter for obtaining said estimates of said horizontal IMU positioning errors, and a vertical filter for obtaining said estimates of vertical IMU positioning errors.

25. The self-contained/interruption-free positioning system, as recited in claim 24, wherein said motion test module provides:
a velocity producer change test module for receiving said velocity producer reading to determine if said user stops or restarts;
a system velocity change test module for comparing system velocity change between a current interval and a previous interval to determine if said user stops or restarts;
a system velocity test module for comparing a system velocity magnitude with a predetermined value to determine whether said user stops or restarts; and
an attitude change test module for comparing said system attitude magnitude with a predetermined value to determine whether said user stops or restarts.

26. The self-contained/interruption-free positioning system, as recited in claim 14, wherein said positioning assistant includes a GPS receiver connected with said navigation processor to receive GPS RF (radio frequency) signals to produce GPS positioning data to said navigation processor in order to further improve accuracy of said self-contained/interruption-free positioning data when said GPS signals are available.

27. The self-contained/interruption-free positioning system, as recited in claim 14, wherein said positioning assistant is a radio positioning system based on said wireless communication device.

28. The self-contained/interruption-free positioning system, as recited in claim 27, wherein said navigation processor further provides:
an INS computation module, using said digital angular increments and velocity increments signals from said inertial measurement unit to produce inertial positioning measurement;

an integration Kalman filter for estimating errors of said inertial positioning measurements to calibrate inertial positioning errors;

a magnetic sensor processing module for producing a heading angle;

a velocity producer processing module for producing relative position error measurements for said integration Kalman filter; and an altitude measurement processing module for forming said mean sea level height in a digital data type using said altitude measurement.

29. The self-contained/interruption-free positioning system, as recited in claim 28, wherein said INS computation module further comprises:

a sensor compensation module for calibrating errors of said digital angular increments and velocity increments signals: and an inertial navigation algorithm module for computing IMU position, velocity and attitude data.

30. The self-contained/interruption-free positioning system, as recited in claim 29, wherein said inertial navigation algorithm module comprises:

an attitude integration module for integrating said angular increments into said attitude data;

a velocity integration module for transforming said measured velocity increments into a navigation coordinate frame by using said attitude data to form transformed velocity increments which are integrated into said velocity data; and a position integration module for integrating said navigation frame velocity data into said position data.

31. The self-contained/interruption-free positioning system, as recited in claim 30, wherein said velocity producer processing module further comprises:

a transformation module for transforming an input velocity data expressed in said body frame to a velocity expressed in a navigation frame;

a scale factor and misalignment error compensation module for compensating scale factor and misalignment errors in said velocity; and a relative position computation for receiving said IMU velocity and attitude data and compensated velocity to form said relative position error measurements for said integration Kalman filter.

32. The self-contained/interruption-free positioning system, as recited in claim 31, wherein said integration Kalman filter comprises:

a motion test module for determining if said user stops automatically;

a GPS integrity monitor for determining if a GPS data is available;

a measurement and time varying matrix formation module for formulating said measurement and time varying matrix for said state estimation module according to a motion status of said user from said motion test module and GPS data availability from said GPS integrity monitor; and a state estimation module for filtering said measurements and obtaining said optimal estimates of said IMU positioning errors.

33. The self-contained/interruption-free positioning system, as recited in claim 32, wherein said state estimation module provides a horizontal filter for obtaining said estimates of said horizontal IMU positioning errors, and a vertical filter for obtaining said estimates of vertical IMU positioning errors.

34. The self-contained/interruption-free positioning system, as recited in claim 33, wherein said motion test module provides:

a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

35. The self-contained/interruption-free positioning system, as recited in claim 2 or 34, wherein said inertial measurement unit is a coremicro inertial measurement unit which comprises:

an angular rate producer for producing X axis, Y axis and Z axis angular rate electrical signals;

an acceleration producer for producing X axis, Y axis and Z axis acceleration electrical signals; and an angular increment and velocity increment producer for converting said X axis, Y axis and Z axis angular rate electrical signals into digital angular increments and converting said input X axis, Y axis and Z axis acceleration electrical signals into digital velocity increments.

36. The self-contained/interruption-free positioning system, as recited in claim 35, wherein said coremicro inertial measurement unit further comprises a thermal controlling means for maintaining a predetermined operating temperature of said angular rate producer, said acceleration producer and said angular increment and velocity increment producer.

37. The self-contained/interruption-free positioning system, as recited in claim 36, wherein said thermal controlling means comprises a thermal sensing producer device, a heater device and a thermal processor, wherein said thermal sensing producer device, which produces temperature signals, is processed in parallel with said angular rate producer and said acceleration producer for maintaining a predetermined operating temperature of said angular rate producer and said acceleration producer and angular increment and velocity increment producer, wherein said predetermined operating temperature is a constant designated temperature selected between 150° F. and 185° F., wherein said temperature signals produced from said thermal sensing producer device are input to said thermal processor for computing temperature control commands using said temperature signals, a temperature scale factor, and a predetermined operating temperature of said angular rate producer and said acceleration producer, and produce driving signals to said heater device using said temperature control commands for controlling said heater device to provide adequate heat for maintaining said predetermined operating temperature in said coremicro inertial measurement unit.

38. The self-contained/interruption-free positioning system, as recited in claim 37, wherein said X axis, Y axis and Z axis angular rate electrical signals produced from said angular producer are analog angular rate voltage signals directly proportional to angular rates of a carrier carrying said coremicro inertial measurement unit, and said X axis, Y axis and Z axis acceleration electrical signals produced from said acceleration producer are analog acceleration voltage signals directly proportional to accelerations of a vehicle.

39. The self-contained/interruption-free positioning system, as recited in claim 38, wherein said angular increment and velocity increment producer comprises:

an angular integrating means and an acceleration integrating means, which are adapted for respectively integrating said X axis, Y axis and Z axis analog angular rate voltage signals and said X axis, Y axis and Z axis analog acceleration voltage signals for a predetermined time interval to accumulate said X axis, Y axis and Z axis analog angular rate voltage signals and said X axis, Y axis and Z axis analog acceleration voltage signals as a raw X axis, Y axis and Z axis angular increment and a raw X axis, Y axis and Z axis velocity increment for a predetermined time interval to achieve accumulated angular increments and accumulated velocity increments, wherein said integration is performed to remove noise signals that are non-directly proportional to said carrier angular rate and acceleration within said X axis, Y axis and Z axis analog angular rate voltage signals and said X axis, Y axis and Z axis analog acceleration voltage signals, to improve signal-to-noise ratio, and to remove a high frequency signals in said X axis, Y axis and Z axis analog angular rate voltage signals and said X axis, Y axis and Z axis analog acceleration voltage signals;

a resetting means which forms an angular reset voltage pulse and a velocity reset voltage pulse as an angular scale and a velocity scale which are input into said angular integrating means and said acceleration integrating means respectively; and an angular increment and velocity increment measurement means which is adapted for measuring said voltage values of said X axis, Y axis and Z axis accumulated angular increments and said X axis, Y axis and Z axis accumulated velocity increments with said angular reset voltage pulse and said velocity reset voltage pulse respectively to acquire angular increment counts and velocity increment counts as a digital form of angular increment and velocity increment measurements respectively.

40. The self-contained/interruption-free positioning system, as recited in claim 39, wherein said angular increment and velocity increment measurement means also scales said voltage values of said X axis, Y axis and Z axis accumulated angular and velocity increments into real X axis, Y axis and Z axis angular and velocity increment voltage values, wherein in said angular integrating means and said accelerating integrating means, said X axis, Y axis and Z axis analog angular voltage signals and said X axis, Y axis and Z axis analog acceleration voltage signals are each reset to accumulate from a zero value at an initial point of every said predetermined time interval.

41. The self-contained/interruption-free positioning system, as recited in claim 40, wherein said resetting means comprises an oscillator, wherein said angular reset voltage pulse and said velocity reset voltage pulse are implemented by producing a timing pulse by said oscillator.

42. The self-contained/interruption-free positioning system, as recited in claim 41, wherein said angular increment and velocity increment measurement means, which is adapted for measuring said voltage values of said X axis, Y axis and Z axis accumulated angular and velocity increments, comprises an analog/digital converter to substantially digitize said raw X axis, Y axis and Z axis angular increment and velocity increment voltage values into digital X axis, Y axis and Z axis angular increment and velocity increments.

43. The self-contained/interruption-free positioning system, as recited in claim 42, wherein said angular integrating means of said angular increment and velocity increment producer comprises an angular integrator circuit for receiving said amplified X axis, Y axis and Z axis analog angular rate signals and integrating to form said accumulated angular increments, and said acceleration integrating means of said angular increment and velocity increment producer comprises an acceleration integrator circuit for receiving said amplified X axis, Y axis and Z axis analog acceleration signals and integrating to form said accumulated velocity increments.

44. The self-contained/interruption-free positioning system, as recited in claim 43, wherein said angular increment and velocity increment producer further comprises an angular amplifying circuit for amplifying said X axis, Y axis and Z axis analog angular rate voltage signals to form amplified X axis, Y axis and Z axis analog angular rate signals and an acceleration amplifying circuit for amplifying said X axis, Y axis and Z axis analog acceleration voltage signals to form amplified X axis, Y axis and Z axis analog acceleration signals.

45. The self-contained/interruption-free positioning system, as recited in claim 44, wherein said angular integrating means of said angular increment and velocity increment producer comprises an angular integrator circuit for receiving said amplified X axis, Y axis and Z axis analog angular rate signals from said angular amplifier circuit and integrating to form said accumulated angular increments, and said acceleration integrating means of said angular increment and velocity increment producer comprises an acceleration integrator circuit for receiving said amplified X axis Y axis and Z axis analog acceleration signals from said acceleration amplifier circuit and integrating to form said accumulated velocity increments.

46. The self-contained/interruption-free positioning system, as recited in claim 45, wherein said analog/digital converter of said angular increment and velocity increment producer further includes an angular analog/digital converter, a velocity analog/digital converter and an input/output interface circuit, wherein said accumulated angular increments output from said angular integrator circuit and said accumulated velocity increments output from said acceleration integrator circuit are input into said angular analog/digital converter and said velocity analog/digital converter respectively, wherein said accumulated angular increments is digitized by said angular analog/digital converter by measuring said accumulated angular increments with said angular reset voltage pulse to form a digital angular measurements of voltage in terms of said angular increment counts which is output to said input/output interface circuit to generate digital X axis, Y axis and Z axis angular increment voltage values, wherein said accumulated velocity increments are digitized by said velocity analog/digital converter by measuring said accumulated velocity increments with said velocity reset voltage pulse to form digital velocity measurements of voltage in terms of said velocity increment counts which is output to said input/output interface circuit to generate digital X axis, Y axis and Z axis velocity increment voltage values.

47. The self-contained/interruption-free positioning system, as recited in claim 46, wherein said thermal processor comprises an analog/digital converter connected to said thermal sensing producer device, a digital/analog converter connected to said heater device, and a temperature controller connected with both said analog/digital converter and said digital/analog converter, wherein said analog/digital converter inputs said temperature voltage signals produced by said thermal sensing producer device, wherein said temperature voltage signals are sampled in said analog/digital converter to sampled temperature voltage signals which are further digitized to digital signals and output to said temperature controller which computes digital temperature commands using said input digital signals from said analog/digital converter, a temperature sensor scale factor, and a pre-determined operating temperature of said angular rate producer and acceleration producer, wherein said digital temperature commands are fed back to said digital/analog converter, wherein said digital/analog converter converts said digital temperature commands input from said temperature controller into analog signals which are output to said heater device to provide adequate heat for maintaining said predetermined operating temperature of said coremicro inertial measurement unit.

48. The self-contained/interruption-free positioning system, as recited in claim 47, wherein said thermal processor further comprises:
  a first amplifier circuit between said thermal sensing producer device and said digital/analog converter, wherein said voltage signals from said thermal sensing producer device is first input into said first amplifier circuit for amplifying said signals and suppressing said noise residing in said voltage signals and improving said signal-to-noise ratio, wherein said amplified voltage signals are then output to said analog/digital converter; and
  a second amplifier circuit between said digital/analog converter and heater device for amplifying said input analog signals from said digital/analog converter for driving said heater device.

49. The self-contained/interruption-free positioning system, as recited in claim 48, wherein said thermal processor further comprises an input/output interface circuit connected said analog/digital converter and digital/analog converter with said temperature controller, wherein said voltage signals are sampled in said analog/digital converter to form sampled voltage signals that are digitized into digital signals, and said digital signals are output to said input/output interface circuit, wherein said temperature controller is adapted to compute said digital temperature commands using said input digital temperature voltage signals from said input/output interface circuit, said temperature sensor scale factor, and said pre-determined operating temperature of said angular rate producer and acceleration producer, wherein said digital temperature commands are fed back to said input/output interface circuit, moreover said digital/analog converter further converts said digital temperature commands input from said input/output interface circuit into analog signals which are output to said heater device to provide adequate heat for maintaining said predetermined operating temperature of said coremicro inertial measurement unit.

50. The self-contained/interruption-free positioning system, as recited in claim 14, wherein said navigation processor further provides:
  an INS computation module, using said digital angular increments and velocity increments signals from said inertial measurement unit to produce inertial positioning measurement;
  an integration Kalman filter for estimating errors of said inertial positioning measurements to calibrate inertial positioning errors;
  a magnetic sensor processing module for producing a heading angle;
  a velocity producer processing module for producing relative position error measurements for said integration Kalman filter; and
  an altitude measurement processing module for forming said mean sea level height in a digital data type using said altitude measurement.

51. The self-contained/interruption-free positioning system, as recited in claim 50, wherein said INS computation module further comprises:
  a sensor compensation module for calibrating errors of said digital angular increments and velocity increments signals: and
  an inertial navigation algorithm module for computing IMU position, velocity and attitude data.

52. The self-contained/interruption-free positioning system, as recited in claim 51, wherein said inertial navigation algorithm module comprises:
  an attitude integration module for integrating said angular increments into said attitude data;
  a velocity integration module for transforming said measured velocity increments into a navigation coordinate frame by using said attitude data to form transformed velocity increments which are integrated into said velocity data; and
  a position integration module for integrating said navigation frame velocity data into said position data.

53. The self-contained/interruption-free positioning system, as recited in claim 52, wherein said velocity producer processing module further comprises:
  a transformation module for transforming an input velocity data expressed in said body frame to a velocity expressed in a navigation frame;
  a scale factor and misalignment error compensation module for compensating scale factor and misalignment errors in said velocity; and
  a relative position computation for receiving said IMU velocity and attitude data and compensated velocity to form said relative position error measurements for said integration Kalman filter.

54. The self-contained/interruption-free positioning system, as recited in claim 53, wherein said integration Kalman filter comprises:
  a motion test module for determining if said user stops automatically;
  a GPS integrity monitor for determining if GPS data is available;
  a measurement and time varying matrix formation module for formulating said measurement and time varying matrix for said state estimation module according to a motion status of said user from said motion test module and GPS data availability from said GPS integrity monitor; and
  a state estimation module for filtering said measurements and obtaining said optimal estimates of said IMU positioning errors.

55. The self-contained/interruption-free positioning system, as recited in claim 54, wherein said state estimation module provides a horizontal filter for obtaining said estimates of said horizontal IMU positioning errors, and a vertical filter for obtaining said estimates of vertical IMU positioning errors.

56. The self-contained/interruption-free positioning system, as recited in claim 54, wherein said motion test module provides:
  a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

57. The self-contained/interruption-free positioning system, as recited in claim 13, wherein said navigation processor further provides:

an INS computation module, using said digital angular increments and velocity increments signals from said inertial measurement unit to produce inertial positioning measurement;

an integration Kalman filter for estimating errors of said inertial positioning measurements to calibrate inertial positioning errors;

a magnetic sensor processing module for producing a heading angle;

a velocity producer processing module for producing relative position error measurements for said integration Kalman filter; and an altitude measurement processing module for forming said mean sea level height in a digital data type using said altitude measurement.

58. The self-contained/interruption-free positioning system, as recited in claim 57, wherein said INS computation module further comprises:

a sensor compensation module for calibrating errors of said digital angular increments and velocity increments signals: and an inertial navigation algorithm module for computing IMU position, velocity and attitude data.

59. The self-contained/interruption-free positioning system, as recited in claim 58, wherein said inertial navigation algorithm module comprises:

an attitude integration module for integrating said angular increments into said attitude data;

a velocity integration module for transforming said measured velocity increments into a navigation coordinate frame by using said attitude data to form transformed velocity increments which are integrated into said velocity data; and a position integration module for integrating said navigation frame velocity data into said position data.

60. The self-contained/interruption-free positioning system, as recited in claim 59, wherein said velocity producer processing module further comprises:

a transformation module for transforming an input velocity data expressed in said body frame to a velocity expressed in a navigation frame;

a scale factor and misalignment error compensation module for compensatin3g scale factor and misalignment errors in said velocity; and a relative position computation for receiving said IMU velocity and attitude data and compensated velocity to form said relative position error measurements for said integration Kalman filter.

61. The self-contained/interruption-free positioning system, as recited in claim 60, wherein said integration Kalman filter comprises:

a motion test module for determining if said user stops automatically;

a GPS integrity monitor for determining if GPS data is available;

a measurement and time varying matrix formation module for formulating said measurement and time varying matrix for said state estimation module according to a motion status of said user from said motion test module and GPS data availability from said GPS integrity monitor; and a state estimation module for filtering said measurements and obtaining said optimal estimates of said IMU positioning errors.

62. The self-contained/interruption-free positioning system, as recited in claim 61, wherein said state estimation module provides a horizontal filter for obtaining said estimates of said horizontal IMU positioning errors, and a vertical filter for obtaining said estimates of vertical IMU positioning errors.

63. The self-contained/interruption-free positioning system, as recited in claim 62, wherein said motion test module provides:

a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

64. The self-contained/interruption-free positioning system, as recited in claim 2, wherein said velocity producer provides relative velocity measurements of said user to a ground by sensing Doppler frequencies based on a Doppler effect.

65. The self-contained/interruption-free positioning system, as recited in claim 2, wherein said positioning assistant includes a GPS receiver connected with said navigation processor to receive GPS RF (radio frequency) signals to produce GPS positioning data to said navigation processor in order to further improve accuracy of said self-contained/interruption-free positioning data when said GPS signals are available.

66. The self-contained/interruption-free positioning system, as recited in claim 65, wherein said positioning assistant further includes a data link for receiving said GPS positioning data from a GPS reference site to perform differential GPS positioning.

67. The self-contained/interruption-free positioning system, as recited in claim 2, wherein said positioning assistant is a radio positioning system based on said wireless communication device.

68. The self-contained/interruption-free positioning system, as recited in claim 2, wherein said navigation processor further provides:

an INS computation module, using said digital angular increments and velocity increments signals from said inertial measurement unit to produce inertial positioning measurement;

an integration Kalman filter for estimating errors of said inertial positioning measurements to calibrate inertial positioning errors;

a magnetic sensor processing module for producing a heading angle;

a velocity producer processing module for producing relative position error measurements for said integration Kalman filter; and an altitude measurement processing module for forming said mean sea level height in a digital data type using said altitude measurement.

69. The self-contained/interruption-free positioning system, as recited in claim 68, wherein said INS computation module further comprises:

a sensor compensation module for calibrating errors of said digital angular increments and velocity increments signals: and an inertial navigation algorithm moduie for computing IMU position, velocity and attitude data.

70. The self-contained/interruption-free positioning system, as recited in claim 69, wherein said inertial navigation algorithm module comprises:

an attitude integration module for integrating said angular increments into said attitude data;

a velocity integration module for transforming said measured velocity increments into a navigation coordinate frame by using said attitude data to form transformed velocity increments which are integrated into said velocity data; and a position integration module for integrating said navigation frame velocity data into said position data.

71. The self-contained/interruption-free positioning system, as recited in claim 70, wherein said velocity producer processing module further comprises:

a transformation module for transforming an input velocity data expressed in said body frame to a velocity expressed in a navigation frame;

a scale factor and misalignment error compensation module for compensating scale factor and misalignment errors in said velocity; and a relative position computation for receiving said IMU velocity and attitude data and compensated velocity to form said relative position error measurements for said integration Kalman filter.

72. The self-contained/interruption-free positioning system, as recited in claim 71, wherein said integration Kalman filter comprises:

a motion test module for determining if said user stops automatically;

a GPS integrity monitor for determining if GPS data is available;

a measurement and time varying matrix formation module for formulating said measurement and time varying matrix for said state estimation module according to a motion status of said user from said motion test module and GPS data availability from said GPS integrity monitor; and a state estimation module for filtering said measurements and obtaining said optimal estimates of said IMU positioning errors.

73. The self-contained/interruption-free positioning system, as recited in claim 72, wherein said state estimation module provides a horizontal filter for obtaining said estimates of said horizontal IMU positioning errors, and a vertical filter for obtaining said estimates of vertical IMU positioning errors.

74. The self-contained/interruption-free positioning system, as recited in claim 72, wherein said motion test module provides:

a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

75. The self-contained/interruption-free positioning system, as recited in claim 1, wherein said north finder is a magnetic sensor for sensing earth's magnetic field to measure said heading angle of said user.

76. The self-contained/interruption-free positioning system, as recited in claim 75, wherein said positioning assistant includes a GPS receiver connected with said navigation processor to receive GPS RE (radio frequency) signals to produce GPS positioning data to said navigation processor in order to further improve accuracy of said self-contained/interruption-free positioning data when said GPS signals are available.

77. The self-contained/interruption-free positioning system, as recited in claim 76, wherein said navigation processor further provides:

an INS computation module, using said digital angular increments and velocity increments signals from said inertial measurement unit to produce inertial positioning measurement;

an integration Kalman filter for estimating errors of said inertial positioning measurements to calibrate inertial positioning errors;

a magnetic sensor processing module for producing a heading angle;

a velocity producer processing module for producing relative position error measurements for said integration Kalman filter; and an altitude measurement processing module for forming said mean sea level height in a digital data type using said altitude measurement.

78. The self-contained/interruption-free positioning system, as recited in claim 77, wherein said INS computation module further comprises:

a sensor compensation module for calibrating errors of said digital angular increments and velocity increments signals: and an inertial navigation algorithm module for computing IMU position, velocity and attitude data.

79. The self-contained/interruption-free positioning system, as recited in claim 78, wherein said inertial navigation algorithm module comprises:

an attitude integration module for integrating said angular increments into said attitude data;

a velocity integration module for transforming said measured velocity increments into a navigation coordinate frame by using said attitude data to form transformed velocity increments which are integrated into said velocity data; and a position integration module for integrating said navigation frame velocity data into said position data.

80. The self-contained/interruption-free positioning system, as recited in claim 79, wherein said velocity producer processing module further comprises:

a transformation module for transforming an input velocity data expressed in said body frame to a velocity expressed in a navigation frame;

a scale factor and misalignment error compensation module for compensating scale factor and misalignment errors in said velocity; and a relative position computation for receiving said IMU velocity and attitude data and compensated velocity to form said relative position error measurements for said integration Kalman filter.

81. The self-contained/interruption-free positioning system, as recited in claim 80, wherein said integration Kalman filter comprises:

a motion test module for determining if said user stops automatically;

a GPS integrity monitor for determining if said GPS data is available;

a measurement and time varying matrix formation module for formulating said measurement and time varying matrix for said state estimation module according to a motion status of said user from said motion test module and GPS data availability from said GPS integrity monitor; and a state estimation module for filtering said measurements and obtaining said optimal estimates of said IMU positioning errors.

82. The self-contained/interruption-free positioning system, as recited in claim 81, wherein said state estimation module provides a horizontal filter for obtaining said estimates of said horizontal IMU positioning errors, and a vertical filter for obtaining said estimates of vertical IMU positioning errors.

83. The self-contained/interruption-free positioning system, as recited in claim 82, wherein said motion test module provides:

a velocity producer change test module for receiving said velocity producer reading to determine if said user stops or restarts;

a system velocity change test module for comparing system velocity change between a current interval and a previous interval to determine if said user stops or restarts;

a system velocity test module for comparing a system velocity magnitude with a predetermined value to determine whether said user stops or restarts; and an attitude change test module for comparing said system attitude magnitude with a predetermined value to determine whether said user stops or restarts.

84. The self-contained/interruption-free positioning system, as recited in claim 75, wherein said positioning assistant is a radio positioning system based on said wireless communication device.

85. The self-contained/interruption-free positioning system, as recited in claim 1, wherein said velocity producer provides relative velocity measurements of said user to a ground by sensing Doppler frequencies based on a Doppler effect.

86. The self-contained/interruption-free positioning system, as recited in claim 85, wherein said positioning assistant includes a GPS receiver connected with said navigation processor to receive GPS RF (radio frequency) signals to produce GPS positioning data to said navigation processor in order to further improve accuracy of said self-contained/interruption-free positioning data when said GPS signals are available.

87. The self-contained/interruption-free positioning system, as recited in claim 85, wherein said positioning assistant is a radio positioning system based on said wireless communication device.

88. The self-contained/interruption-free positioning system, as recited in claim 1, wherein said positioning assistant includes a GPS receiver connected with said navigation processor to receive GPS RE (radio frequency) signals to produce GPS positioning data to said navigation processor in order to further improve accuracy of said self-contained/interruption-free positioning data when said GPS signals are available.

89. The self-contained/interruption-free positioning system, as recited in claim 1, wherein said positioning assistant is a radio positioning system based on said wireless communication device.

90. A self-contained/interruption-free positioning method for a user on earth surface, comprising the steps of:

(a) sensing motion measurements of said user by a main IMU (Inertial Measurement Unit) to produce digital angular increments and velocity increments signals in response to a user motion, (b) providing interruptible positioning data to assist said main IMU based self-contained/interruption-free positioning module by a positioning assistant, wherein the steP (b) further comprises the steps of deducing GPS positioning data produced from GPS signals received by said positioning assistant that is a GPS receiver, and deducing raw positioning data through said wireless communication device;

(c) producing self-contained/interruption-free positioning data of said user using motion measurements, and improving self-contained/interruption-free positioning data of said user to form improved self-contained/interruption-free positioning data when said interruptible positioning data is available, wherein the step (c) comprises the steps of:

(c.1) sensing an earth's magnetic field to measure a heading angle of said user by a magnetic sensor, (c.2) measuring a relative velocity of said user relative to a ground by a velocity producer to produce a measured velocity, and (c.3) measuring altitude measurement of said user to form a mean sea level height of said user in digital manner; and (c.4) blending said digital angular increments and velocity increments signals, said heading angle, said relative velocity of said user relative to said ground, said mean sea level height and said GPS positioning data to produce optimal positioning data;

(d) exchanging said improved self-contained/interruption-free positioning data with other users by a wireless communication device, (e) providing map data to obtain a surrounding map information of location of said user by accessing a map database using said improved self-contained/interruption-free positioning data, and (f) visualizing said improved self-contained/interruption-free positioning data of said user using said surrounding map information by a display device.

91. The self-contained/interruption-free positioning method, as recited in claim 90, wherein the step (c.4) further comprises the steps of:

c.4.1 computing inertial positioning measurements using said digital angular increments and velocity increments signals;

c.4.2 computing said heading angle using said earth's magnetic field measurements, c.4.3 creating relative position error measurements in said velocity producer processing module using said relative velocity of said user relative to said ground for a Kalman filter, c.4.4 converting said altitude measurements to said mean sea level height of said user in digital manner; and c.4.5 estimating errors of inertial positioning measurements by means of performing Kalman filtering computation to calibrate said inertial positioning measurements.

92. The self-contained/interruption-free positioning method, as recited in claim 91, wherein the step (c.4.1) further comprises the steps of:

c.4.1.1 integrating said angular increments into attitude data, referred to as attitude integration processing;

c.4.1.2 transforming said measured velocity increments into a suitable navigation coordinate frame by use of said attitude data, wherein said transferred velocity increments are integrated into velocity data, denoted as velocity integration processing, and c.4.1.3 integrating said navigation frame velocity data into position data, denoted as position integration processing.

93. The self-contained/interruption-free positioning method, as recited in claim 92, wherein the step (c.4.5) further comprises the steps of:

c.4.5.1 performing motion tests to determine whether said user stops to initiate a zero-velocity update;

c.4.5.2 determining whether GPS data available using a GPS state status indicator from said GPS receiver;

c.4.5.3 formulating measurement equations and time varying matrix for said Kalman filter; and c.4.5.4 computing estimates of said error states using said Kalman filter.

94. The self-contained/interruption-free positioning method, as recited in claim 93, wherein the step (c.2) further comprises the steps of:

(c.2.1) transforming said measured velocity expressed in a body frame into a navigation frame;

(c.2.2) comparing said measured velocity with an IMU velocity to form a velocity difference; and (c.2.3) integrating said velocity difference during a predetermined interval.

95. The self-contained/interruption-free positioning method, as recited in claim 94, wherein the step (b) further comprises an additional step of diffentially deducing said GPS positioning data through a data link.

96. The self-contained/interruption-free positioning method, as recited in claim 90, wherein the step (c.2) further comprises the steps of:

(c.2.1) transforming said measured velocity expressed in a body frame into a navigation frame;

(c.2.2) comparing said measured velocity with an IMU velocity to form a velocity difference; and (c.2.3) integrating said velocity difference during a predetermined interval.

97. The self-contained/interruption-free positioning method, as recited in claim 90, wherein the step (b) further comprises an additional step of diffentially deducing said GPS positioning data through a data link.

98. The self-contained/interruption-free positioning method, as recited in claim 90, wherein said additional step of said step (b) further comprises a step (b.1) of fixing integer ambiguities based on testing an occurrence of new satellites or cycle slips using GPS rover raw measurements from said GPS processor, GPS reference raw measurements, position, and velocity from a data link, and said inertial navigation solution from said INS processor and send said integer ambiguities to a Kalman filter.

99. The self-contained/interruption-free positioning method, as recited in claim 98, wherein step (b.1) further comprises the steps of:

(b.1.1) injecting said GPS rover raw measurements from said GPS processor, GPS reference raw measurements, position, and velocity from said data link, and said inertial navigation solution from said INS processor into a new satellites/cycle slips detection module to test the occurrence of new satellites or cycle slips;

(b.1.2) initiating an on-the-fly ambiguity resolution module as said new satellites/cycle slips detection module is on when the new satellites or cycle slips occur;

(b.1.3) fixing integer ambiguities to estimate a more accurate user navigation solution, and (b.1.4) sending said selected integer ambiguities from said on-the-fly ambiguity resolution module to said Kalman filter.

100. The self-contained/interruption-free positioning method, as recited in claim 99, wherein the step (b.1.2) further comprises the steps of:

(b.1.2.1) setting up a search window which comprises a plurality of time (N) epochs;

(b.1.2.2) searching an integer ambiguity set at a first time epoch of said search window by using an ISAA, that is intermediate ambiguity search strategy, wherein said integer ambiguity set becomes a member of an estimator bank while there is no member in said estimator bank before said first time epoch, wherein based on said integer ambiguity set and phase measurements, a rover position is estimated in said estimator bank, and then a corresponding weight is calculated in a weight bank, as a result, an optimal rover position for said time epoch is equal to said rover position multiplied by said corresponding weight, and based on said optimal rover position and said Doppler shifts, a rover velocity is estimated;

(b.1.2.3) searching said integer ambiguity set at a second time epoch of said search window by using said IASS;

(b.1.2.4) following the step (b.1.2.3) for said other time epochs of said search window, wherein at a last time epoch N of said search window, after said search of said IASS, said estimator bank and said corresponding weight bank are completely established;

(b.1.2.5) inputting continuously said phase measurements into each of said Kalman filters of said estimator bank at the $(N+1)^{th}$ time epochs, wherein based on each of said integer ambiguity sets and said phase measurements, an individual rover position is estimated in said estimator bank and each corresponding weight is calculated accumulatively in said weight bank to an associated weight, therefore said optimal rover position is equal to a sum of an individual rover position multiplied by an associated weight, and further based on said optimal rover position and Doppler shifts, said rover velocity is estimated;

(b.1.2.6) following the step (b.1.2.5) after said $(N+1)^{th}$ time epoch until a criterion is met, wherein after said criterion is met, said estimator bank and said weight bank stop functioning, and during a confirmation period, that is from said first time epoch of said search window to said last time epoch when said estimator bank and said weight bank stop functioning, said estimator bank and said weight bank continuously identify a correct integer ambiguity set and estimate said rover position in real-time wherein said weight corresponding to said correct integer ambiguity is approaching to one while said other integer ambiguity sets are converging to zero; and (b.1.2.7) estimating said rover position and velocity by using a least-squares estimated method after fixing integer ambiguities.

101. The self-contained/interruption-free positioning method, as recited in claim 100, in the step (b.1.2.3), wherein when said integer ambiguity set is same as one of a previous time epoch, said number of said Kalman filter remains, wherein based on said integer ambiguity set and said phase measurements, said rover position is estimated in said estimator bank and said corresponding weight is accumulatively calculated in said weight bank, as a result, said optimal rover position is equal to said rover position multiplied by said associated weight and based on said optimal rover position and said Doppler shifts, said rover velocity is estimated.

102. The self-contained/interruption-free positioning method, as recited in claim 100, in the step (b.1.2.3), wherein when said integer ambiguity set is different from one of a previous time epoch, said current integer ambiguity set becomes a new member of said estimator bank, that is a number of said Kalman filters increases by one, wherein based on each of said integer ambiguity sets and said same phase measurements, an individual rover position is estimated in said estimator bank and a calculation of each corresponding weight is recalculated from scratch in said weight bank, and therefore said optimal rover position is equal to a sum of said individual rover position multiplied by said associated weight, wherein based on said optimal rover position and said Doppler shifts, said rover velocity is estimated.

103. The self-contained/interruption-free positioning method, as recited in claim 100, 101 or 102, wherein said IASS comprises the steps of:

resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with said primary double difference wide lane phase measurements to estimate said rover position and said primary double difference wide lane ambiguities;

establishing an ambiguity search domain based on said estimated primary double difference wide lane ambiguities and a corresponding cofactor matrix;

searching for an ambiguity set by using a "simplified" least-squares search estimator;

computing said rover position based on said fixed primary double difference wide lane ambiguities in a position calculation module;

fixing secondary double difference wide lane ambiguities by applying said primary wide-lane-ambiguity-fixed rover position solution into said secondary double difference wide lane phase measurements;

calculating approximated double difference narrow lane ambiguities and then using said extrawidelaning technique module to resolve double difference narrow lane ambiguities; and calculating L1 and L2 ambiguities in a L1 and L2 ambiguity resolution module from said combination of said double difference wide lane ambiguities and said double difference narrow lane ambiguities.

* * * * *